(12) United States Patent
Qin

(10) Patent No.: US 11,852,818 B2
(45) Date of Patent: Dec. 26, 2023

(54) THIN NEAR-TO-EYE DISPLAY DEVICE WITH LARGE FIELD OF VIEW ANGLE

(71) Applicant: BEIJING ANTVR TECHNOLOGY CO., LTD., Beijing (CN)

(72) Inventor: Zheng Qin, Beijing (CN)

(73) Assignee: BEIJING ANTVR TECHNOLOGY CO., LTD., Beijing (CN)

( * ) Notice: Subject to any disclaimer, the term of this patent is extended or adjusted under 35 U.S.C. 154(b) by 313 days.

(21) Appl. No.: 17/420,526

(22) PCT Filed: Sep. 29, 2018

(86) PCT No.: PCT/CN2018/108550
§ 371 (c)(1),
(2) Date: Jul. 2, 2021

(87) PCT Pub. No.: WO2020/062124
PCT Pub. Date: Apr. 2, 2020

(65) Prior Publication Data
US 2022/0082836 A1     Mar. 17, 2022

(51) Int. Cl.
G02B 27/01     (2006.01)
G02B 27/10     (2006.01)
G02B 27/14     (2006.01)
G06T 19/00     (2011.01)

(52) U.S. Cl.
CPC ..... *G02B 27/0172* (2013.01); *G02B 27/0101* (2013.01); *G02B 27/1066* (2013.01); *G02B 27/142* (2013.01); *G06T 19/006* (2013.01); *G02B 2027/0123* (2013.01); *G02B 2027/0178* (2013.01)

(58) Field of Classification Search
CPC ............ G02B 27/0172; G02B 27/0101; G02B 27/1066; G02B 27/142; G02B 27/14; G02B 27/148; G02B 27/283; G02B 2027/0123; G02B 2027/0178; G06T 19/006

See application file for complete search history.

(56) References Cited

U.S. PATENT DOCUMENTS

| | | | |
|---|---|---|---|
| 2004/0150888 A1* | 8/2004 | Domjan ................ | G02B 30/34 359/630 |
| 2016/0363770 A1* | 12/2016 | Kim .................... | G02B 27/0093 |
| 2018/0364488 A1* | 12/2018 | Mori ................... | G02B 27/0172 |

FOREIGN PATENT DOCUMENTS

| | | |
|---|---|---|
| CN | 1894617 A | 1/2007 |
| CN | 106249412 A | 12/2016 |
| CN | 108152951 A | 6/2018 |
| CN | 108535866 A | 9/2018 |

OTHER PUBLICATIONS

International Search Report for PCT/CN2018/108550, dated Dec. 12, 2018.

* cited by examiner

*Primary Examiner* — Brent D Castiaux
(74) *Attorney, Agent, or Firm* — Locke Lord LLP; Tim Tingkang Xia, Esq.

(57) ABSTRACT

Disclosed is a thin near-to-eye display device with a large field of view angle. Two or more radial reflection units are adopted to be arranged in front of human eyes, and a large-area image is projected and formed on the retina of the human eyes, so that a near-to-eye display effect of the large field of view angle is achieved in a thin volume.

10 Claims, 53 Drawing Sheets

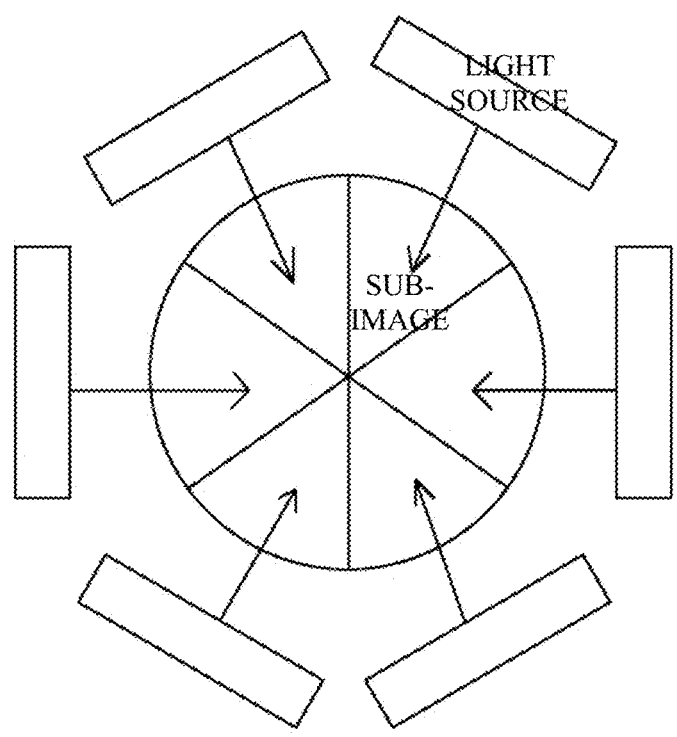
FIG.7a1
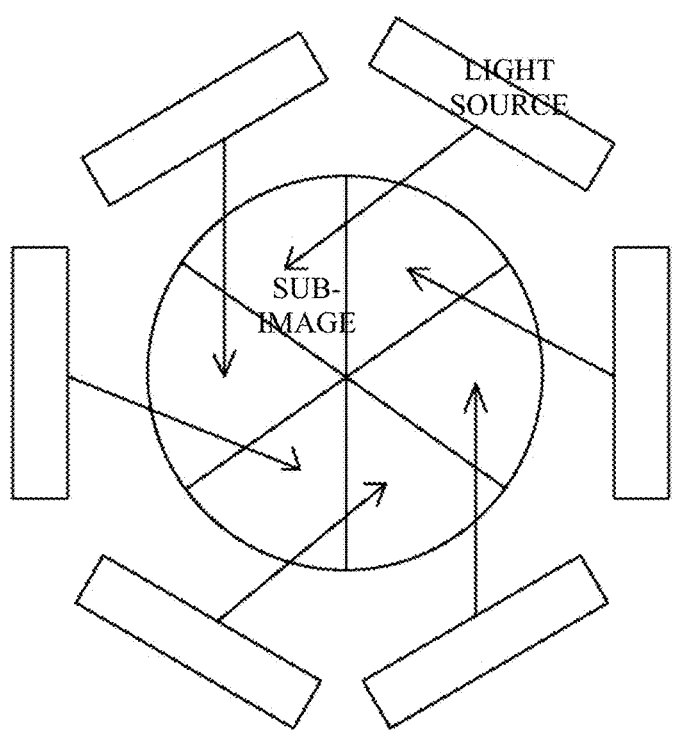
FIG.7b1

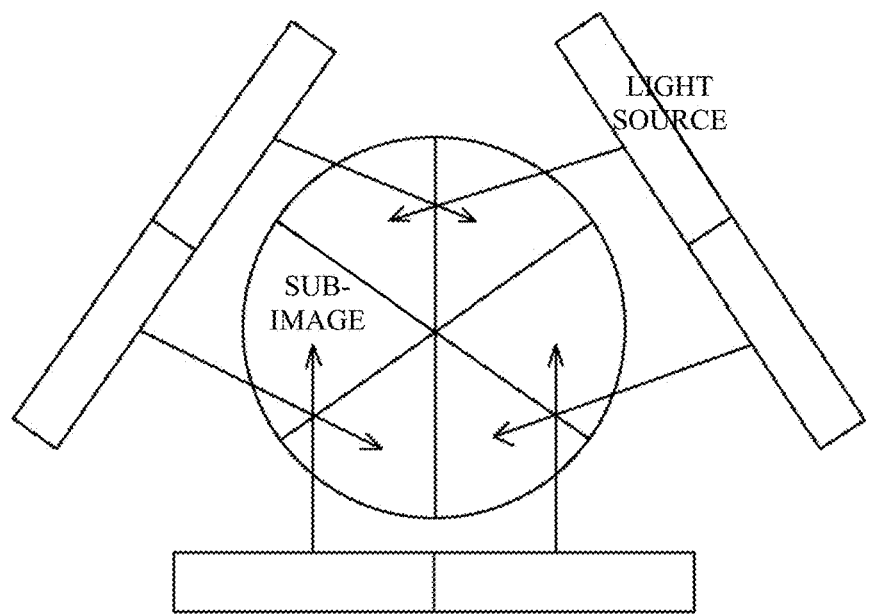
FIG.7c1
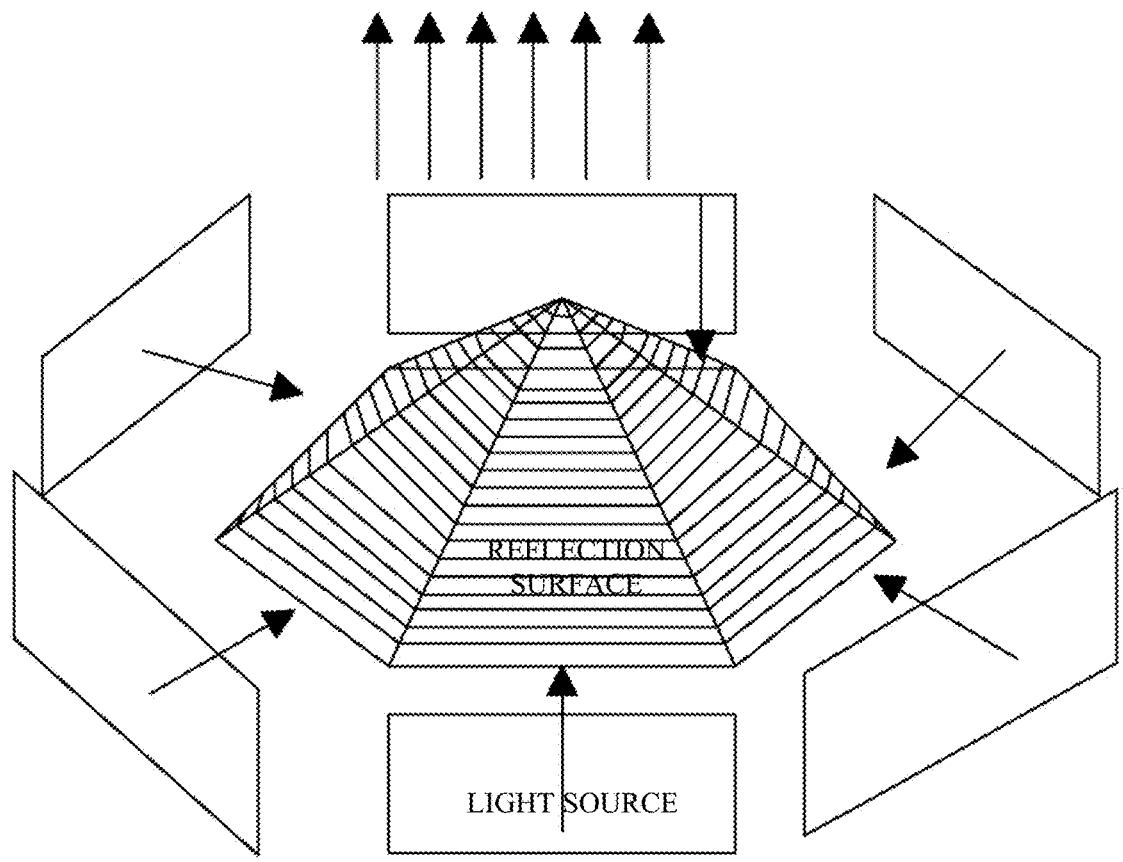
FIG.7a2

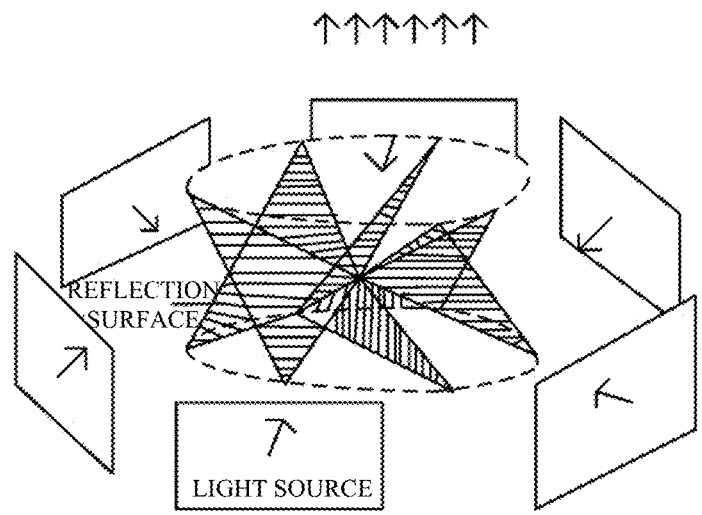
FIG.7b2
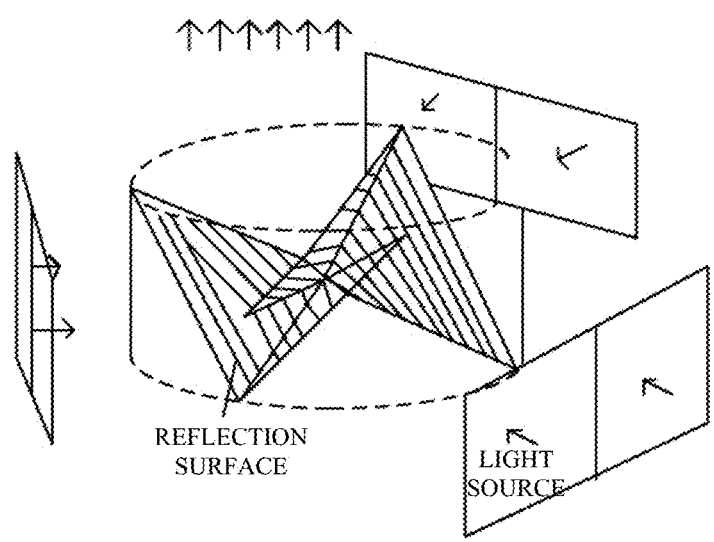
FIG.7c2

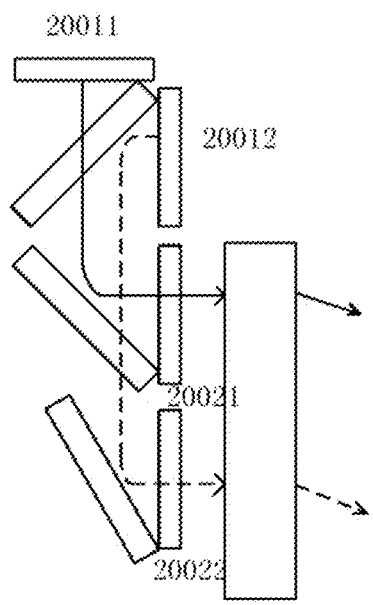
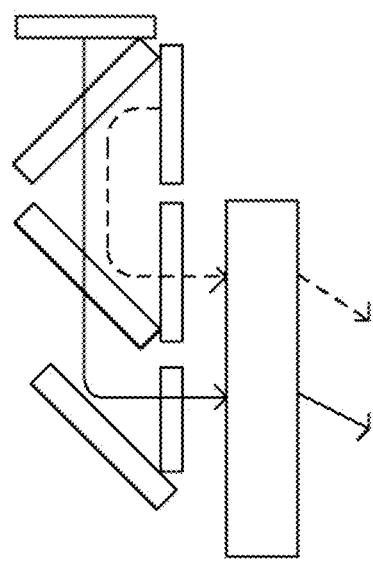
FIG.20a  FIG.20b
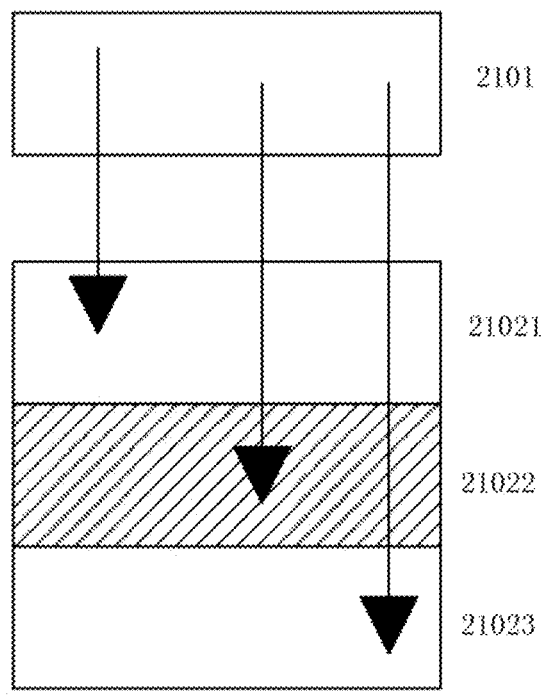
FIG.21

THIN NEAR-TO-EYE DISPLAY DEVICE WITH LARGE FIELD OF VIEW ANGLE

TECHNICAL FIELD

The application relates to the field of near-to-eye display devices, in particular to a thin near-to-eye display device with a large field of view angle.

BACKGROUND

In the near-to-eye display system, in order to form the display effect with a large field of view angle, it is generally necessary to have a large aperture imaging system, and the focal length of the large aperture imaging system is generally not too small, which represents the axial thickness of the near-to-eye display device. Therefore, it is not easy to make a slim glasses-type display with a large field of view angle under the current industrial situation.

On the basis of keeping the larger aperture of the imaging system, the radial reflection unit is adopted to convert the thickness of the device into the radial dimension, and a plurality of radial reflection units in the same direction or different directions are adopted to realize a larger field of view through splicing imaging, and at the same time, the overall sheet shape of the device is maintained, which is more suitable for manufacturing thin and portable glasses-type display products.

SUMMARY

The application provides a thin near-to-eye display device with a large field of view by adopting radial reflection units by way of imaging splicing.

According to the technical scheme of the application, a thin near-to-eye display device with a large field of view angle incudes two or more radial reflection units arranged in front of human eyes to generate two or more sub-images which are spliced into a larger image on the retina of the human eyes, thereby realizing a near-to-eye display effect with a large field of view angle in a thin volume.

Preferably, the radial reflection unit comprises a light source, a reflection surface, a transmissive diopter and/or a reflective optical component, light emitted by the light source passes through the transmissive diopter or the reflective optical component for refractive amplification before being reflected into axial light so as to be seen by the human eyes.

Preferably, the radial reflection unit is a multi-reflection radial reflection unit, and the light emitted by the light source is reflected twice or more in the process of being reflected into final emitted light and finally enters the human eyes.

Preferably, the multi-reflection radial reflection unit comprises a multi-reflection structure, the multi-reflection structure comprises a plurality of reflection surfaces and/or polarizers and/or even-order transmitters, and/or polarization transmitters, and/or polarization changing reflectors and/or polarization changers.

Preferably, the plurality of radial reflection units project respective sub-image from different directions from a side, and the sub-images are spliced into a complete image on the retina of the human eyes.

Preferably, two radial reflection units project sub-images from upper and lower directions, and the sub-images are spliced into a complete image on the retina of the human eyes.

Preferably, structural forms of the reflection surfaces of three or more radial reflection units include pyramid, turbine and wave.

Preferably, the plurality of radial reflection units project respective sub-images from the side from a same direction, and the sub-images are spliced into a complete image on the retina of the human eyes.

Preferably, the plurality of radial reflection units project respective sub-images from the side from the same direction, each radial reflection unit is provided with an independent light source, or the plurality of radial reflection units share the same light source, and a plurality of emission windows are formed through a light controller, so that only one emission window is opened in each time period to allow light to exit; the plurality of radial reflection units alternately project different sub-images in different time periods, and each time period is extremely short in length, which makes the human eyes feel multiple sub-images at the same time.

Preferably, the light controller comprises a transmissive light valve, a reflective light valve, a controllable mirror or a rotating mirror array.

Preferably, the plurality of radial reflection units project light from different directions, and the plurality of radial reflection units overlap each other in each direction, and each radial reflection unit projects a separate sub-image to be spliced into a complete image on the retina of the human eyes.

Preferably, the near-to-eye display device further includes a compensating refractive component, wherein a focal length of the compensating refractive component is opposite to that of a near-to-eye refractive component, and after offset of the focal length, the human eyes are allowed to see external light, thereby realizing a transmission display effect of augmented reality.

Preferably, the near-to-eye display device further comprises a moving part for adjusting an optical path length of the radial reflection unit, so as to project sub-images with different focal points on the retina of the human eyes.

Preferably, two radial reflection units with different optical path lengths project two overlapping sub-images on a same area of the human retina, one of which is larger and provides a wide edge field of view, while the other is smaller and provides a central high-definition field of view, thereby providing a near-to-eye display effect with a wide edge and a clear center.

The application has the beneficial effects that the application discloses a thin near-to-eye display device with a large field of view angle, which adopts two or more radial reflection units arranged in front of human eyes and projects and splices an image with large area on the retina of human eyes, thereby realizing the near-to-eye display effect with a large field of view angle in a thin volume.

It should be understood that both the foregoing general description and the following detailed description are exemplary illustrations and explanations, and should not be used as limitations on what is claimed in the present application.

BRIEF DESCRIPTION OF DRAWINGS

Further objects, functions and advantages of the present application will be elucidated by the following description of embodiments of the present application with reference to the accompanying drawings, in which:

FIG. 6 to FIG. 13a-c are schematic structural views of a thin near-to-eye display device with a large field of view angle according to a fourth embodiment of the present application.

DESCRIPTION OF EMBODIMENTS

Figure 1:
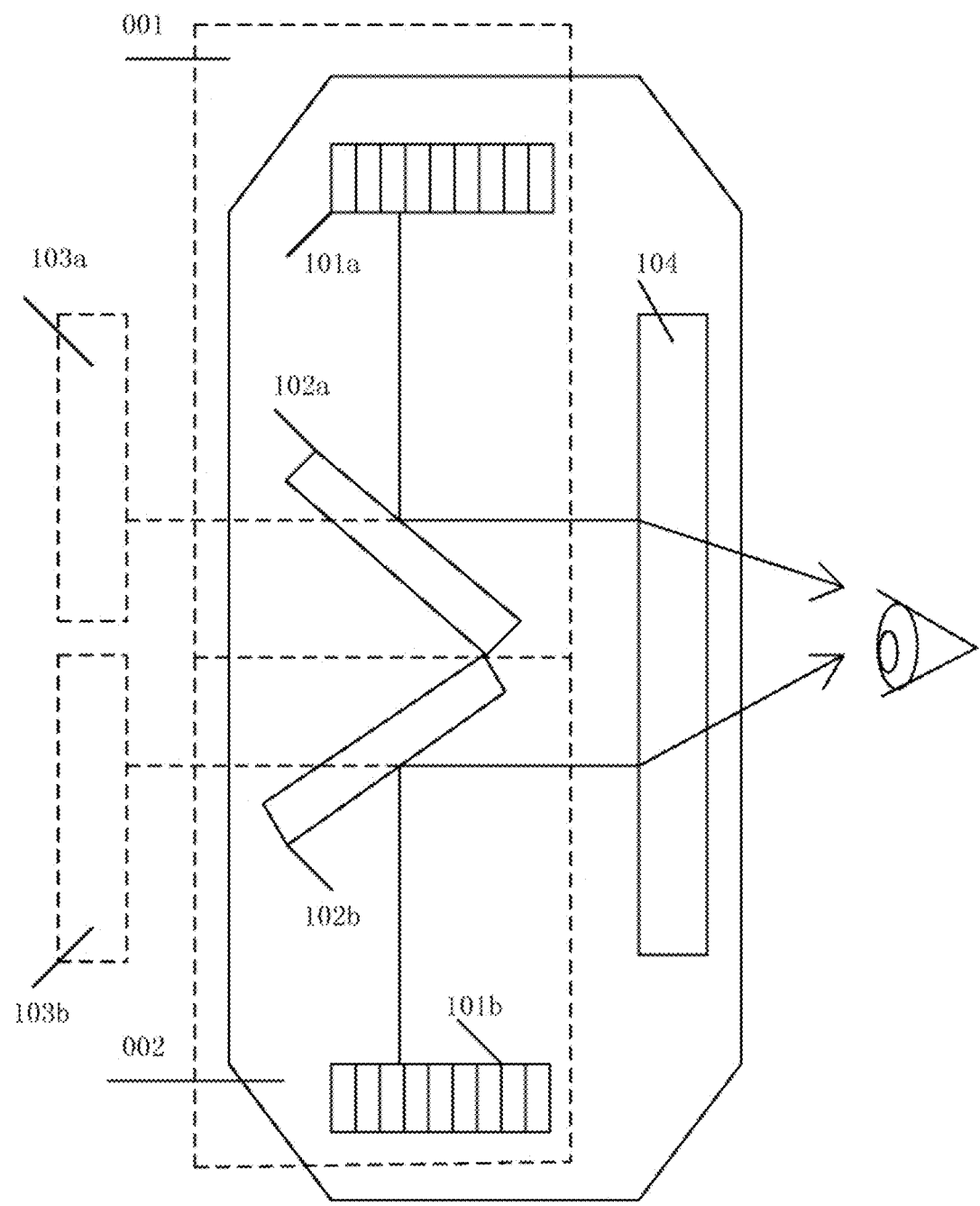
FIG. 1 schematically show a structural diagram of a thin near-to-eye display device with a large field of view angle.

By referring to exemplary embodiments, the objects and functions of the present application and methods for achieving these objects and functions will be elucidated. However, the present application is not limited to the exemplary embodiments disclosed below; It can be realized in different forms. The essence of the description is only to help those skilled in the relevant fields comprehensively understand the specific details of the application.

Hereinafter, embodiments of the present application will be described with reference to the drawings. In the drawings, the same reference numerals represent the same or similar components, or the same or similar steps.

FIG. 1 is a structural schematic diagram of a thin near-to-eye display device with large field of view according to the present application. As shown in FIG. 1, the near-to-eye display device with a large field of view angle includes two or more radial reflection units. The near-eye display device with a large field of view in this embodiment includes radial reflection units 001 and 002, wherein the radial reflection unit 001 includes a light source 101a and a reflection unit 102a, and the radial reflection unit 002 includes a light source 101b and a reflection unit 102b.

The near-to-eye display device with a large field of view in this embodiment also includes a near-to-eye refractive component 104. In this embodiment, two radial reflection units are arranged in front of eyes to produce two sub-images 103a and 103b, which are spliced into a larger image on the retina of human eyes, thus realizing the near-to-eye display effect with a larger field of view angle in a thinner volume.

The light source includes a display screen, a projector, a beam generator, a laser, a light modulator, a light reflector, a light refractor, a light diffractor and other devices.

EXAMPLE 1

FIG. 2a to FIG. 2d are schematic structural views of the radial reflection unit in the thin near-to-eye display device with a large field of view angle according to the first embodiment of the present application.

In this embodiment, the light emitted by the light source passes through the transmissive diopter or reflective optical system for refractive amplification before being reflected into axial light, so that human eyes can see it clearly.

The transmissive diopter includes convex lens, Fresnel lens, diffractive lens, polarization selective lens, etc. The reflective optical system comprises a spherical mirror, an aspheric mirror, a free-form surface mirror and the like.

Figure 2A:
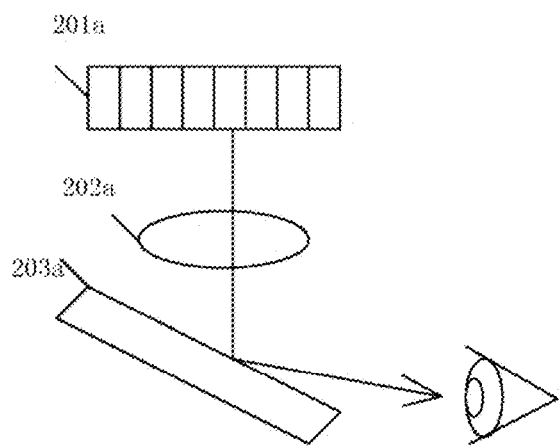
FIG. 2a to FIG. 2d are schematic structural views of the radial reflection unit in the thin near-to-eye display device with a large field of view angle according to a first embodiment of the present application.

As shown in FIG. 2a, the light emitted from the light source 201a undergoes refractive magnification through the lens 202a, and then changes into axial light through the mirror 203a and enters the human eyes.

Figure 2B:
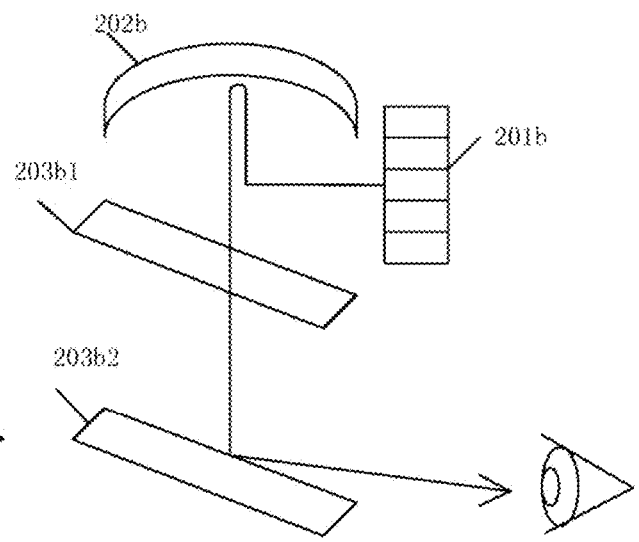

As shown in FIG. 2b, the light emitted from the light source 201b undergoes refractive amplification through the curved mirror 202b, and then is transmitted through the mirror 203b1 and reflected by the mirror 203b2 to become axial light to enter the human eyes.

Figure 2C:
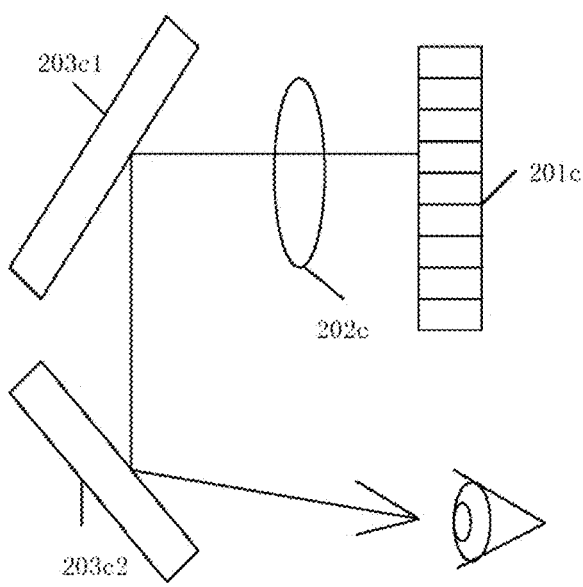

As shown in FIG. 2c, the light emitted from the light source 201c undergoes refractive magnification through the lens 202c, and then is reflected by the mirror 203c1 and the mirror 203c2 to become axial light to enter the human eyes.

Figure 2D:
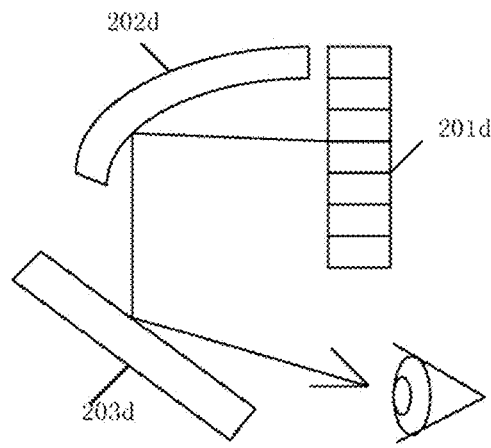

As shown in FIG. 2d, the light emitted from the light source 201d undergoes refractive amplification by the curved mirror 202d, and then is reflected by the mirror 203d to become axial light to enter the human eyes.

EXAMPLE 2

FIG. 3a to FIG. 3f are schematic structural views of the radial reflection unit in the thin near-to-eye display device with a large field of view angle according to the second embodiment of the present application.

In this embodiment, the light emitted by the light source is reflected into axial light, and then is subjected to refractive amplification by a transmissive diopter or a reflective optical system, so that human eyes can see it clearly.

The transmissive diopter includes convex lens, Fresnel lens, diffractive lens, polarization selective lens, etc.

The reflective optical system comprises a spherical minor, an aspheric mirror, a free-form surface mirror and the like.

Figure 3A:
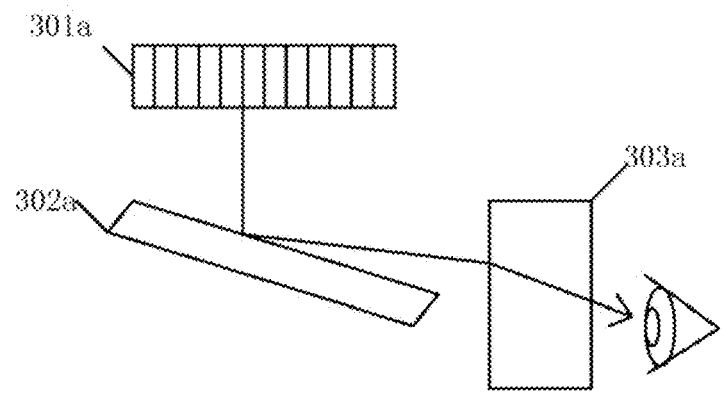
FIG. 3a to FIG. 3f are schematic structural views of the radial reflection unit in the thin near-to-eye display device with a large field of view angle according to a second embodiment of the present application.

As shown in FIG. 3a, the light emitted from the light source 301a enters the transmissive diopter 303a after being reflected by the reflecting mirror 302a, and enters the human eye after being refracted by the transmissive diopter 303a.

Figure 3B:
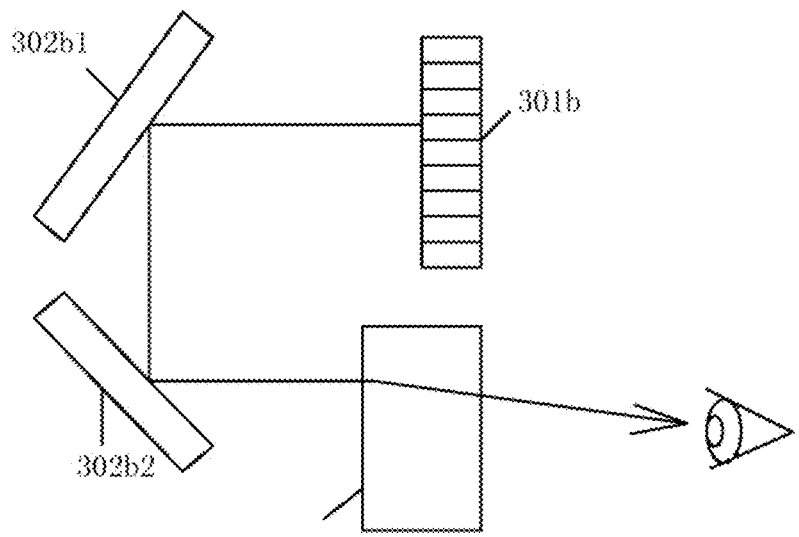

As shown in FIG. 3b, the light emitted from the light source 301b is reflected by the reflecting mirror 302b1 and the reflecting mirror 302b2, and enters the transmissive diopter 303b, and then enters the human eye through the refractive amplification of the transmissive diopter 303b.

Figure 3C:
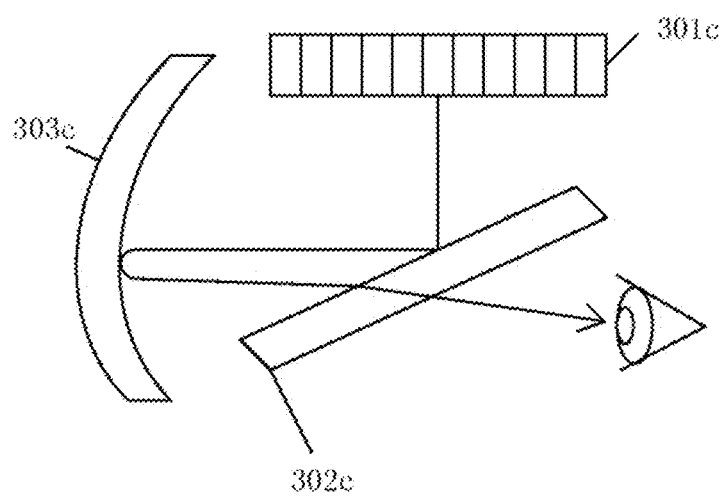

As shown in FIG. 3c, the light emitted from the light source 301c enters the curved mirror 303c after being reflected by the minor 302c, and enters the human eye after being reflected and refracted by the curved minor 303c.

Figure 3D:
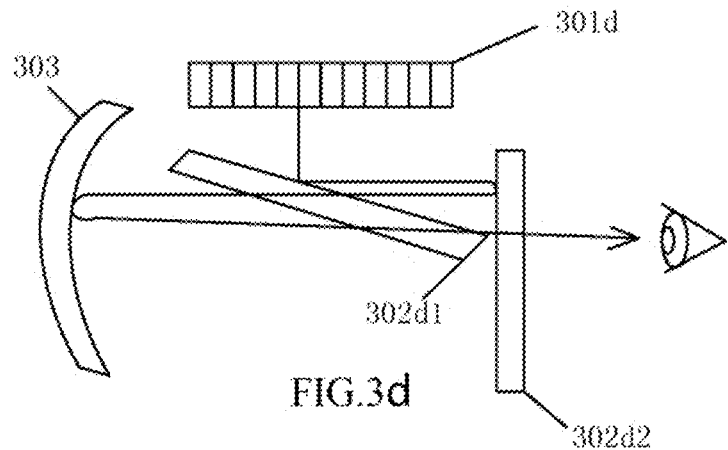

As shown in FIG. 3d, the light emitted from the light source 301d enters the curved mirror 303 through half reflection of the mirror 302d1 and selective reflection of the mirror 302d2 for reflection and refractive amplification, and finally enters the human eye through selective transmission of the mirror 302d2.

Figure 3E:
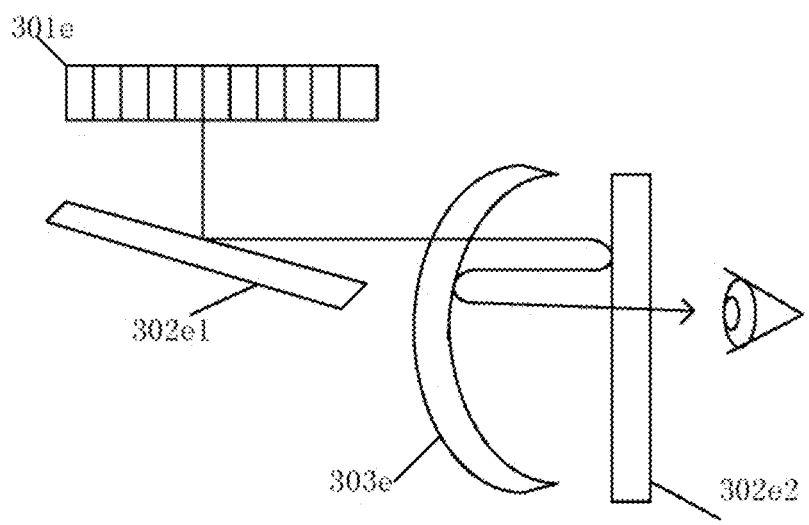

As shown in FIG. 3e, the light emitted from the light source 301e is semi-reflected by the mirror 302e1, transmitted by the curved mirror 303e and selectively reflected by the mirror 302e2, and finally reflected and refractive amplified by the curved mirror 303e again, and finally selectively transmitted by the mirror 302e2 into the human eyes.

Figure 3F:
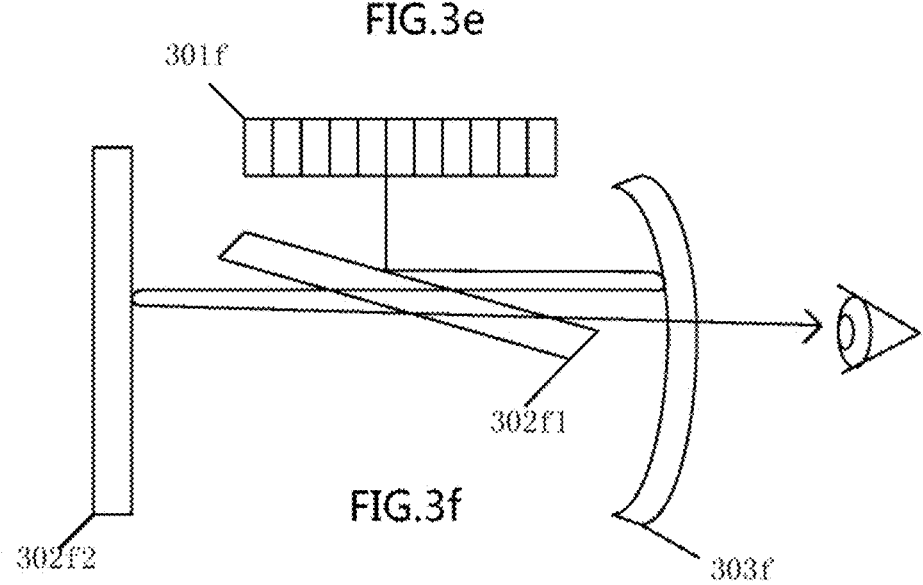

As shown in FIG. 3f, the light emitted from the light source 301f passes through half reflection of the mirror 302f1, selective reflection and refractive amplification of the curved mirror 303f, transmission of the mirror 302f1 and reflection of the mirror 302f2, and finally transmission of the mirror 302f1 and selective transmission of the curved mirror 303f, and then enters human eyes.

In FIGS. 3d-3f, the reflector 302d2, the reflector 302e2 and the curved reflector 302f are all selective light transmitters, and the light have undergone three reflections and several transmissions before finally entering the human eyes. In order to limit the light to run according to the predetermined light path, a special multi-reflection structure is needed to realize selective light transmission. For the specific implementation method, please refer to Example 3.

EXAMPLE 3

FIGS. 4a-4f and FIGS. 5a-5g are schematic structural views of the multi-reflection structure of the radial reflection unit and the thin near-to-eye display device with a large field of view angle using the multi-reflection structure according to the third embodiment of the present application.

FIGS. 4a-4f show some multi-reflection structures that may be adopted by the radial reflection unit; FIGS. 5a-5g show some other combinations of multi-reflection structures.

In this embodiment, the radial reflection unit is a multi-reflection radial reflection unit, and the light emitted by the light source is reflected twice or more in the process of becoming the final outgoing light, and finally enters the human eye.

In this embodiment, a plurality of reflection surfaces and/or polarizers and/or even transmitters, and/or polarization transmitters, and/or polarization changing reflectors and/or polarization changers are used to realize multi-reflections of light.

In this embodiment, the unmarked components in FIGS. 4a-4f and 5a-5g are reflectors (or semi-reflectors), and the reflectors in this embodiment are mirrors.

Figure 4A:
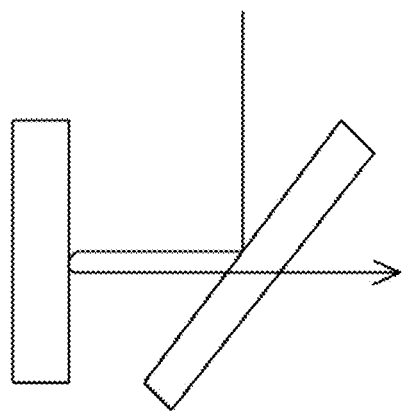
FIG. 4a to FIG. 4f and FIGS. 5a-5g are schematic structural views of the multi-reflection structure of the radial reflection units and the thin near-to-eye display device with a large field of view angle using the multi-reflection structure according to a third embodiment of the present application.
Figure 4B:
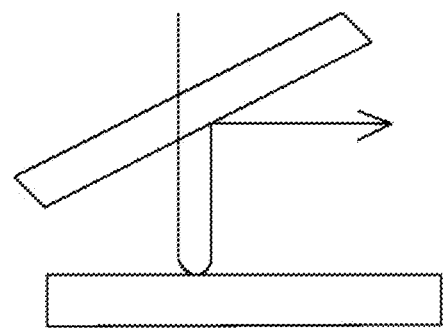
Figure 4C:
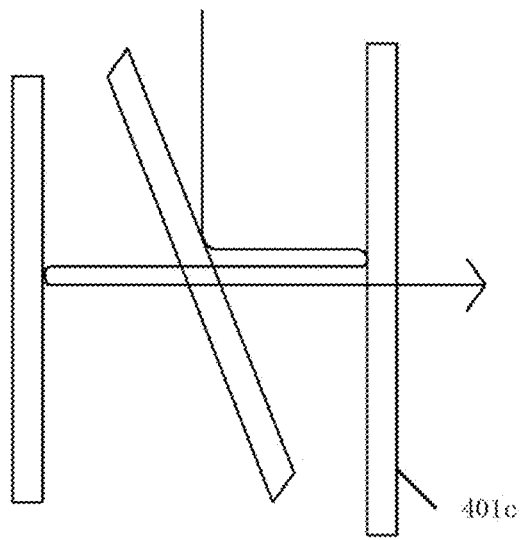
Figure 4D:
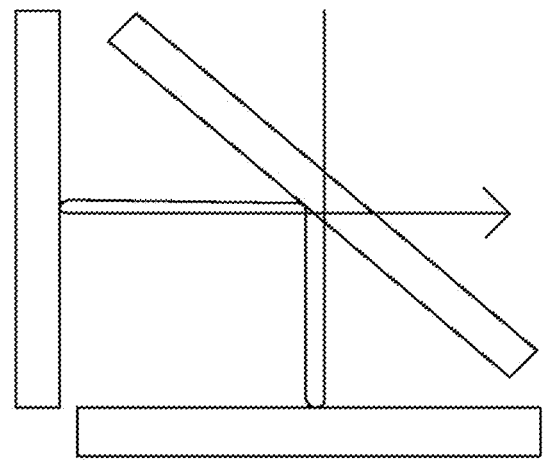
Figure 4E:
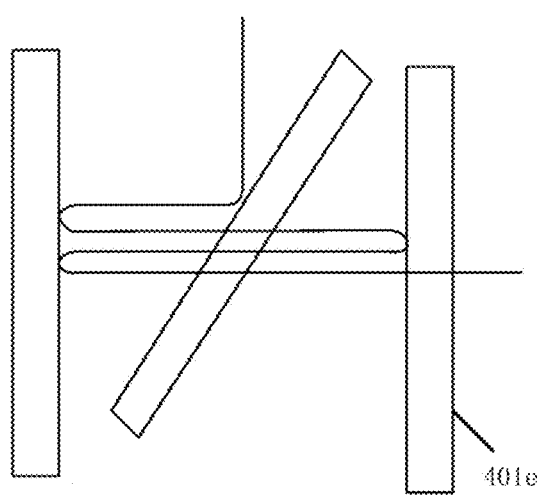
Figure 4F:
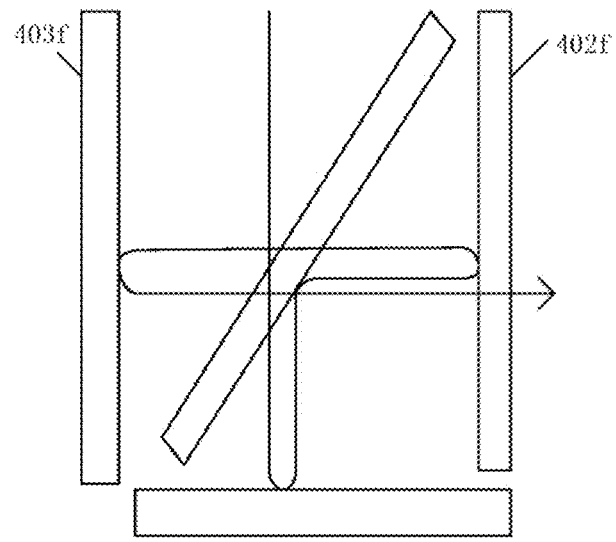

FIG. 4a and FIG. 4b are secondary reflection structures, FIG. 4c and FIG. 4d are tertiary reflection structures, and FIG. 4e and FIG. 4f are quaternary reflection structures.

In FIG. 4c and FIG. 4e, an even-order transmitter 401c and an even-order transmitter 401e are respectively provided, wherein the even-order projector is a four-layer composite structure composed of a quarter-wave plate, a semi-reflective film, a quarter-wave plate and a linear polarizer. When linearly polarized light with a certain property enters the even transmitter for the first time, it cannot be transmitted but can only be reflected. When the reflected light is reflected for the second time and then enters the even transmitter, it can pass through. With this similar structure, the selective light transmittance required in Embodiment 2 can also be realized.

In FIG. 4f, a polarization transmitter 402f and a polarization changing reflector 403f are provided, wherein the polarization transmitter 402f is a two-layer composite structure composed of a semi-reflective film and a linear polarizer.

The polarization changing reflector 403f is a two-layer composite structure composed of a polarization changer and a reflective film. When linearly polarized light with a certain property enters the polarization transmitter for the first time, it cannot be transmitted and can only be reflected; and when the reflected light is reflected by the polarization changing reflector and then enters the polarization transmitter, it can pass through. With this similar structure, the selective light transmittance required in Embodiment 2 can also be realized.

The polarization changer can be any device that can change or destroy the original polarization state of light, such as scattering film, diffraction film, anisotropic film, depolarization film, quarter-wave plate, half-wave plate, full-wave plate, etc.

Similarly, in FIG. 4c, the same polarization transmitter and polarization changing reflector as in FIG. 4f can be used to achieve the three-reflection effect.

In the above six schemes shown in FIGS. 4a-4f, the reflecting structure has experienced two, three or four reflections in the process of converting radial rays into final outgoing rays. There are more application examples of generating multi-reflections by setting different reflection surfaces, which will not be repeated here.

Through more than one reflection, the propagation distance of light before emitting can be extended to meet different optical structure requirements.

Figure 5A:
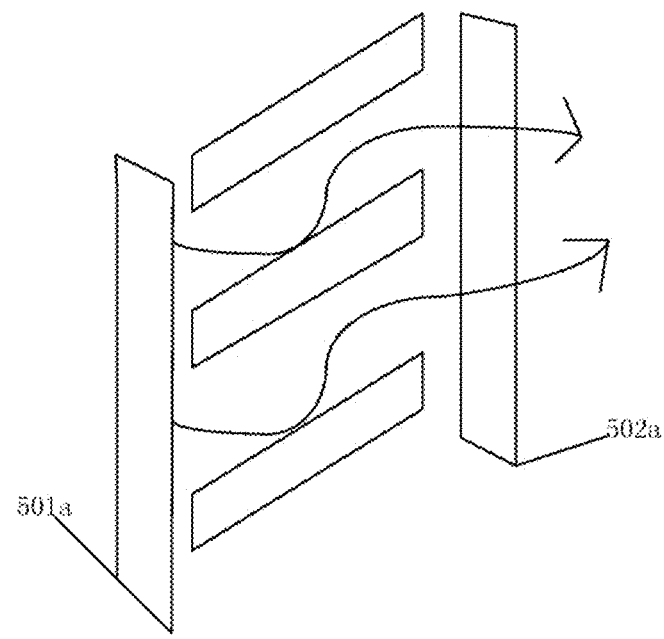
Figure 5B:
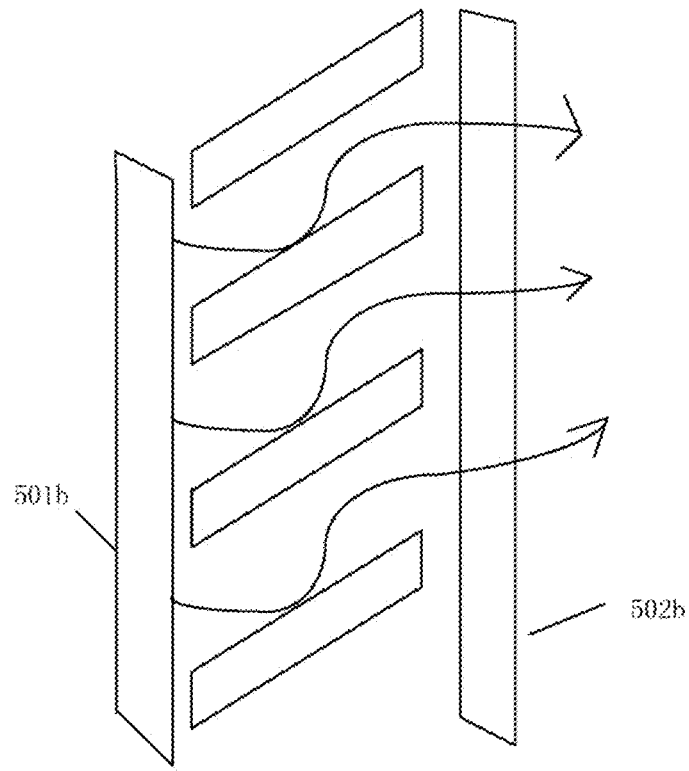
Figure 5C:
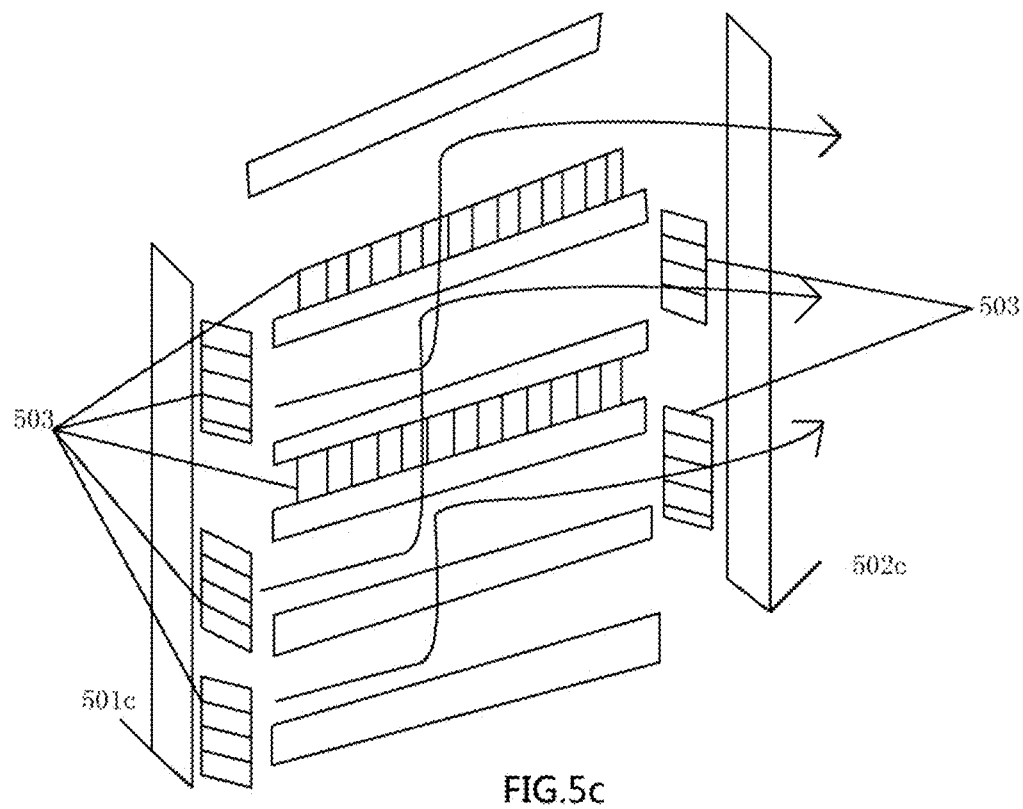

FIG. 5a, FIG. 5b and FIG. 5c are a combination of multiple secondary reflection structures. The light propagation distance is prolonged by two times, so that the near-to-eye display effect is realized under the thickness of half the focal length.

As shown in FIG. 5a, the light emitted by the light source 501a passes through two secondary reflection structures, enters the near-to-eye refractive component 502a, and passes through the refractive magnification of the near-to-eye refractive component 502a to enter the human eye.

As shown in FIG. 5b, the light emitted by the light source 501b enters the near-to-eye refractive component 502b through the optical path formed by the three secondary reflection structures, and enters the human eye after the refractive amplification of the near-to-eye refractive component 502b.

As shown in FIG. 5c, the light emitted by the light source 501c enters the near-to-eye refractive component 502c through a plurality of secondary reflection structures, and enters the human eye through refractive amplification of the near-to-eye refractive component 502b. In FIG. 5c, a plurality of polarizers 503 are adopted to ensure that the optical paths do not interfere with each other. The light emitted from 501c passes through three polarizers 503 and is processed into a light with a specific polarization state (linear polarization or circular polarization). After that, the light can only pass through the polarizer 503 compatible with its own polarization state, but cannot pass through the polarizer 503 opposite to its own polarization state. Therefore, the three light beams are reflected twice and have the same optical path length, and finally enter 502c.

Figure 5D:
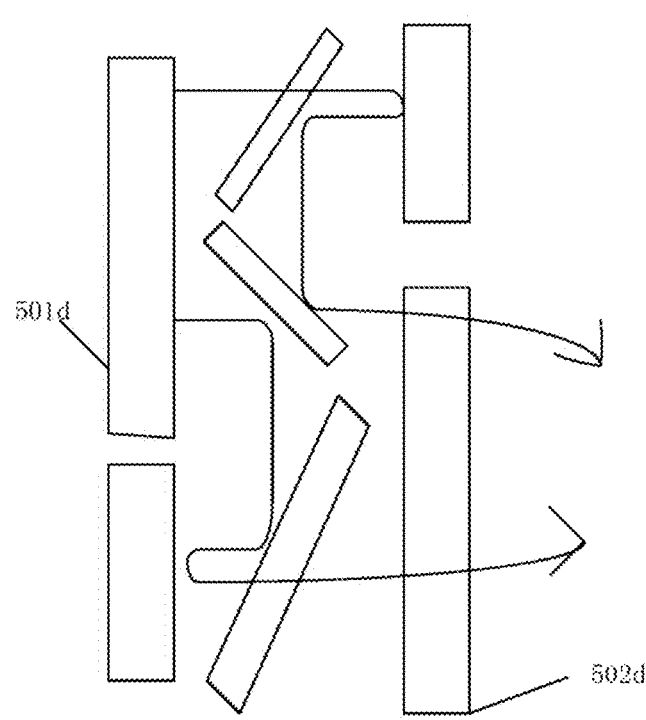

In FIG. 5d, two tertiary reflection structures are combined. The light propagation distance is prolonged by three times, so that the near-to-eye display effect is realized under the thickness of one third of the focal length.

As shown in FIG. 5d, the light emitted by the light source 501d enters the near-to-eye refractive component 502d after passing through two tertiary reflection structures, and enters the human eye after being refracted and amplified by the near-to-eye refractive component 502d.

Figure 5E:
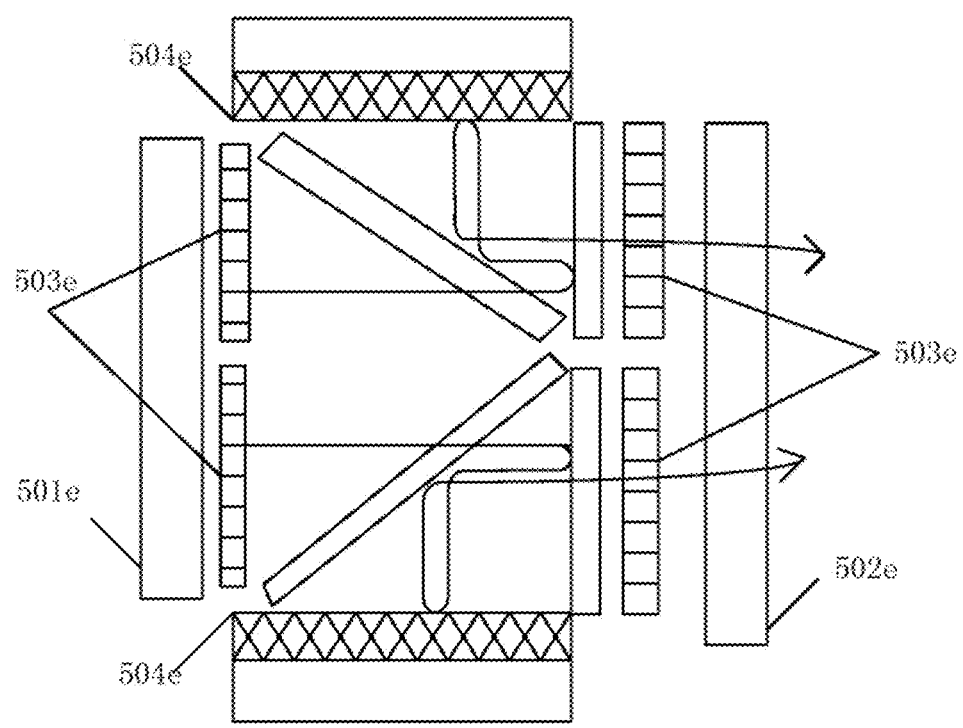
Figure 5F:
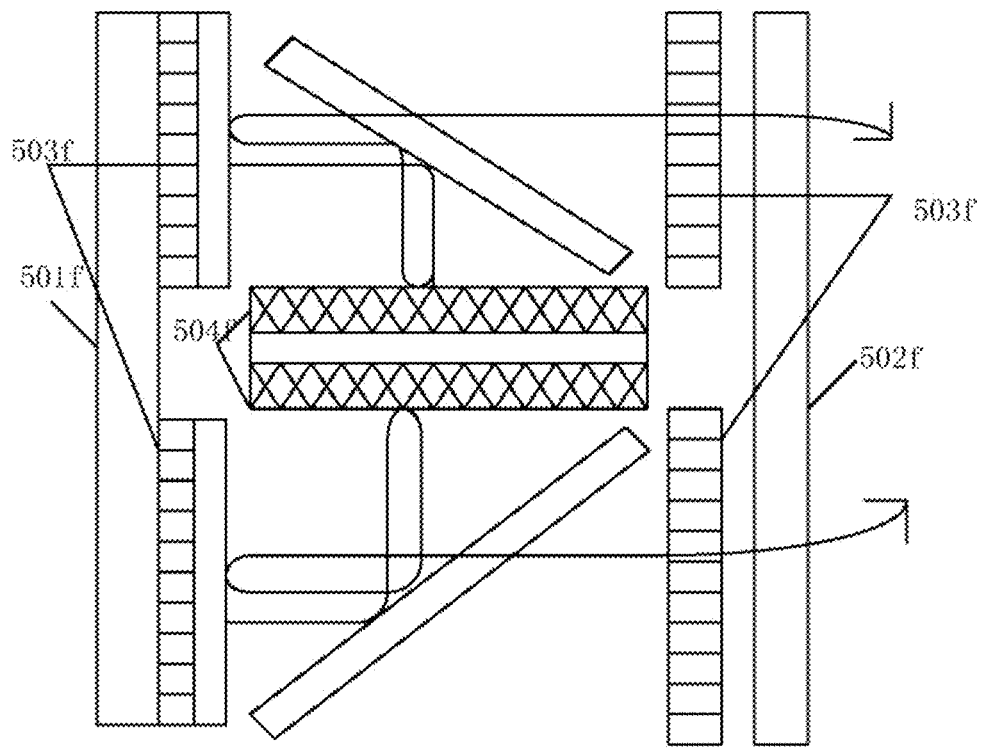

In FIG. 5e and FIG. 5f, two fourth reflection structures are used for combination. Polarizer and polarization changer are used to ensure that the light will not overflow before four reflections. The light propagation distance is prolonged by three times, so that the near-to-eye display effect is realized under the thickness of one third of the focal length.

As shown in FIG. 5e, the light emitted by the light source 501e enters the near-to-eye refractive component 502e after passing through two four-time reflection structures, and enters the human eye after being refracted by the near-to-eye refractive component 502e. In FIG. 5e, a polarizer 503e and a polarization changer 504e are provided to ensure that the light will not overflow before the four-time reflection is completed. The light emitted from 501e passes through polarizer 503e and is processed into a light with a specific polarization state (linear polarization or circular polarization). This light cannot pass through polarizer 503e near the near-to-eye refractive component 502e (because its polarization state is opposite), but can only be reflected and then pass through polarization changer 504e. After that, the polarization of the light is changed and can pass through polarizer 503e near the near-to-eye refractive component 502e.

As shown in FIG. 5f, the light emitted by the light source 501f enters the near-to-eye refractive component 502f after passing through two four-time reflection structures, and then undergoes refractive amplification by the near-to-eye refractive component 502f to enter the human eye, in FIG. 5f, a polarizer 503f and a polarization changer 504f are provided to ensure that the light will not overflow before the four-time reflection is completed.

Figure 5G:
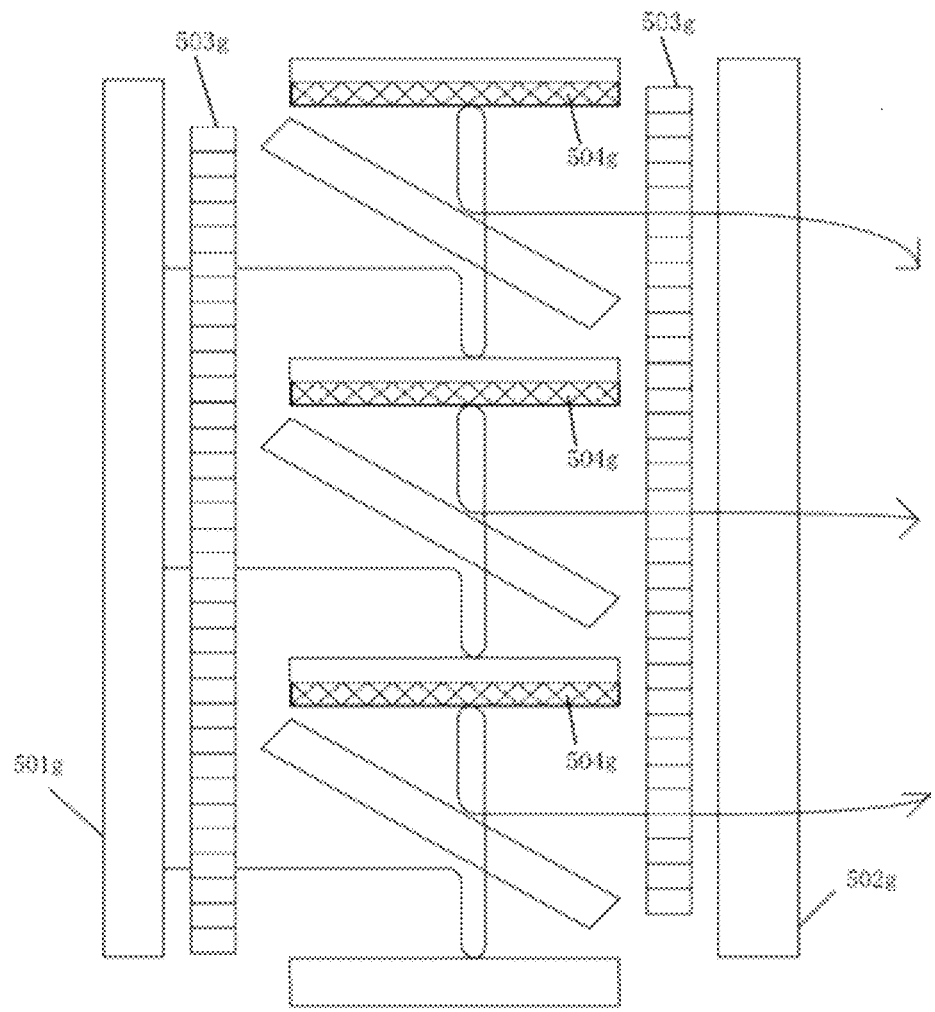

In FIG. 5g, three fourth-reflection structures are combined. The light propagation distance is prolonged by three times, so that the near-to-eye display effect is realized under the thickness of one third of the focal length.

As shown in FIG. 5g, the light emitted by the light source 501g enters the near-to-eye refractive component 502g after passing through three four-time reflection structures, and then undergoes refractive amplification by the near-to-eye refractive component 502g to enter the human eyes. In FIG. 5g, a polarizer 503g and a polarization changer 504g are provided to ensure that the light will not overflow before the four-time reflection is completed.

In FIGS. 5a-5g, the near-to-eye refractive components are all transmissive refractive components, which can be a single lens, a plurality of lenses spliced together, a composite structure composed of multilayer lenses, or a composite structure composed of multilayer reflective layers and refractive layers.

In some cases, the near-to-eye refractive component can be a multi-optical axis composite lens spliced by a plurality of sub-lenses with different optical axes and/or focal lengths. One or more sub-lenses correspond to a specific optical path, and the light of each optical path is refracted by a specially set sub-lens and then enters the human eye, which can achieve better splicing display effect; or a small lens (or a plurality of small lenses) can be arranged at the exit of each optical path channel to perform primary refraction, and then a complete large lens at the rear end performs secondary refraction, and these small lenses and large lenses together form a lens array type multi-optical axis near-to-eye refractive component, and the light enters the human eye after being refracted twice, so that a better splicing display effect can be achieved.

In some cases, the near-to-eye refractive component can also be a reflective refractive device, which can refract and turn back the light and then inject it into the human eye.

Similar to the situation shown in FIG. 5a and FIG. 5c, the near-to-eye refractive component can be a free curved minor, which can refract and reflect light and finally enter the human eyes. In particular, the surface of the free-form curved minor is provided with a polarization changer, so that the light path will not be blocked by the polarizer after being folded back.

EXAMPLE 4

In this embodiment, a plurality of radial reflection units project respective sub-images from different directions from the side, which is spliced into a complete image on the retina of human eyes.

In this embodiment, a light source represents a radial reflection unit, and the specific structure of the radial reflection unit is not embodied in this embodiment.

I. Two Radial Reflection Units

Figure 6:
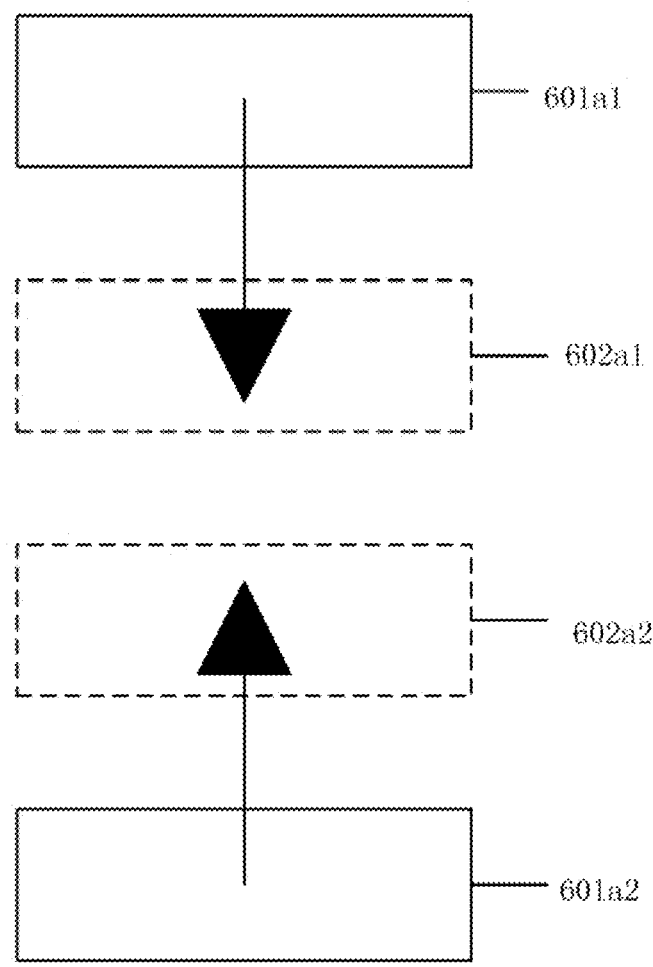

FIG. 6 shows that the two radial reflection units of this embodiment project respective sub-images from different directions from the side, which is spliced into a complete image on the retina of human eyes.

As shown in FIG. 6, two radial reflection units project sub-images from the upper and lower directions, which are spliced into a complete image on the retina of human eyes.

II. Three or More Radial Reflection Units

There are three types of structural forms of three or more radial reflection units:

A pyramid type, B turbine type, C wave type

Figure 8A:
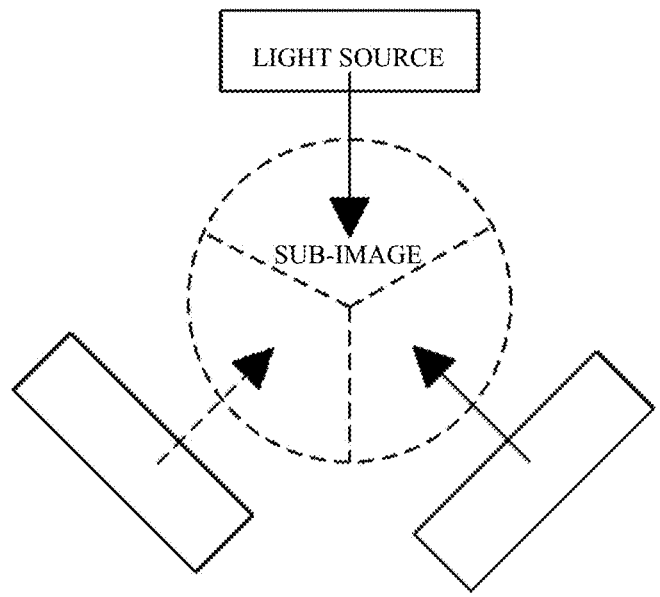
Figure 8B:
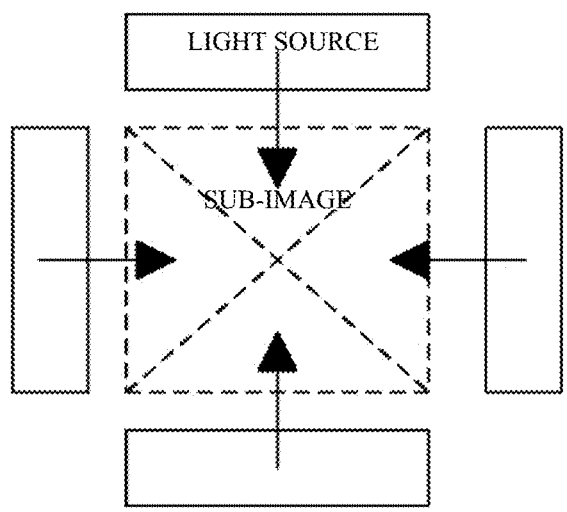

FIG. 7a1 and FIG. 7a2 show the structural form of the prismatic radial reflection unit of this embodiment. FIGS. 7a1 and 7a2 include six radial reflection units, and may also include n (n is greater than 2) radial reflection units, such as three radial reflection units or four radial reflection units, as shown in FIGS. 8a to 8b.

Figure 9:
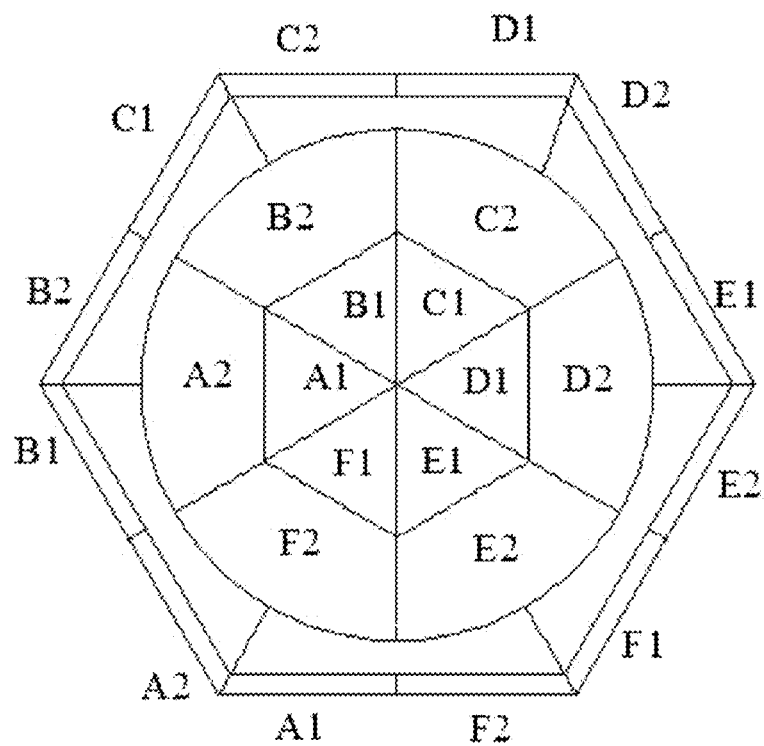

FIG. 7b1 and FIG. 7b2 show the structural form of the turbine radial reflection unit of this embodiment. FIG. 7b1 and FIG. 7b2 include 6 radial reflection units, and may also include n (n is greater than 2) radial reflection units, for example, including 12 radial reflection units. As shown in FIG. 9, 12 light sources are used to project 12 sub-images through 6 reflection surfaces arranged in a turbine manner. The same numbered light sources and sub-images in the FIG. correspond to each other and do not interfere with each other.

Figure 10A:
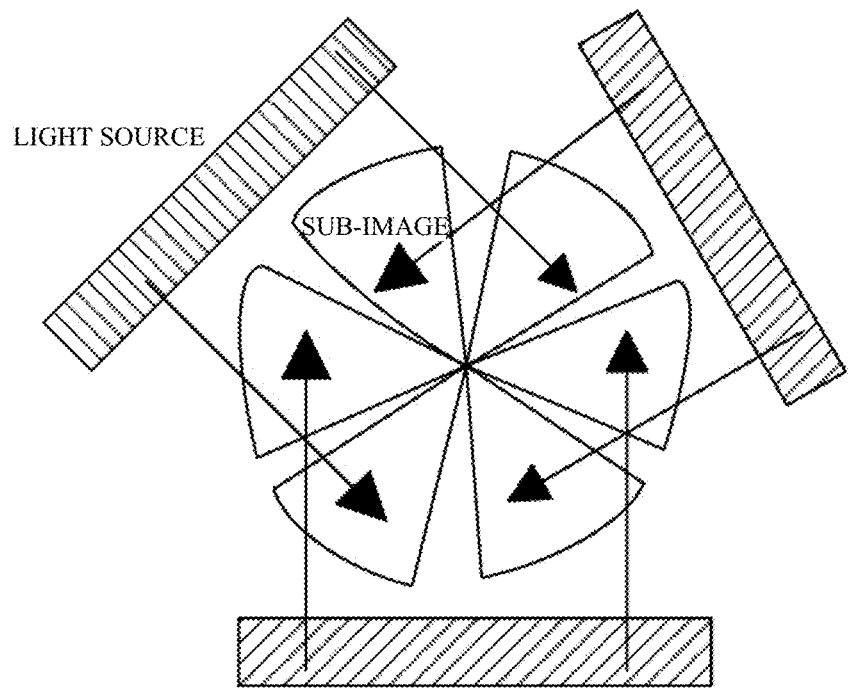
Figure 10B:
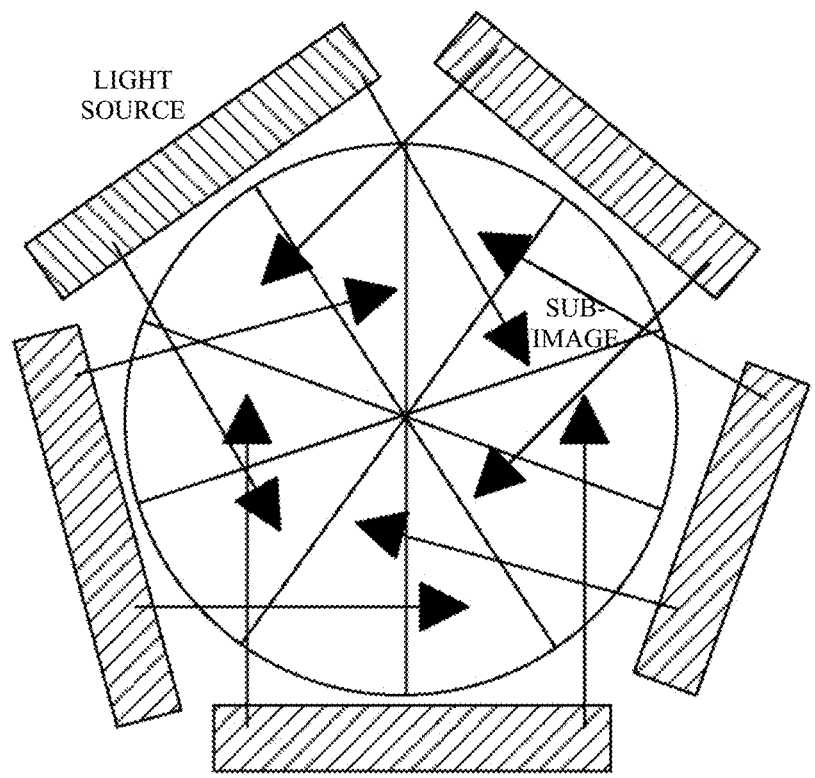
Figure 10C:
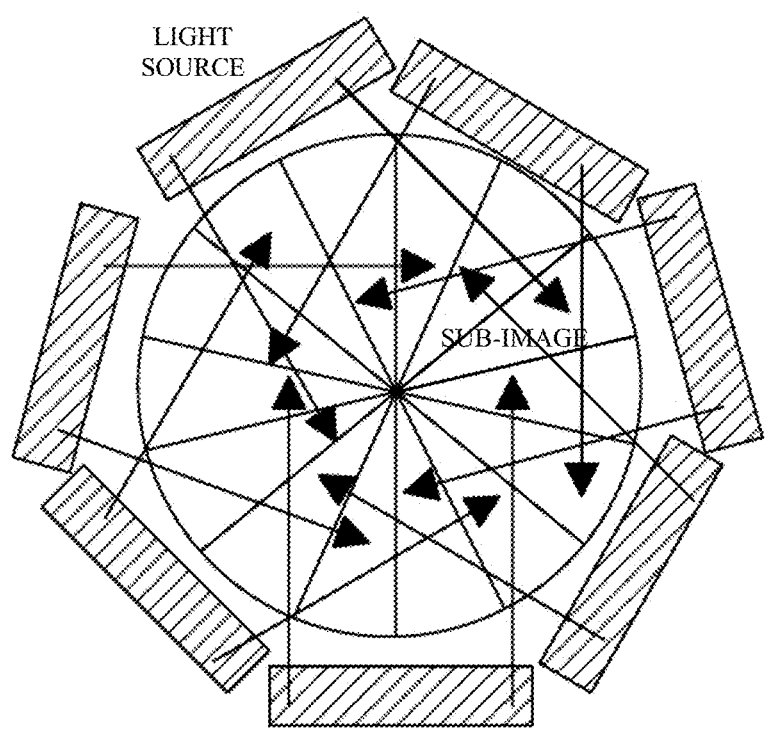

FIG. 7c1 and FIG. 7c2 show the structural form of the wave-type radial reflection unit of this embodiment. FIG. 7c1 and FIG. 7c2 include six radial reflection units, each of which is a group, and may also include n (n is greater than 2) radial reflection units, such as three groups of radial reflection units, five groups of radial reflection units and seven groups of radial reflection units, as shown in FIG. 10a to FIG. 10c. A plurality of sub-images are projected by using a plurality of light sources through a plurality of corresponding reflection surfaces arranged in waves.

Figure 11A:
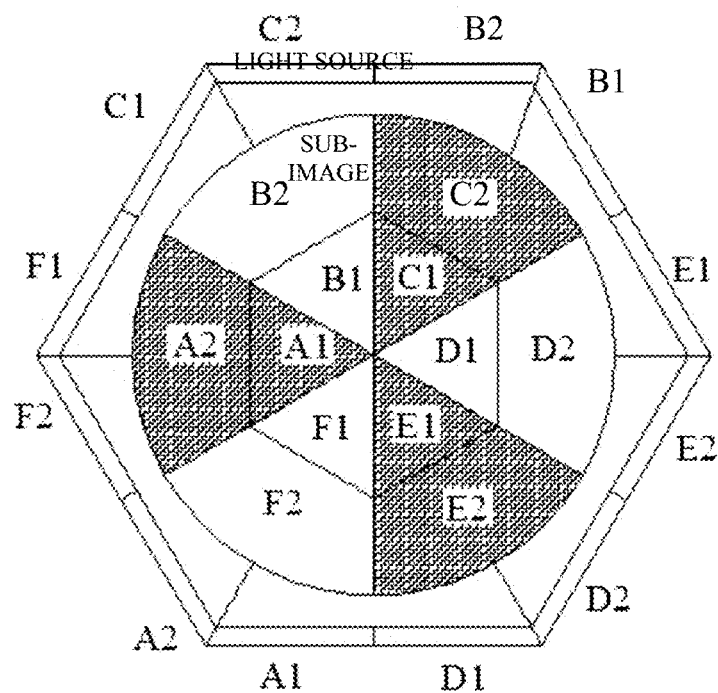
Figure 11B:
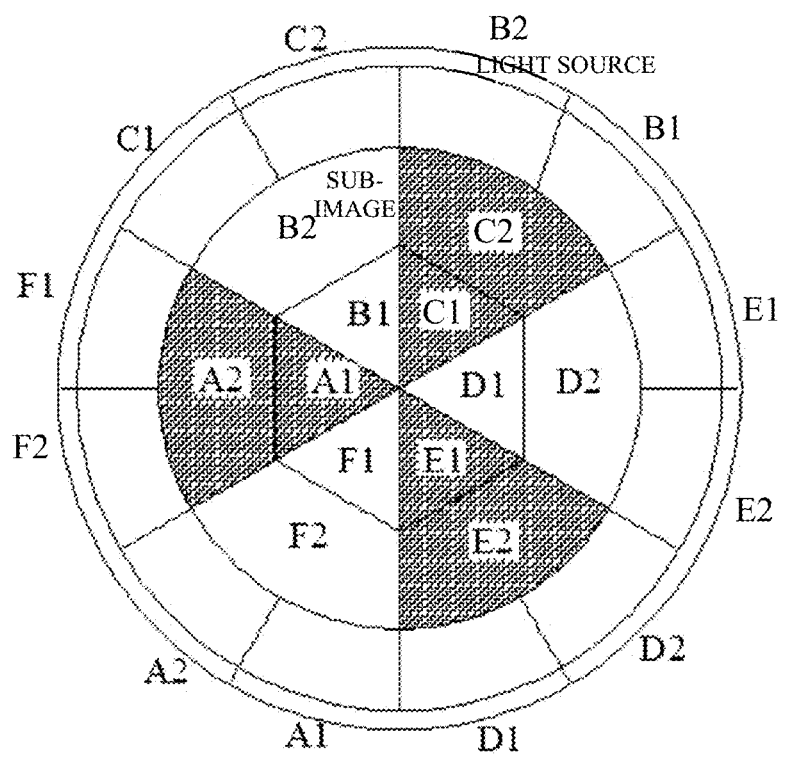

FIGS. 11a-11b show another embodiment of wave arrangement, in which the surrounding light sources are reflected by six reflection surfaces arranged in wave arrangement. As shown in FIG. 11a, the light source can be divided into 12 blocks arranged in a hexagon, or as shown in FIG. 11b, an annular light source can be adopted The same numbered light sources and sub-images in the FIG. correspond to each other and do not interfere with each other.

Particularly, in FIGS. 10a-10c, a plurality of surrounding light sources can be connected into a circle to become a complete annular light source.

Among them, the optical path lengths of each radial reflection unit in FIG. 7a1, FIG. 7a2, FIG. 7b1, FIG. 7b2, FIG. 7c1 and FIG. 7c2 are consistent, and the same near-to-eye refractive component (transmissive near-to-eye refractive component or reflective near-to-eye refractive component) can be shared at the end, so that human eyes can see it clearly. Especially, when the near-to-eye refractive component is a transmissive refractive component, it can be a single lens, or a composite structure composed of multiple lenses, or a composite structure composed of multiple reflective layers and refractive layers. When the near-to-eye refractive component is a reflective refractive component, it can be a single curved mirror, a plurality of curved mirrors spliced together, or a composite structure composed of multiple reflective layers and refractive layers.

Figure 12:
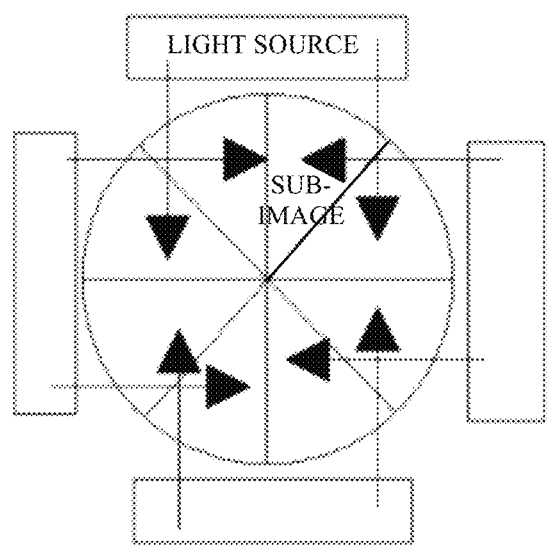

FIG. 12 shows another embodiment in which a plurality of radial reflection units project respective sub-images from different directions from the side and splice it into a complete image on the retina of human eyes. Four radial reflection units and eight corresponding reflection surfaces are adopted to project eight sub-images.

I. For a Plurality of Radial Reflection Units, the Method for Processing Stray Light When multiple radial reflection units are used, the light emitted by the light source may be reflected by other reflection surfaces while being reflected by corresponding reflection surfaces. If these erroneously reflected light finally enters the human eye, it will form stray light. Therefore, it is necessary to take corresponding measures to cut off the stray light. There are three solutions, as shown in FIG. 13a to FIG. 13c.

Figure 13A:
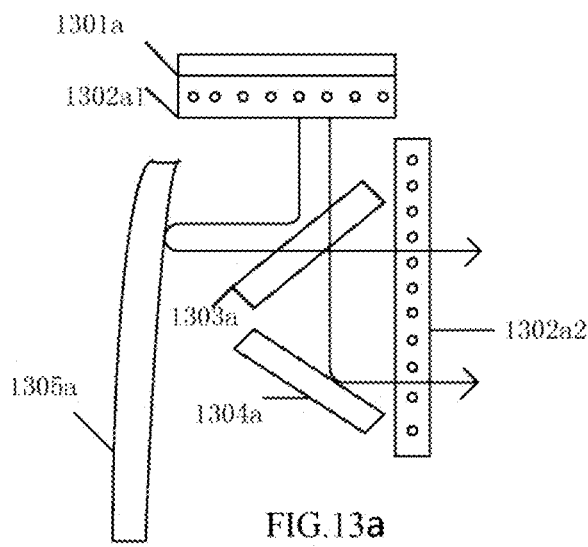

As shown in FIG. 13a, an elliptical polarizer 1302a2 (specially, a circular polarizer can be used) is arranged at the light source 1301a, and the light is processed into elliptically polarized light (or circularly polarized light), which is reflected by the correct reflection surface 1303a and then reflected by the secondary reflection surface 1305a (which can be a planar reflection surface or a curved reflection surface). Since the light has been reflected twice, its polarization state can just pass through the elliptical polarizer 1302a2 (specially, a circular polarizer can be used) arranged in the exit direction. However, after the light is reflected by the wrong reflecting surface 1304a, the polarization state of the light cannot pass through the elliptical polarizer 1302a2, so no stray light will be generated.

Figure 13B:
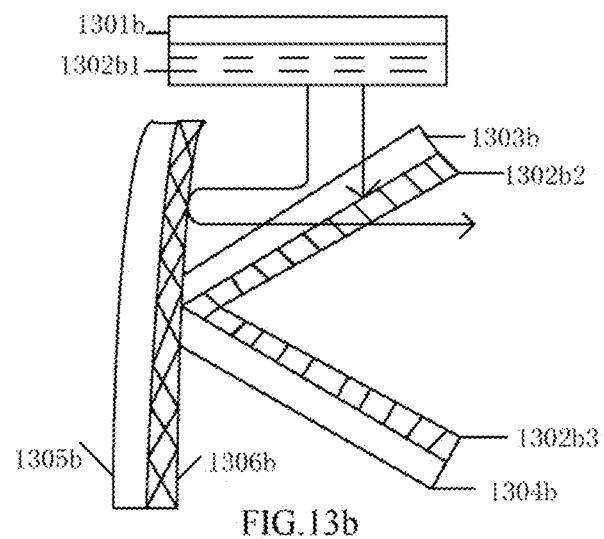

As shown in FIG. 13b, at the light source 1301b, a linear polarizer 1302b1 is provided to process light into linearly polarized light. In particular, the light emitted by the light source itself is a kind of linearly polarized light. The linearly polarized projected light enters the correct reflection surface 1303b to generate transmitted light and reflected light. The polarization of the transmitted light is perpendicular to that of the linear polarizer 1302b2, which is blocked and will not be directed to the wrong reflection surface 1304b, so that stray light will not be generated. The reflected light passes through the polarization changer 1306b (which can be any device that can change or destroy the original polarization state of light, such as scattering film, diffraction film, anisotropic film, depolarization film, quarter-wave plate, half-wave plate, full-wave plate, etc.), and then is reflected by the secondary reflection surface 1305b, and then passes through the polarization changer 1306b. At this time, the polarization of the light has changed, so it can pass through the linear polarizer 1302b2 and finally enter the human eyes.

Figure 13C:
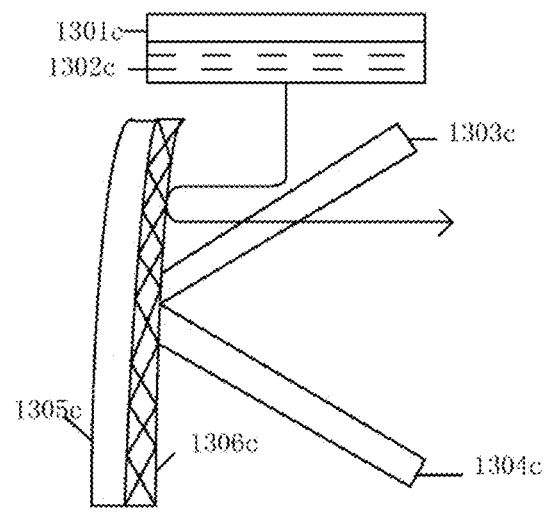

At the light source 1301c, as shown in FIG. 13c, a linear polarizer 1302c is provided to process light into linearly polarized light. In particular, the light emitted by the light source itself is a kind of linearly polarized light. The projected light in linearly polarized state enters the correct reflection surface 1303c, which is a polarization beam splitter in this scheme.

The characteristic of polarizing beam splitter is that it completely reflects light with certain polarization states and completely transmits light with certain polarization states.

The projected light in linear polarization state is only reflected on the surface of the correct reflection surface 1303c, but not transmitted, and cannot be projected to the wrong reflection surface 1304c, so stray light will not be generated,On the other hand, the polarization of the reflected light changes after passing through the polarization changer 1306c, so it can pass through the correct reflection surface 1303c and enter the human eye.

EXAMPLE 5

In this embodiment, a plurality of radial reflection units project respective sub-images from the side from the same direction, which is spliced into a complete image on the retina of human eyes. In order to prevent the interference of light between the radial reflection units, each light source can emit light with different polarization states, and then the light of different radial reflection units can be isolated separately by polarization selector.

Wherein the polarization selector comprises various polarization filters such as linear polarizers or polarization splitters.

In this embodiment, a light source represents a radial reflection unit, and the specific structure of the radial reflection unit is not embodied in this embodiment.

Figure 14:
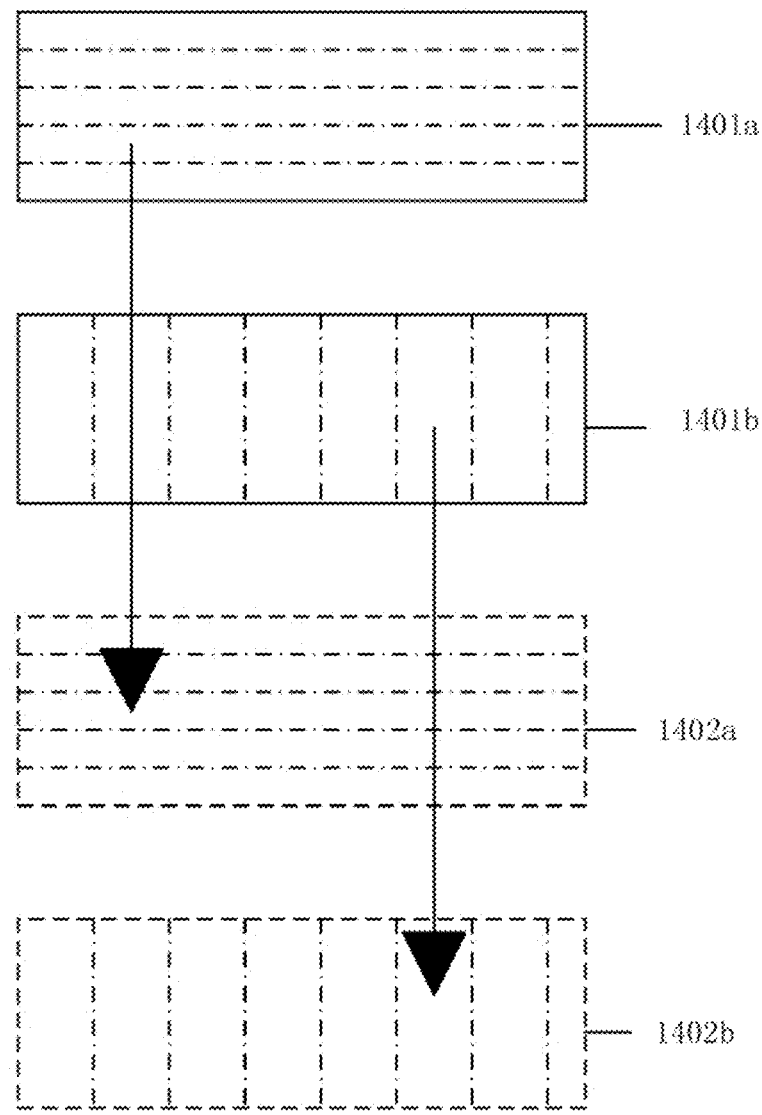
FIG. 14 to FIG. 16a-d are schematic structural diagrams of a thin near-to-eye display device with a large field of view angle according to a fifth embodiment of the present application.

FIG. 14 shows that a plurality of radial reflection units in this embodiment project respective sub-images from the side in the same direction. As shown in FIG. 14, the radial reflection unit 1401a and the radial reflection unit 1401b transmit from top to bottom, and project a sub-image 1402a and a sub-image 1402b from the side.

FIGS. 15a-15d and FIGS. 16a-16d are specific structural diagrams of radial reflection units in which a plurality of radial reflection units project respective sub-images from the same direction from the side.

As shown in FIGS. 15a-15d, the structures of the two radial reflection units overlap in space, and the light source end is provided with a linear polarizer 15021 and a linear polarizer 15022, so that the light emitted by the light source 15011 and the light source 15012 have different polarization states, for example, orthogonal linear polarization states.

Figure 15A:
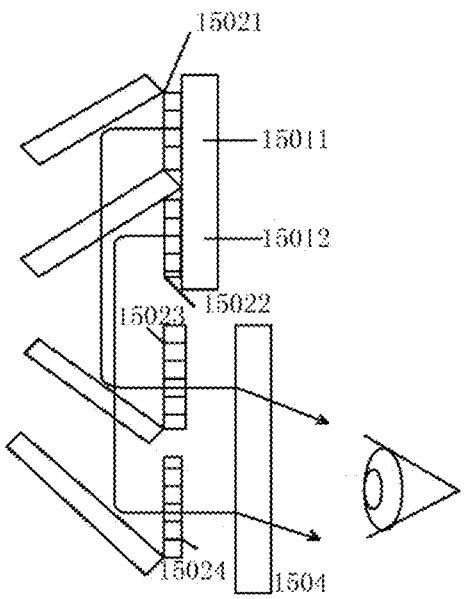

In FIG. 15a, a linear polarizer 15023 and a linear polarizer 15024 are arranged at the end of the optical path, so that the directions of the linear polarizer 15021 and the linear polarizer 15023 are consistent, so that the light emitted by the light source 15011 finally only exits through the linear polarizer 15023; In the same way, the light emitted by the light source 15012 is finally emitted only through the linear polarizer 15024. Since the lengths of the two optical paths are the same, the same transmissive refractive component 1504 can be shared, so that the human eye can see the image clearly.

Figure 15B:
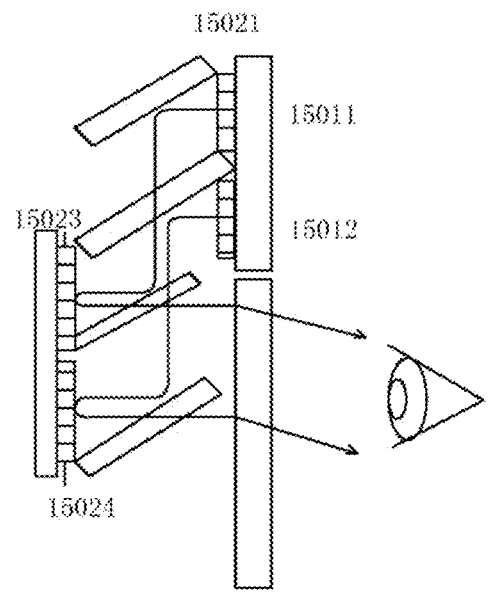

FIG. 15b is different from FIG. 15a in that the reflective structure first reflects light outward and then reflects light inward. With this structure, the whole optical path can be made longer, and the distance between the transmissive refractive component and the linear polarizer 15023 and the linear polarizer 15024 can be made longer, so as to achieve better optical effect. Because the two optical paths have the same length, they can share the same transmissive refractive component, so that human eyes can see the image clearly.

Figure 15C:
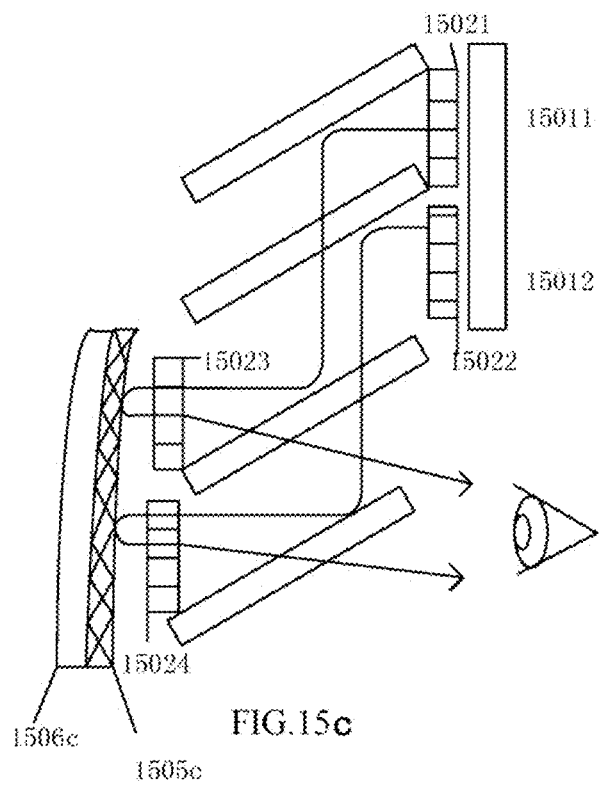

In FIG. 15c, the reflective structure first reflects the light outward and throws it at the reflective refractive component, which is a curved reflector that deflects the propagation direction of the light during refraction, In order to prevent the subsequent display effect from being affected, it is necessary to set a polarization changer 1505c on the surface of the reflective refractive component 1506c to change the existing polarization state of all the light, so that the light will not be blocked when it is reflected by the reflective refractive component to the human eye. Because the two optical paths have the same length, they can share the same reflective refractive component, so that human eyes can see the image clearly.

Figure 15D:
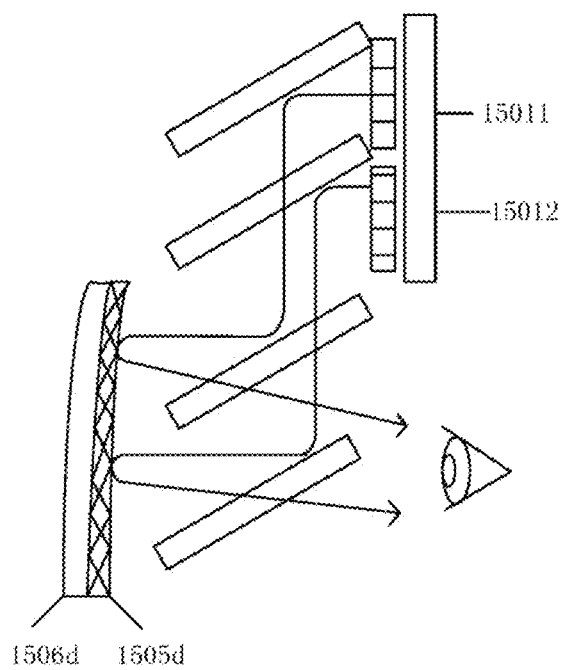

In FIG. 15d, a special polarizing beam splitter is used. As shown in the optical path of the figure, polarized light emitted by the light source 15011 can be completely reflected on its surface without transmission, and polarized light emitted by the light source 15012 can only be transmitted on its surface without reflection. On the surface of the reflective refractive component 1506d, a polarization changer 1505d is arranged to change the existing polarization state of all light, so that the light will not be blocked when reflected by the reflective refractive component to the human eye. Because the two optical paths have the same length, they can share the same reflective refractive component, so that human eyes can see the image clearly.

In the four cases shown in FIG. 15a to FIG. 15d above, two different optical paths are isolated in two vertical linear polarization directions. Similarly, two different optical paths can also be isolated in two opposite circular polarization directions. The principle is similar and will not be repeated.

FIGS. 16a-16d show several other embodiments of the arrangement of light sources, reflection surfaces and polarizers, in which light sources 16011 and 16012 are two independent light sources, with rectangles filled with lines representing polarizers and blank rectangles representing reflecting components, i.e., reflection surfaces. The specific structure is shown in the figure. It is worth noting that:

Linear polarizer is used as polarization selector at the exit, and similarly, polarization splitter can also be used for optical path isolation;

two different optical paths are isolated in two vertical linear polarization directions, and similarly, two different optical paths can also be isolated in two opposite circular polarization directions.

Because the two optical paths have the same length, they can share the same near-to-eye refractive component (transmissive refractive component or reflective refractive component), so that human eyes can see the image clearly.

Figure 16A:
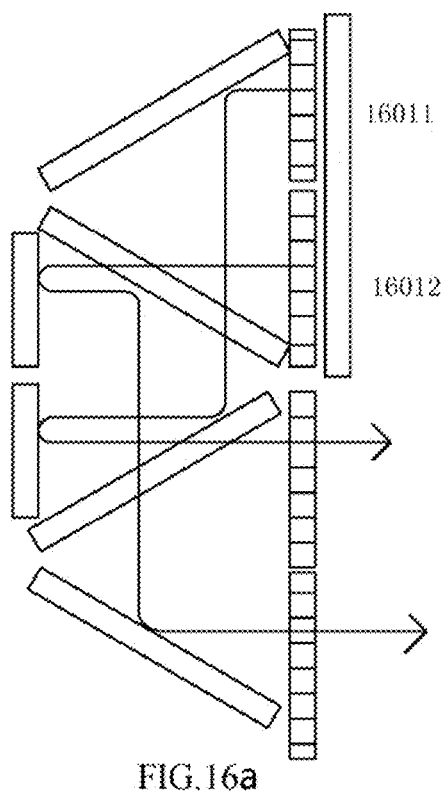
Figure 16B:
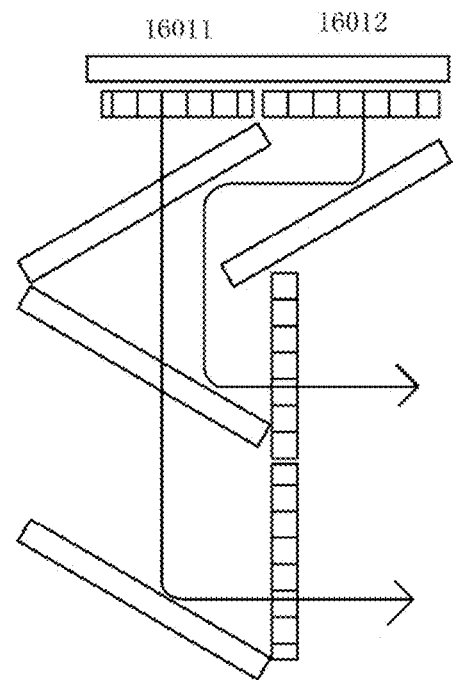
Figure 16C:
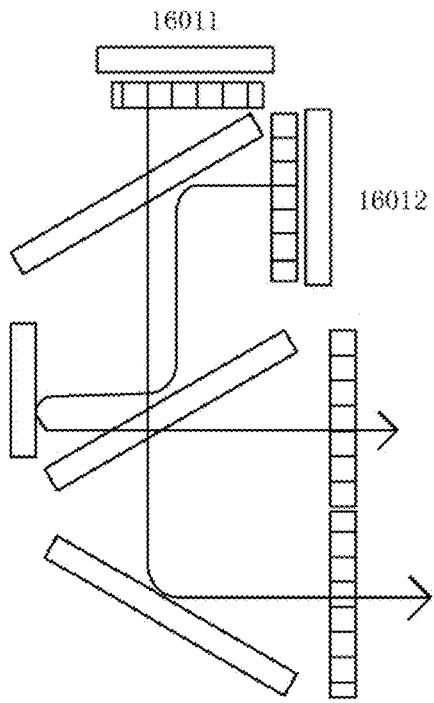

As shown in FIG. 16c, in particular, only one light source can be used to play the role of two light sources at the same time. For example, a light source is placed at the position of the light source 16011, which can emit two polarized lights with mutually perpendicular polarization directions at the same time, and these two polarized lights form two different images (in a specific scheme, two adjacent pixels on the surface of the light source can emit different polarized lights by covering the polarizer). After propagating downward, these two images enter different light paths, and finally they are spliced into a complete image on the human eye; or this light source can generate two polarized lights with mutually perpendicular polarization directions in two different time periods (specifically, a polarizer and corresponding optical channels can be placed outside the light source, and the light emitted by the light source can be processed into different polarization states at different times, such as the method illustrated in FIG. 27a and FIG. 27b, or other optical structures that can generate two polarized lights with mutually perpendicular polarization at different times are adopted), and these two polarized lights form two different images, and the two time periods are switched quickly, so that people can't notice the switching.

Figure 16D:
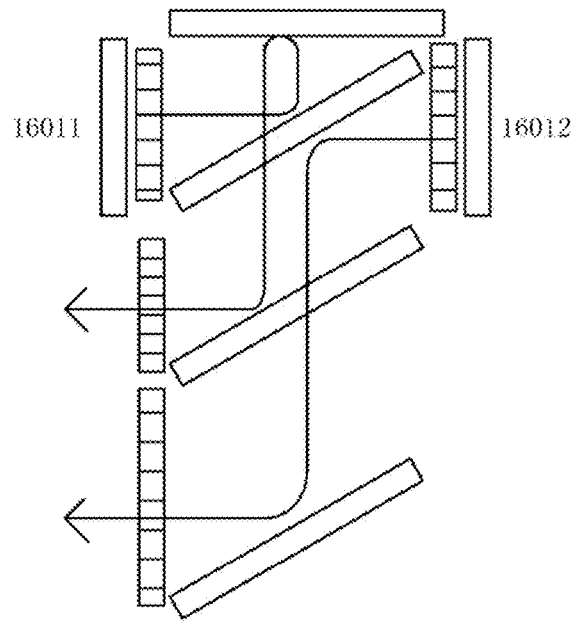

Similarly, as shown in FIG. 16d, a similar method can be adopted, and one light source can play the role of two light sources at the same time.

EXAMPLE 6

In this embodiment, a plurality of radial reflection units project respective sub-images from the side from the same direction, each radial reflection unit has an independent light source, or a plurality of radial reflection units share the same light source, In order to prevent the interference of light among the radial reflection units, a plurality of emission windows can be formed by light controllers such as transmissive light valves, reflective light valves or controllable mirrors, and only one emission window is opened in each time period to allow light to exit. Different sub-images are alternately projected by a plurality of radial reflection units in different time periods, and the length of each time period is extremely short, so that human eyes can feel a plurality of sub-images at the same time.

Figure 17A:
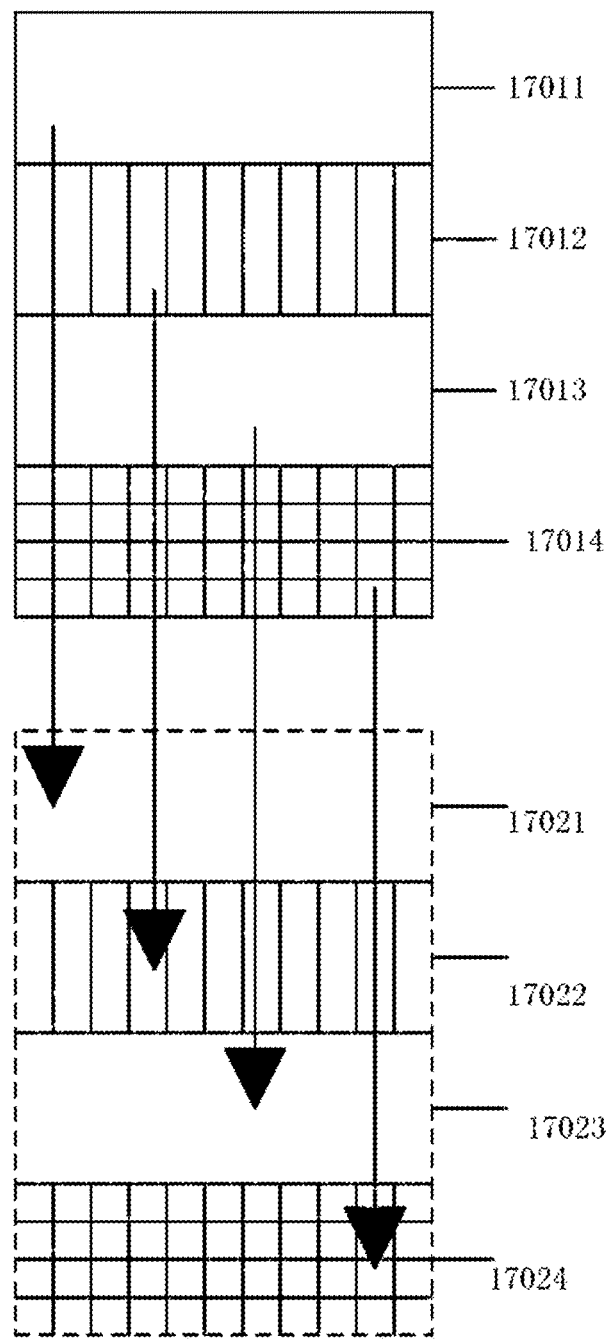
FIG. 17a-e to FIG. 30 are schematic structural views of a thin near-to-eye display device with a large field of view angle according to a sixth embodiment of the present application.
Figure 17B:
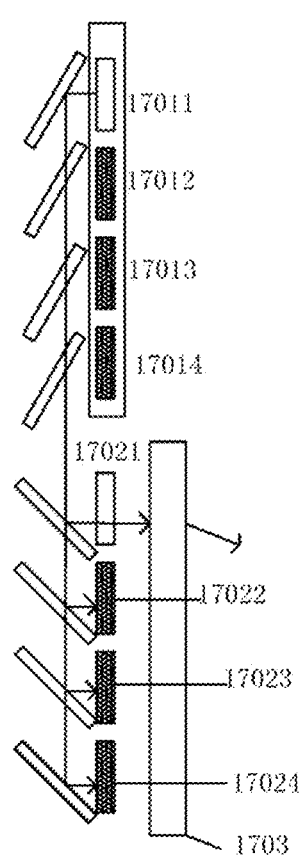
Figure 17C:
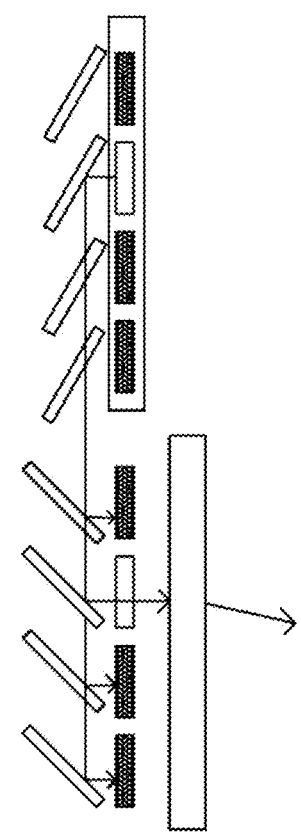
Figure 17D:
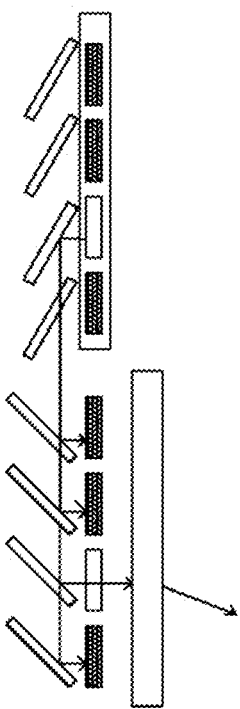
Figure 17E:
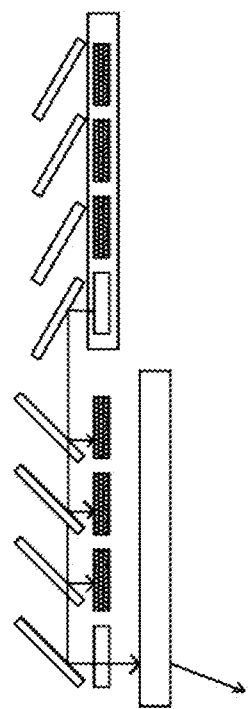

I. A Plurality of Radial Reflection Units Project Respective Sub-Images from the Side in the Same Direction, and each Radial Reflection Unit has an Independent Light Source FIGS. 17a-17e are schematic diagrams of this embodiment. As shown in FIG. 17a, it is an embodiment with multiple independent light sources.

There are four light sources above, including light source 17011, light source 17012, light source 17013 and light source 17014. Only one light source emits light in each time period, and at the same time, only one emission window is opened for light to pass through. The light paths formed by the four light sources and the corresponding emission windows 17021, 17022, 17023 and 17024 have the same length, and can share the same near-to-eye refractive component (transmissive near-to-eye refractive component or reflective near-to-eye refractive component) at the end, so that human eyes can see it clearly.

FIG. 17b to FIG. 17e are schematic diagrams for further explaining this implementation. As shown in the figures, FIG. 17b to FIG. 17e respectively correspond to four times, t1, t2, t3 and t4, and the light source is divided into four independent areas (light source 17011, light source 17012, light source 17013 and light source 17014), which can independently control the emitted light. Each lower reflection surface corresponds to an emission window, and in this embodiment, the emission windows are all transmissive light valves.

The transmissive light valve can be a liquid crystal light valve or other devices with controllable light transmittance. When receiving different control signals, the transmissive light valve has two effects of transmitting or cutting off specific light (generally polarized light).

Only one of the light sources emits light in each time period, and at the same time, only one emission window formed by the transmissive light valve allows light to pass through.

At time t1, the light source 17011 emits light, and the corresponding emission window 17021 opens to let the light pass through.

At time t2, the light source 17012 emits light, and the corresponding emission window 17022 opens to let the light pass through.

At time t3, the light source 17013 emits light, and the corresponding emission window 17023 opens to let the light pass through.

At time t4, the light source 17014 emits light, and the corresponding emission window 17024 opens to let the light pass through.

The light paths formed by the four light sources and the corresponding emission windows 17021, 17022, 17023 and 17024 have the same length, and can share the same near-to-eye refractive component 1703 at the end, so that the human eye can see clearly.

The near-to-eye refractive component 1703 includes a transmissive near-to-eye refractive component or a reflective near-to-eye refractive component. Especially, when the near-to-eye refractive component is a transmissive refractive component, it can be a single lens, or a composite structure composed of multiple lenses, or a composite structure composed of multiple reflective layers and refractive layers. When the near-to-eye refractive component is a reflective refractive component, it can be a single curved mirror, a plurality of curved mirrors spliced together, or a composite structure composed of multiple reflective layers and refractive layers.

FIGS. 18a-18b, 19a-19b, 20a and 20b are other embodiments with different arrangements of four light sources, reflection surfaces and emission windows in this embodiment. In this embodiment, the unmarked blank rectangle represents the reflection surface.

Figure 18A:
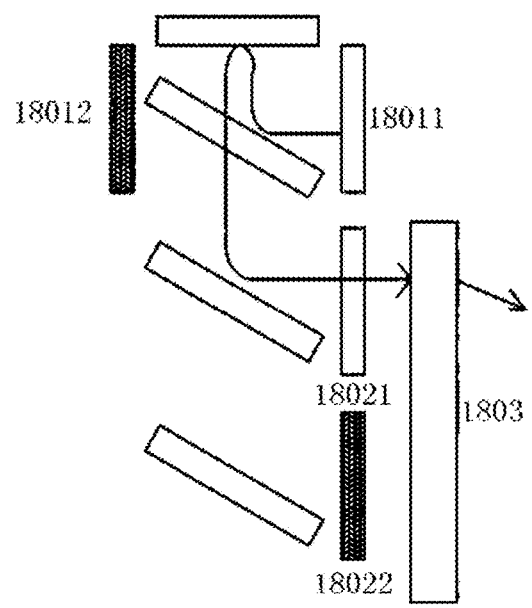

FIG. 18a shows the light path of the light emitted by the light source 18011 at t1, in which the emission window 18021 corresponding to the light source 18011 opens at t1 to allow the light to pass through.

Figure 18B:
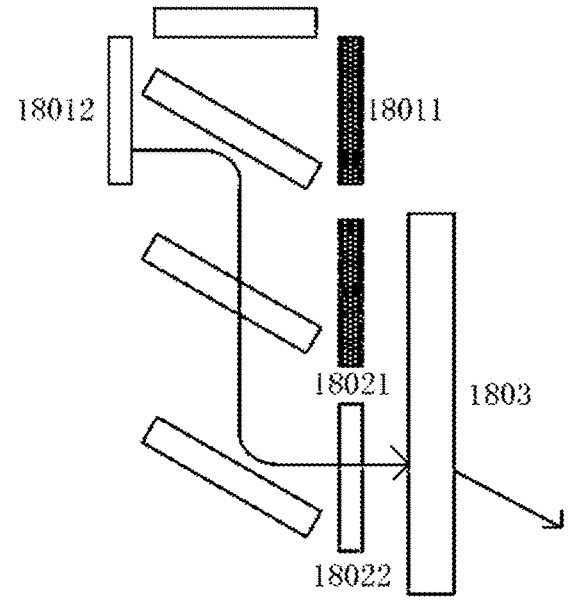

FIG. 18b shows the light path of the light emitted by the light source 18012 at time t2, in which the emission window 18022 corresponding to the light source 18012 is opened at time t2 to allow the light to pass through.

FIGS. 18a-18b include two independent light sources, which can independently control the emitted light. The light source 18011 and the light source 18012 emit light at different times. The light emitted by the light source 18011 is reflected downwards twice, and the light emitted by the light source 18012 is reflected downwards once. The lengths of optical paths formed by the two light sources and the corresponding emission windows are consistent.

Figure 19A:
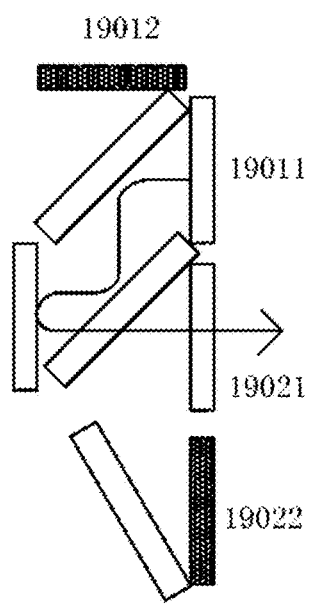

FIG. 19a shows the light path of the light emitted by the light source 19011 at t1, in which the emission window 19021 corresponding to the light source 19011 is opened at t1 to allow the light to pass through.

Figure 19B:
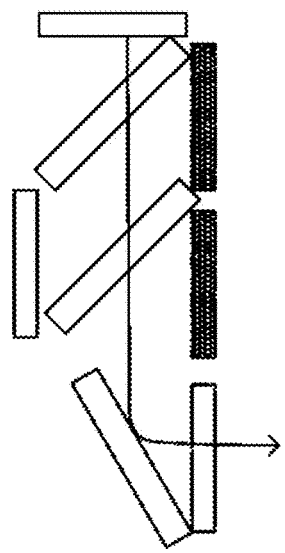

FIG. 19b shows the light path of the light emitted by the light source 19012 at time t2, in which the emission window 19022 corresponding to the light source 19012 is opened at time t2 to allow the light to pass through.

At t1 and t2, two light sources and corresponding emission windows form two light paths with the same length.

FIGS. 20a-20b are two other embodiments with different arrangements of light sources, reflection surfaces and emission windows. As shown in the figure, at two different times, two light sources and corresponding emission windows form two optical paths. By adjusting the positions of the light sources 20011 and 20012, the lengths of the two optical paths can be consistent or inconsistent.

II. A Plurality of Radial Reflection Units Project Respective Sub-Images from the Side in the Same Direction, and the Plurality of Radial Reflection Units Share the Same Light Source The unlabeled blank rectangles in the drawings of this embodiment all represent reflection surfaces.

FIG. 21 is a schematic diagram of this embodiment. As shown in FIG. 21, it includes a light source 2101, an emission window 21021, an emission window 21022 and an emission window 21023; a plurality of radial reflection units project respective sub-images from the side in the same direction and share the same light source. The light source displays different images in different time periods, and at the same time, only one emission window is opened for light to pass through.

Figure 22:
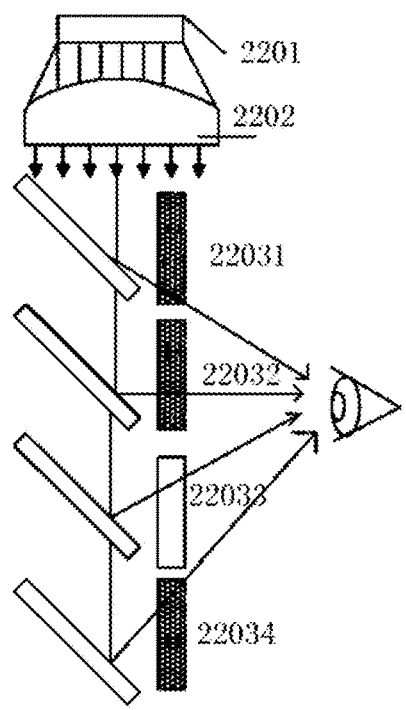
Figure 23:
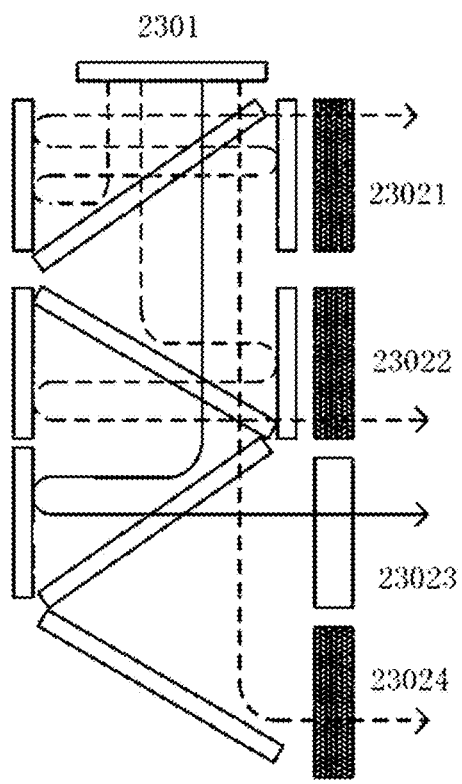
Figure 24:
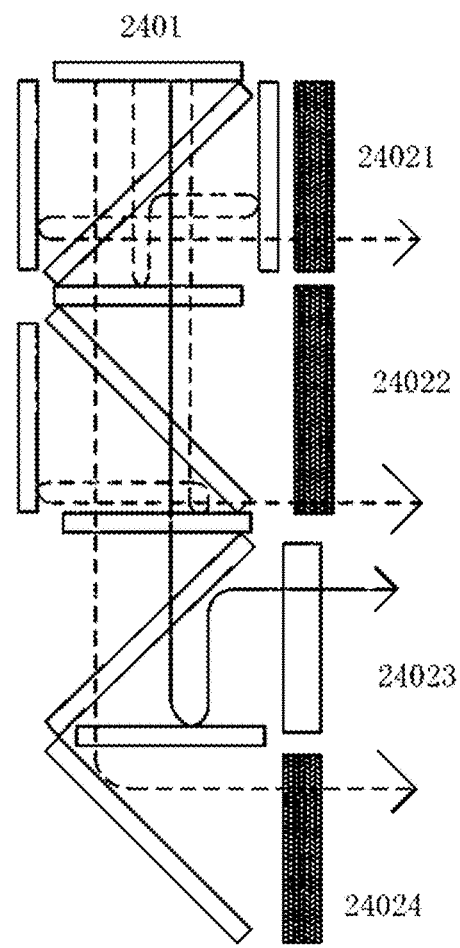

FIG. 22 to FIG. 24 are schematic structural diagrams of specific radial reflection units according to this embodiment.

As shown in FIG. 22, it includes a light source 2201, a pre-diopter 2202, an emission window 22031, an emission window 22032, an emission window 22033 and an emission window 22034. The emission windows of this embodiment are all transmissive light valves.

The light emitted by the same light source 2201 passes through the pre-diopter 2202, becomes near parallel light (high beam), and then passes through a plurality of subsequent reflection surfaces, enters the human eye through different emission windows in different time periods, and forms an image on the retina.

As shown in FIG. 23, it includes a light source 2301, an emission window 23021, an emission window 23022, an emission window 23023 and an emission window 23024. The emission windows of this embodiment are all transmissive light valves.

As shown in FIG. 23, in order to ensure that the total optical path lengths of multiple radial reflection units are consistent, The same light source 2301 emits four different images at four different times. In the lower reflection structure, multi-reflection structures are adopted to form four groups of reflection structures, which reflect light for 1-4 times respectively.

The light path length formed by the light source 2301 and the four emission windows is the same, which can directly enter the human eye; or share the same near-to-eye refractive component (transmissive near-to-eye refractive component or reflective near-to-eye refractive component) at the end, so that human eyes can see it clearly.

FIG. 23 shows a case where four radial reflection units are combined, but one of the reflection structures can also be reduced to triple combination; Or two reflection structures are reduced and become a double combination. The principle is similar and will not be described in detail.

As shown in FIG. 24, this FIG. is also a case where four radial reflection units are combined, and the total optical path length of multiple radial reflection units is the same. Different from the previous FIG. 23, the specific shape of partial reflection surfaces in the structure is different.

Different Structures of Emission Window

Figures 25A, 25B:
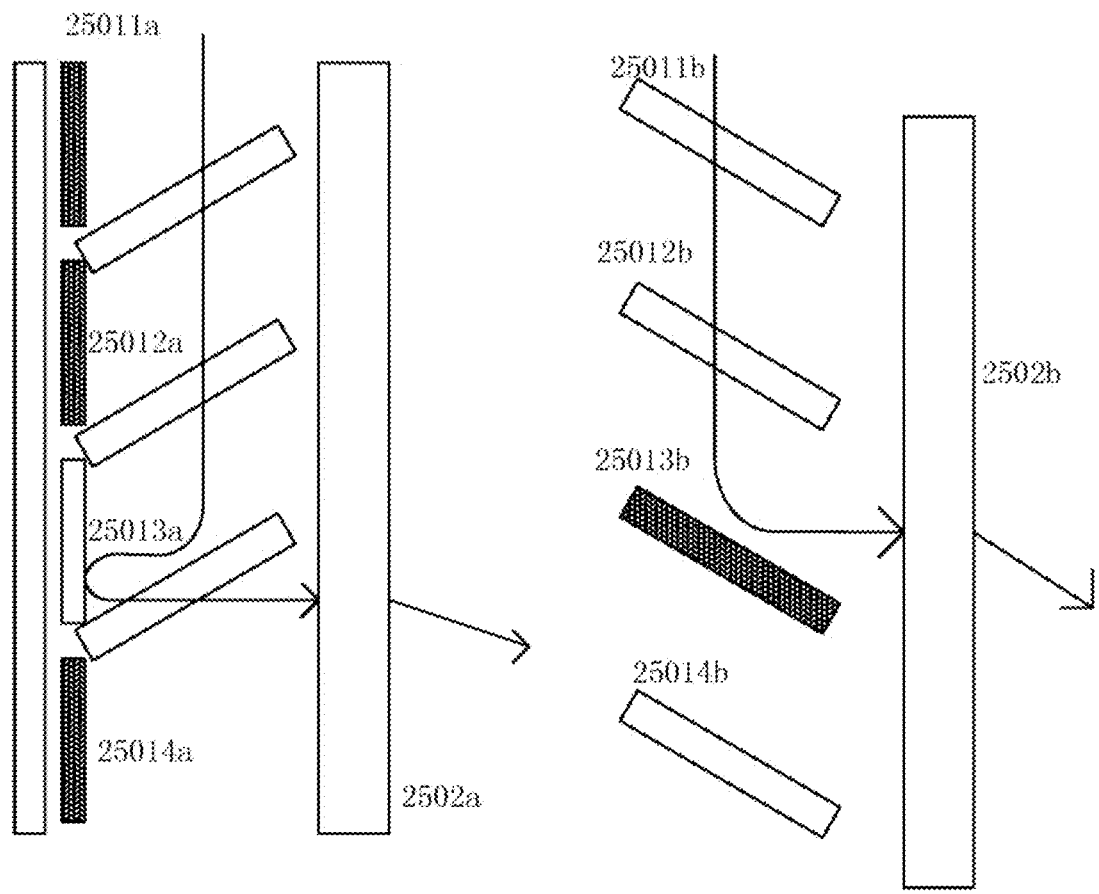
Figure 26:
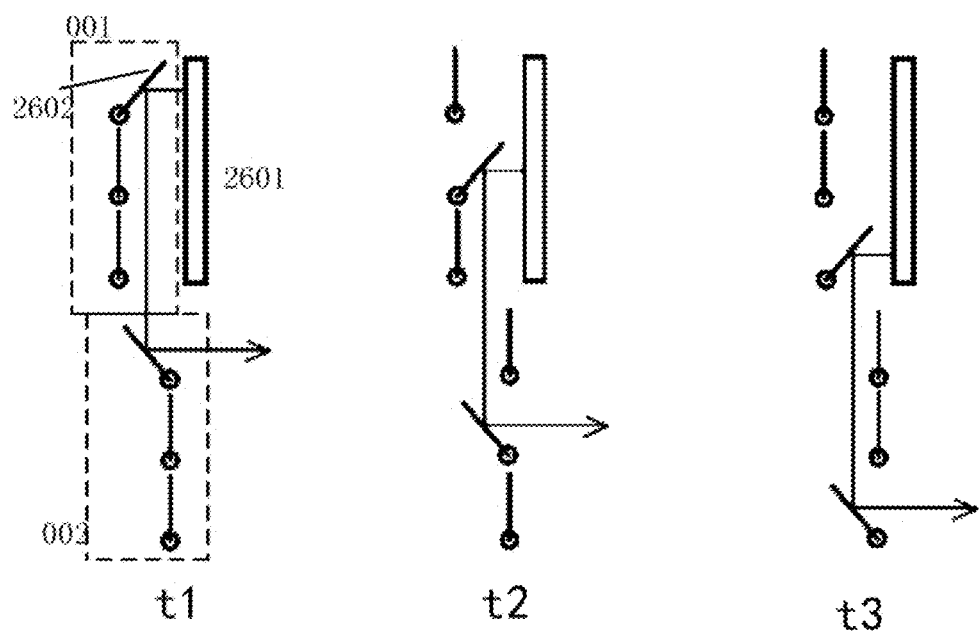

FIGS. 25a-25b and FIG. 26 are schematic diagrams showing different structures of the emission window of this embodiment.

The emission window of this embodiment also includes light controllers such as reflective light valves or controllable mirrors to form a plurality of emission windows.

As shown in FIG. 25a, the emission window is a reflective light valve, including four reflective light valves 25011a, 25012a, 25013a, 25014a and near-to-eye refractive component 2502a. The reflective light valve can be a combination of liquid crystal light valve and reflector, or other devices with controllable light transmittance and reflectivity. When receiving different control signals, the reflective light valve has two effects of reflecting and non-reflecting the specific light.

As shown in FIG. 25b, the emission window is a controllable mirror, including four controllable mirrors, 25011b, 25012b, 25013b, 25014b and near-to-eye refractive component 2502b. The controllable mirrors can be mechanical rotary, louver and micro-electromechanical devices, or other devices with controllable reflectivity and reflective direction. When receiving different control signals, the controllable mirror has two effects: effective reflection and ineffective reflection (or non-reflection).

As shown in FIG. 26, the emission window is a rotating mirror array, and multiple independent optical paths are formed by using the rotating mirror array.

FIG. 26 includes a light source 2601, a rotating mirror array 001 and a rotating mirror array 002.

The rotating mirror array is composed of a plurality of micro rotating mirrors 2602 with controllable rotation angles, and each rotating mirror 2602 can be quickly switched in two or more angle states according to the control signal independently, so as to control the light reflection direction.

The rotating mirror can be mechanical, such as being provided with a mechanical rotating shaft and a power device; It can also be a micro-electromechanical rotating mirror as small as micron, which can rotate under the control of electromagnetic force;

The light source 2601 faces the rotating mirror array 001 and emits light. At a certain moment, only one rotating mirror is in working state, which reflects the light down to the corresponding rotating mirror in working state in the rotating mirror array 002, and finally reflects the light out.

In each independent time period (t1, t2 or t3), only one optical path is in working state, thus realizing the isolation of multiple optical paths and ensuring the consistent length of each optical path. You can share the same near-to-eye refractive component (transmissive near-to-eye refractive component or reflective near-to-eye refractive component) at the end, so that human eyes can see it clearly.

Double Multiplexing of the Same Light Source

Figure 27A:
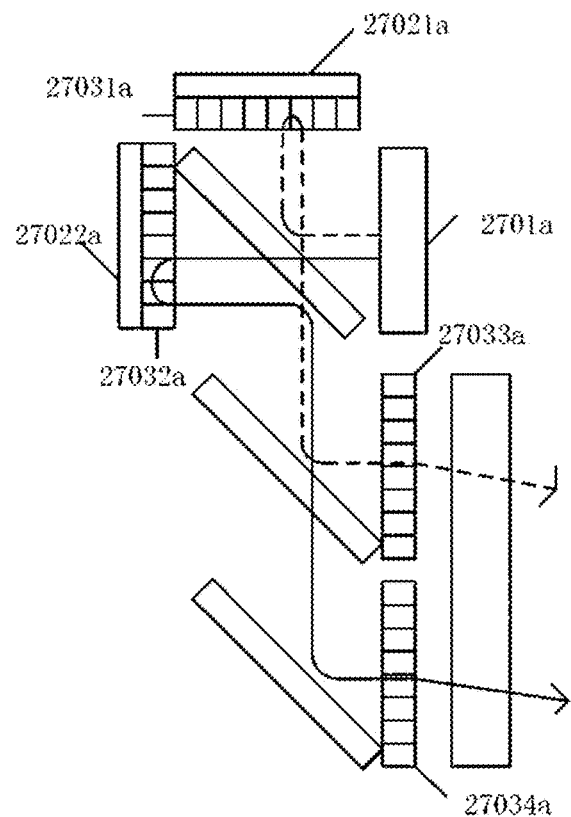
Figure 27B:
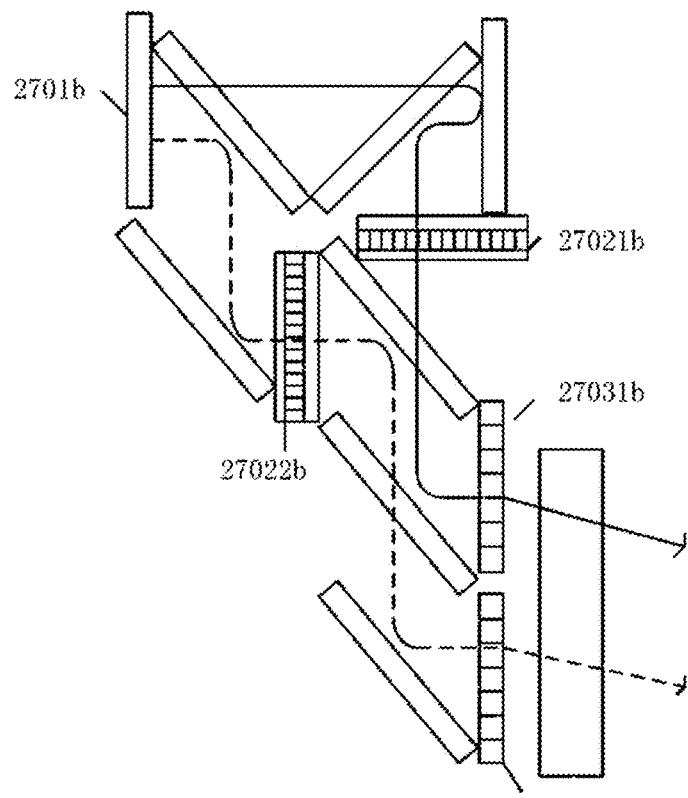

FIGS. 27a-27b show the case where the same light source is multiplexed twice in this embodiment.

As shown in FIG. 27a, the light source 2701a emits two different images at different times. At a certain time, the reflective light valve 27022a does not work, and the light is reflected by the reflective light valve 27021a to form a polarized light, which can only pass through the linear polarizer 27033a, but cannot pass through the linear polarizer 27034a; At another time, the reflective light valve 27021a does not work, and the light is reflected by the reflective light valve 27022a to form a polarized light, which can only pass through the linear polarizer 27034a, but cannot pass through the linear polarizer 27033a. The lengths of the two optical paths at different times are the same.

As shown in FIG. 27b, the light source 2701b emits two different images at different times. At a certain time, the transmissive light valve 27022b does not work, and the light passes through the transmissive light valve 27021b to form a polarized light, which can only pass through the linear polarizer 27031b, but cannot pass through the linear polarizer 27032b; at another time, the transmissive light valve 27021b does not work, and the light passes through the transmissive light valve 27022b to form a polarized light, which can only pass through the linear polarizer 27032b, but cannot pass through the linear polarizer 27031b. The lengths of the two optical paths at different times are the same.

Figure 28A:
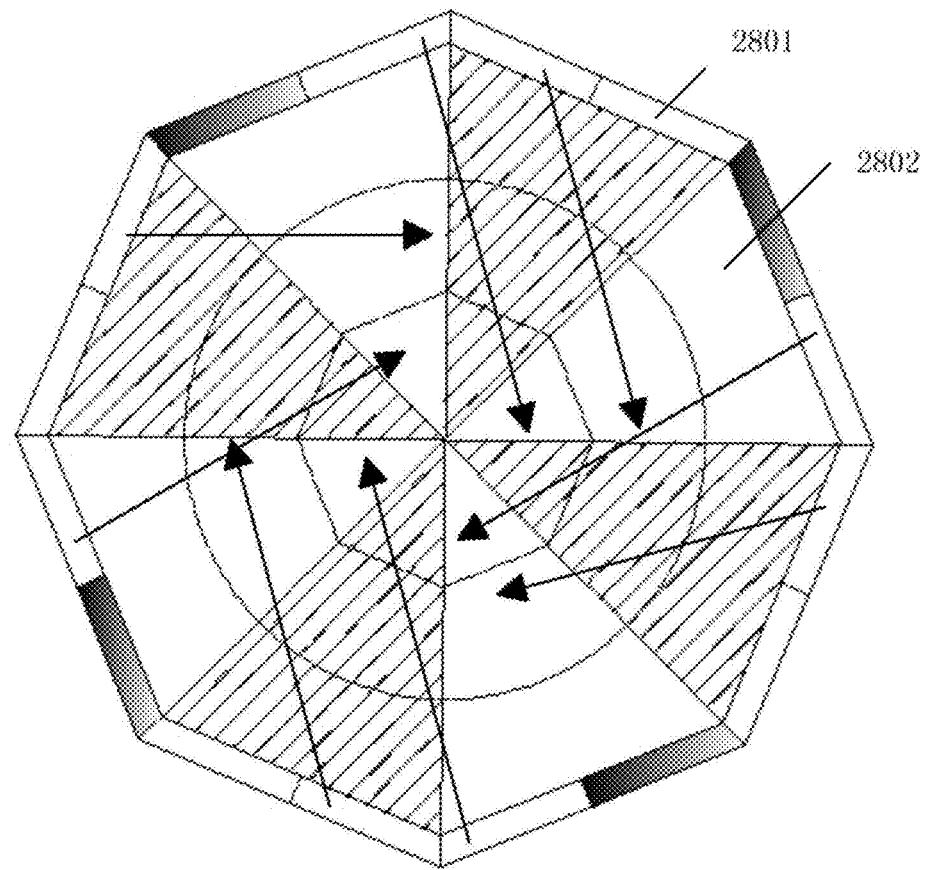
Figure 28B:
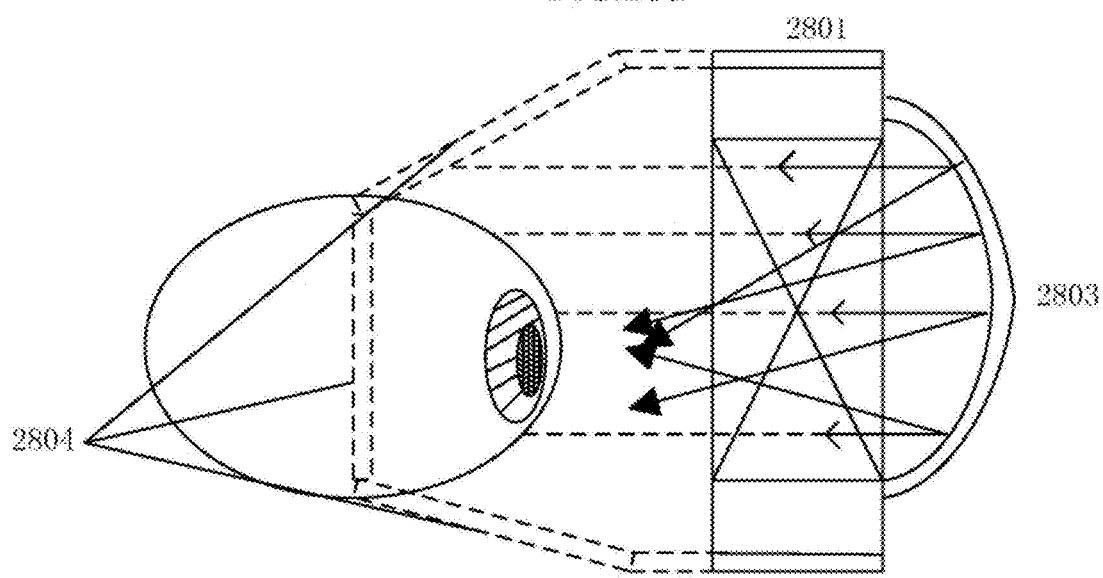

A Comprehensive Implementation Scheme:

FIGS. 28a-28b show an eight-sub-image projection device. Each sub-image exits from the corresponding emission window.

Only four emission windows 2802 (non-shaded parts) are open at one time; At another moment, the other four emission windows (shaded parts) are opened. Eight independent light sources 2801 or one annular light source are used around.

The eight radial reflection units can adopt wave type or turbine type. The optical path length of each radial reflection unit is consistent, and the same near-to-eye refractive component 2803 is shared at the end, so that human eyes can see it clearly. Therein, the dashed line represents the light source image 2804.

Hybrid Isolation Method

By setting different polarization States, the isolation of multiple optical paths in the same direction is realized, which is called polarization isolation method;

By switching on and off different light paths at different times, multiple light paths in the same direction are isolated, which is called time division isolation method.

Combining polarization isolation method and time division isolation method, this embodiment can be realized: hybrid isolation method.

Figure 29:
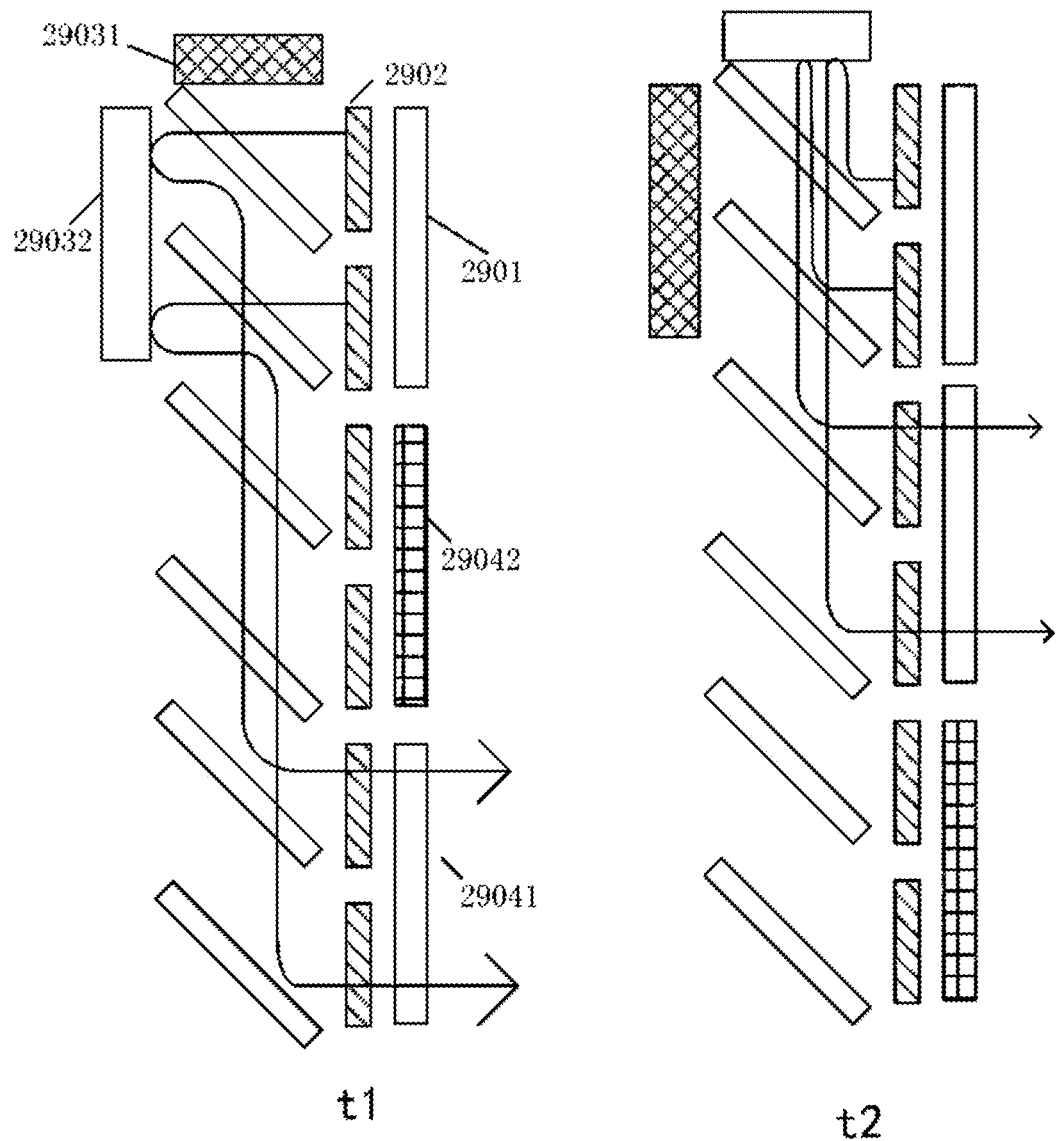

FIG. 29 shows a quadruple radial reflection unit structure.

The light source end uses reflective light valve 29031 and reflective light valve 29032 as light path switchers, and the end uses transmissive light valve 29041 and transmissive light valve 29042 as light path on/off devices.

At two different times, t1 and t2, the light source 2901 displays different images and is divided into upper and lower parts to emit light with different polarization states. At this time, a reflective light valve and a corresponding transmissive light valve are in working state.

At two moments, the length of each optical path is consistent, and the same near-to-eye refractive component is shared at the end, so that human eyes can see it clearly.

Figure 30:
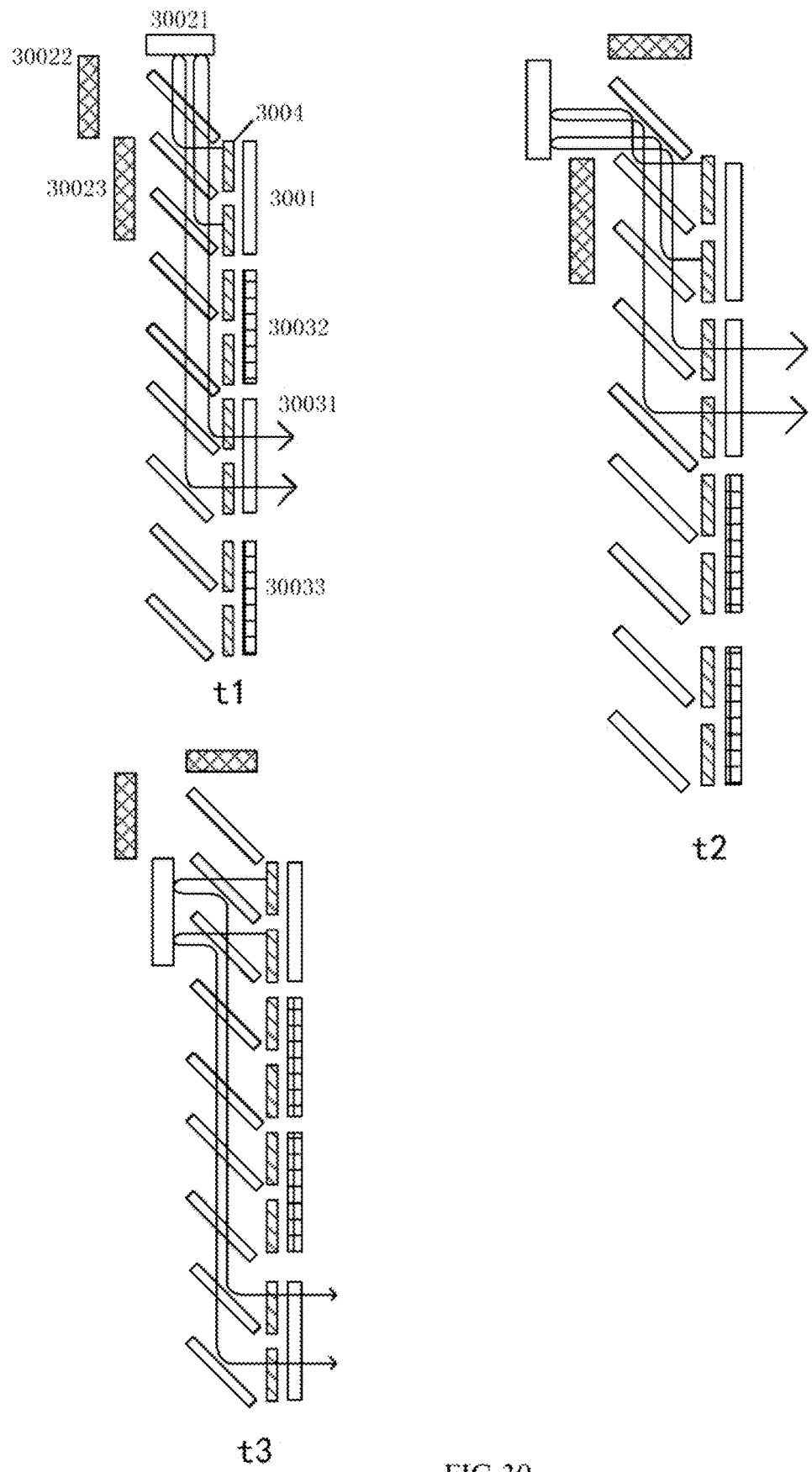

FIG. 30 shows a six-fold radial reflection unit structure.

The light source 3001 uses reflective light valves 30021, 30022 and 30023 as light path switchers, and the end uses transmissive light valves 30031, 30032 and 30033 as light path switches.

At t1, t2 and t3, the optical paths have the same length and share the same near-to-eye refractive component at the end, so that human eyes can see it clearly.

EXAMPLE 7

In this embodiment, a plurality of radial reflection units project light from different directions, and a plurality of radial reflection units overlap each other in each direction, and each radial reflection unit projects a separate sub-image which is spliced into a complete image on the retina of human eyes.

FIGS. 31a-31d are schematic structural diagrams of this embodiment.

Figure 31A:
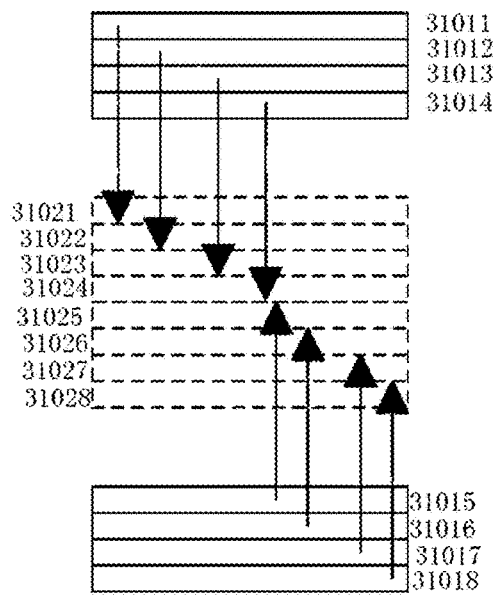
FIG. 31a to FIG. 31d are schematic structural views of a thin near-to-eye display device with a large field of view angle according to a seventh embodiment of the present application.

FIG. 31a, projection in up and down directions, quadruple projection in each direction, and each radial reflection unit has an independent light source; It includes eight light sources 31011-31018 and projects eight sub-images 31021-31028.

Figure 31B:
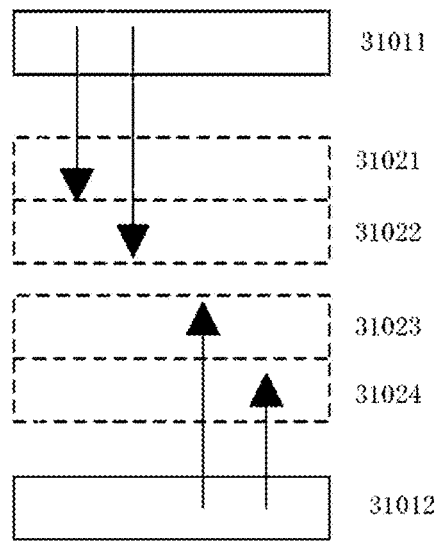

FIG. 31b, projection in up and down directions, double projection in each direction, and two radial reflection units in each direction share the same light source; It includes two light sources 31011-31012 and projects four sub-images 31021-31024.

Figure 31C:
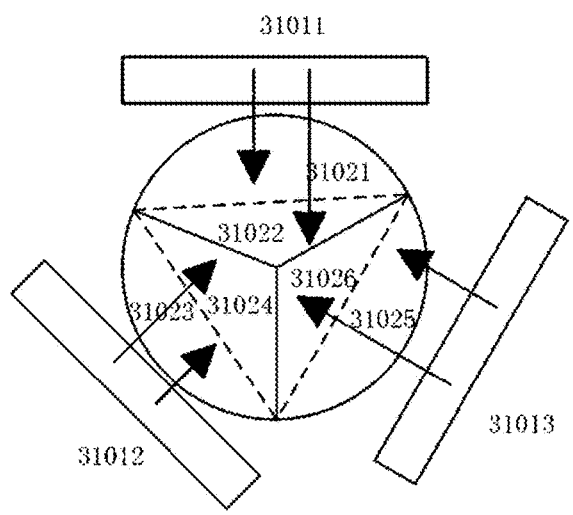

FIG. 31c, projection in three directions, double projection in each direction, and two radial reflection units in each direction share the same light source; Includes three light sources 31011-31013 and projects six sub-images 31021-31026.

Figure 31D:
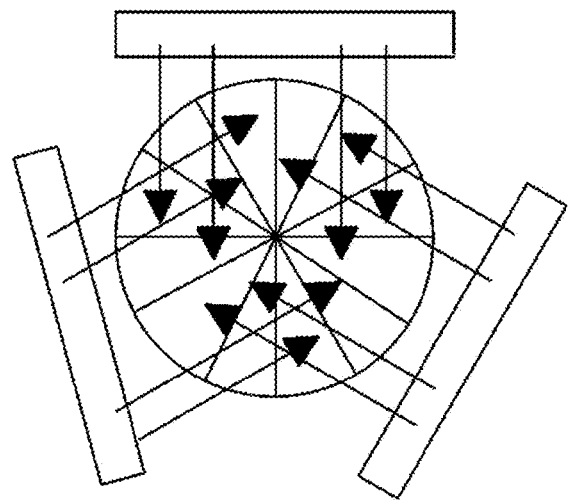
Figure 32A:
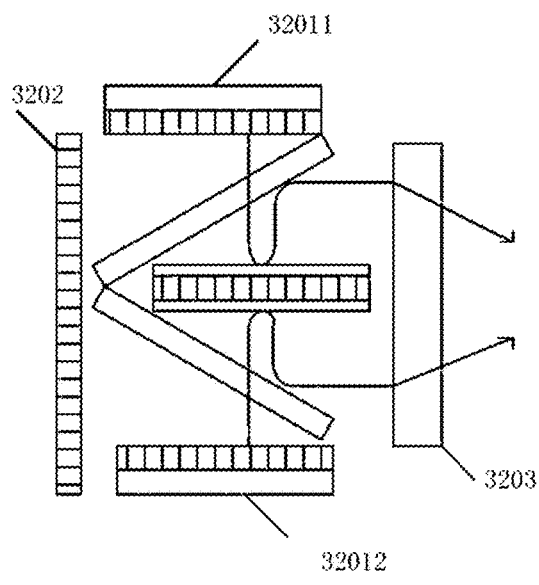
FIG. 32a-j to FIG. 39a-b are schematic structural views of a thin near-to-eye display device with a large field of view angle according to an eighth embodiment of the present application.
Figure 32B:
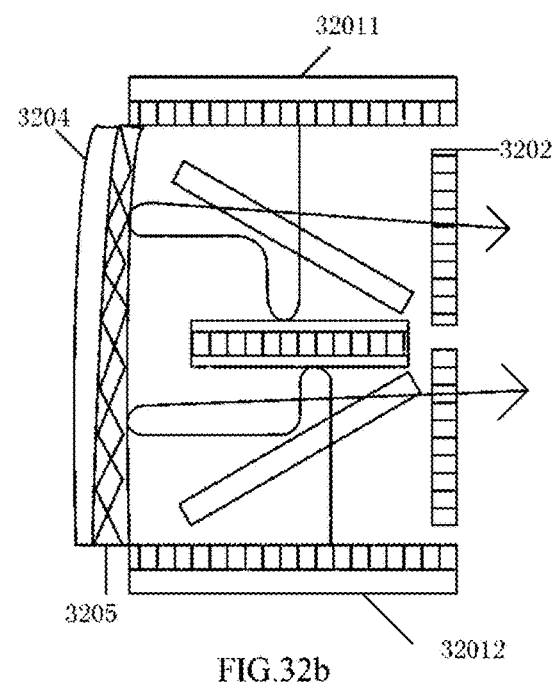
Figure 32C:
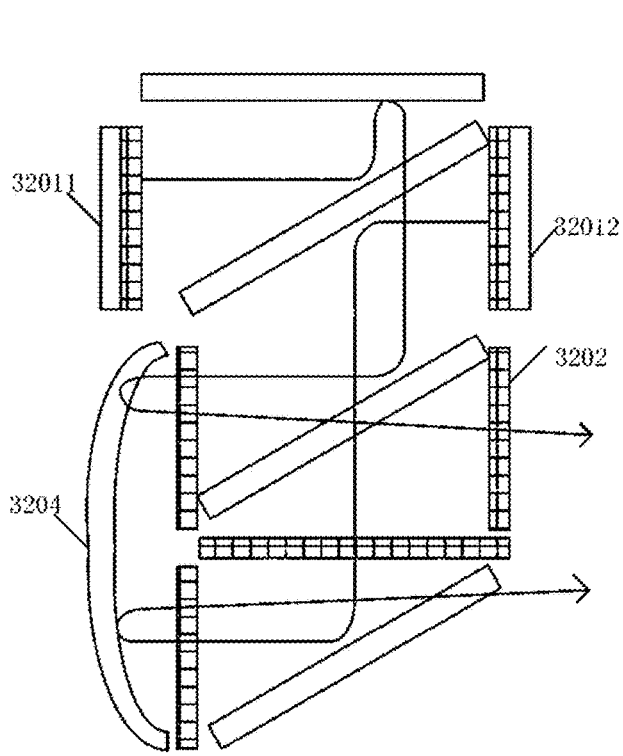
Figure 32D:
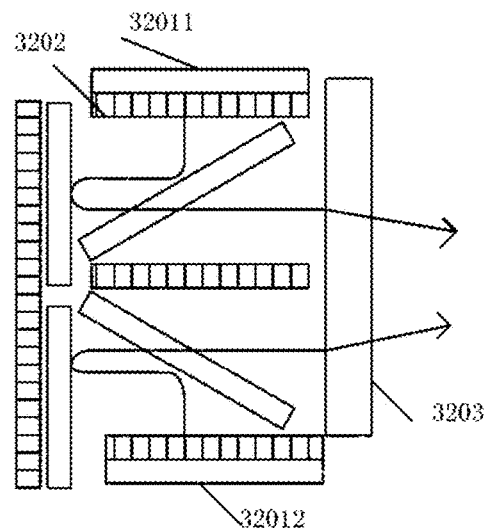
Figure 32E:
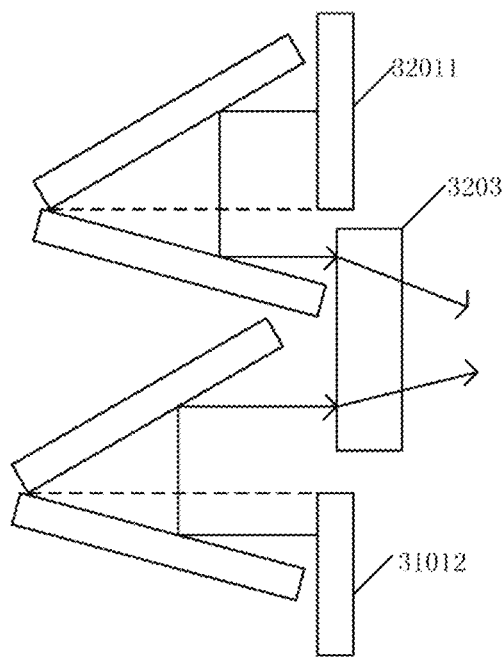
Figure 32F:
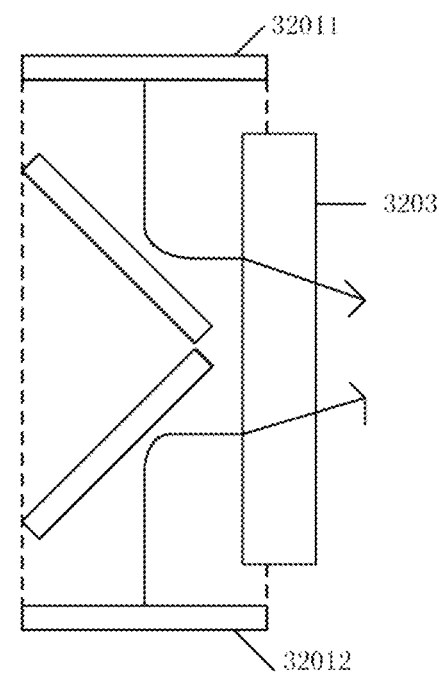
Figure 32G:
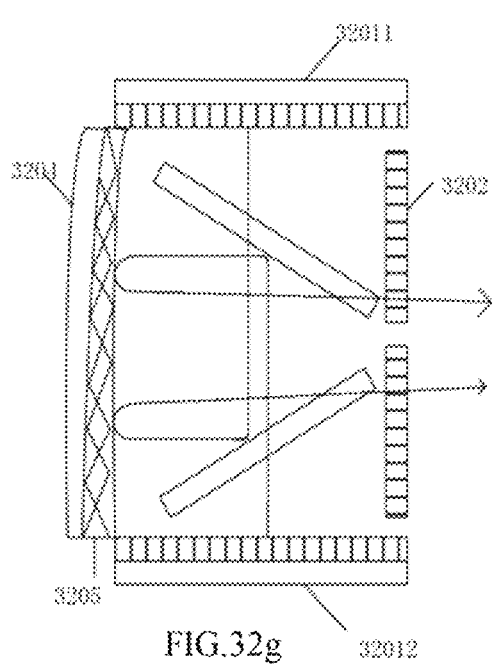
Figure 32H:
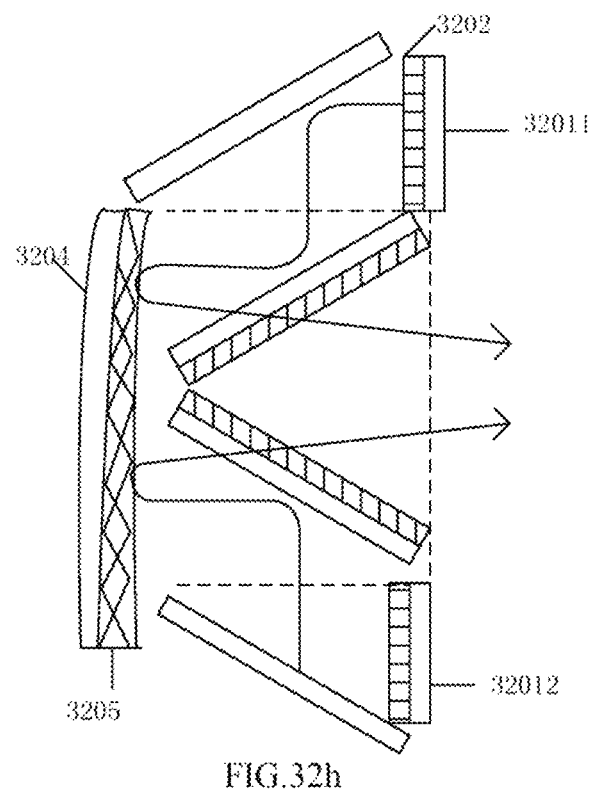
Figure 32I:
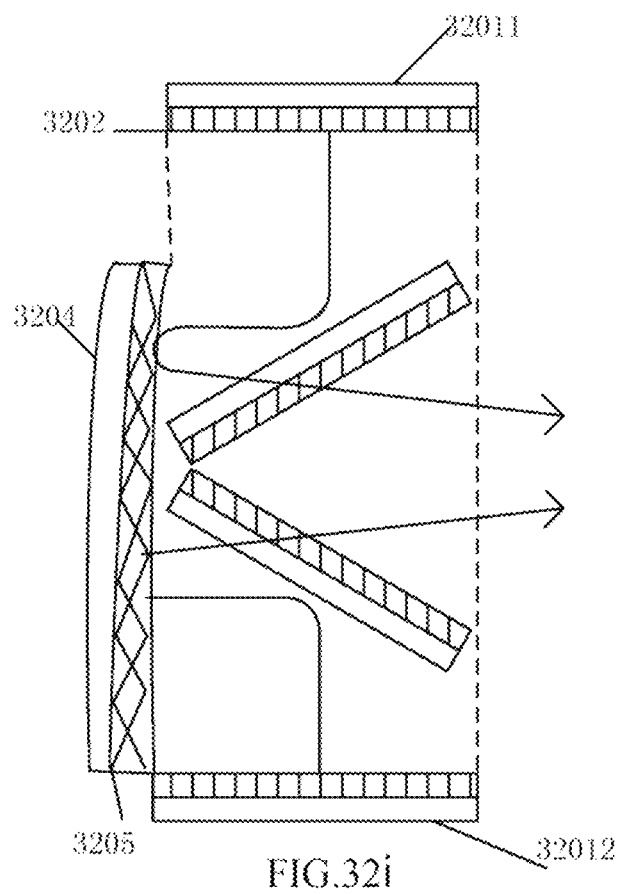
Figure 32J:
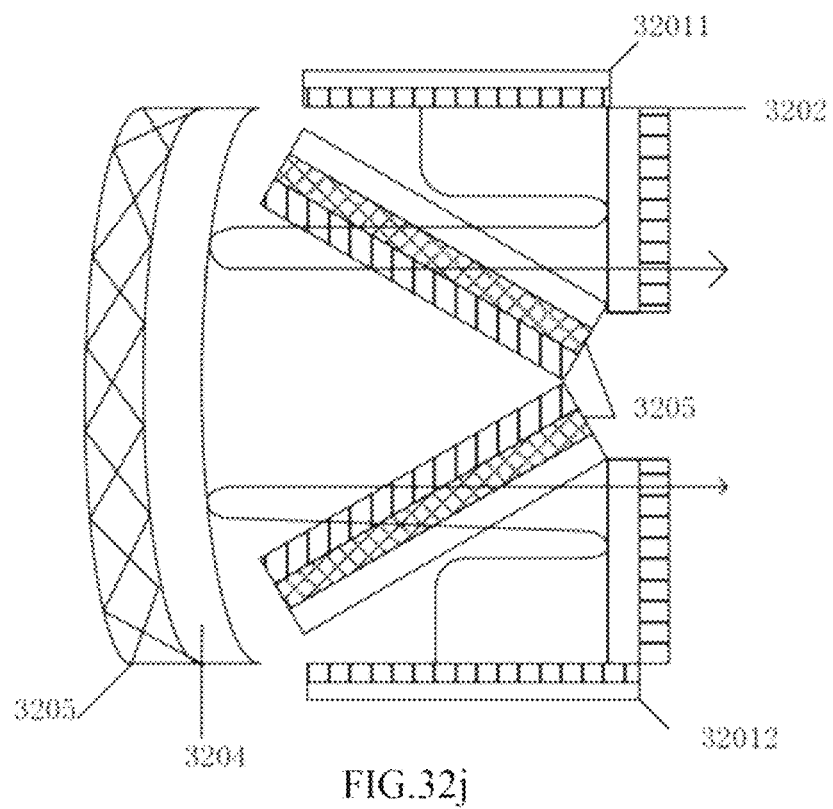

FIG. 31d is similar to FIG. 31c, but the sub-image splicing method is different.

EXAMPLE 8

The near-to-eye display device of the application can realize the transmission display effect of augmented reality, and the specific implementation method comprises the following steps:

1) Some optical structures in the near-to-eye display device can allow external light to pass through, and keep the focal length of the whole device to the external light to be infinite, so that the human eye can see the external environment clearly, thus realizing the transmission display effect of augmented reality.

2) Near-to-eye display device, which contains transmissive refractive components inside, can allow external light to pass through, but refract external incident light with a certain focal length; a refractive compensation component (such as spherical lens, aspheric lens, Fresnel lens, etc.) is added outside the whole device, whose focal length is opposite to that of transmissive refractive components, and can allow human eyes to see external light after mutual cancellation, thus realizing the transmissive display effect of augmented reality.

I. The Near-to-Eye Display Device in this Scheme Allows External Light to Pass Directly without Refraction.

Scheme 1

As shown in FIG. 32a to FIG. 32j, two independent radial reflection units are formed by using two independent light sources through their respective reflection channels, and two sub-images are produced and spliced into a complete image on the retina of human eyes; at the same time, the whole device allows external light to directly transmit without refraction.

As shown in FIGS. 32a-32j, it includes a light source 32011, a light source 32012, a plurality of linear polarizers 3202, a near-to-eye refractive component 3203, a reflective refractive component 3204, a polarization changer 3205, and a plurality of reflective surfaces (not labeled). Because of the arrangement of linear polarizer 3202, polarization changer 3205 and several reflection surfaces as shown in the figure, the light path can only be emitted through the only correct path. Its principle is the same as the polarization isolation method mentioned above, so it will not be described in detail.

Scheme 2

Figure 33A:
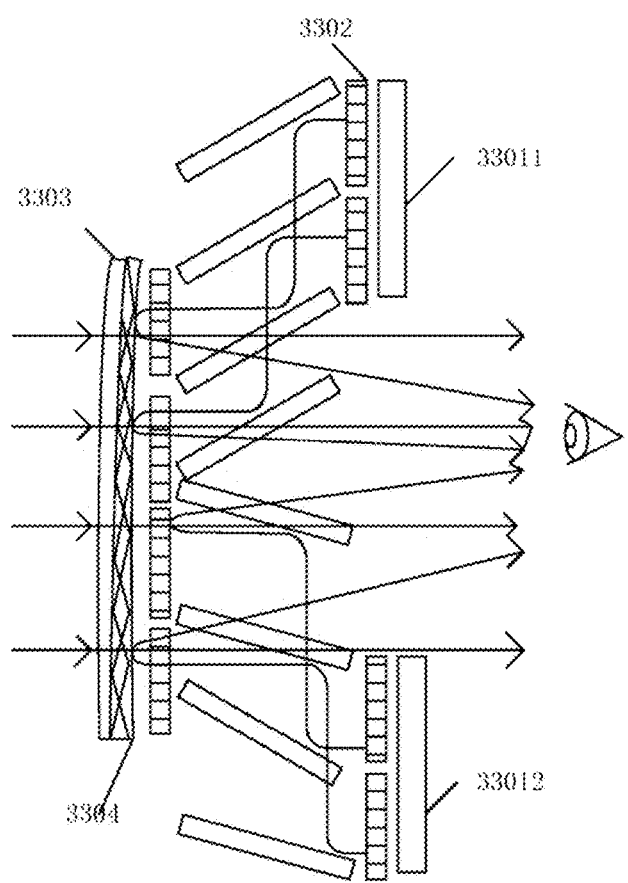
Figure 33B:
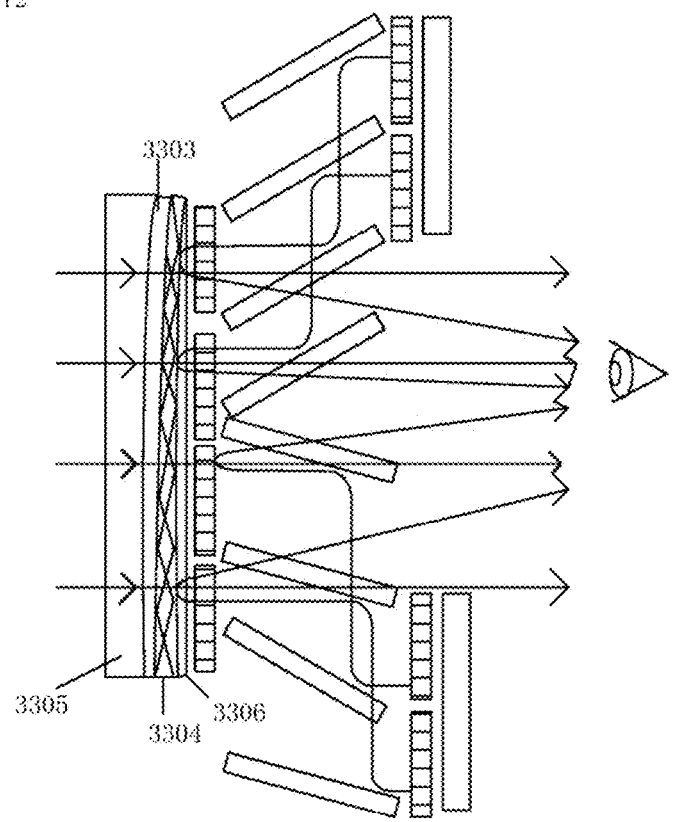

FIGS. 33a-33b use two independent light sources to project images from the upper and lower directions, and each direction projects two sub-images. A total of four sub-images are generated and spliced into a complete image on the retina of human eyes.

At the same time, the whole device allows external light to pass directly without refraction.

In FIG. 33a, it includes a light source 33011, a light source 33012, a plurality of linear polarizers 3302, a reflective refractive component 3303, a polarization changer 3304, The light emitted by a single light source is projected to the center in two different polarization states, selected by the corresponding linear polarizer, enters the correct channel, and is processed into high beam by the reflective refractive component, and enters the human eye to be seen clearly.

In FIG. 33b, a plano-concave lens 3305 and a plano-convex lens 3306 are added on the basis of FIG. 33a; on the basis of keeping the external focal length of the whole optical system infinite, the reflecting refractive surface on the reflecting refractive component 3303 and the plano-convex lens 3306 (going back and forth twice) realize a shorter refractive focal length together.

In order to achieve better display effect, polarization changer 3304 is added to both schemes in FIG. 33a and FIG. 33b.

In order to prevent the light from entering the wrong reflection channel, more polarizers or light shields can be added at other positions to isolate the light path, which will not be repeated here.

Scheme 3

FIGS. 34a-34d are all some improvements to prevent light from entering the wrong reflection channel.

Figure 34A:
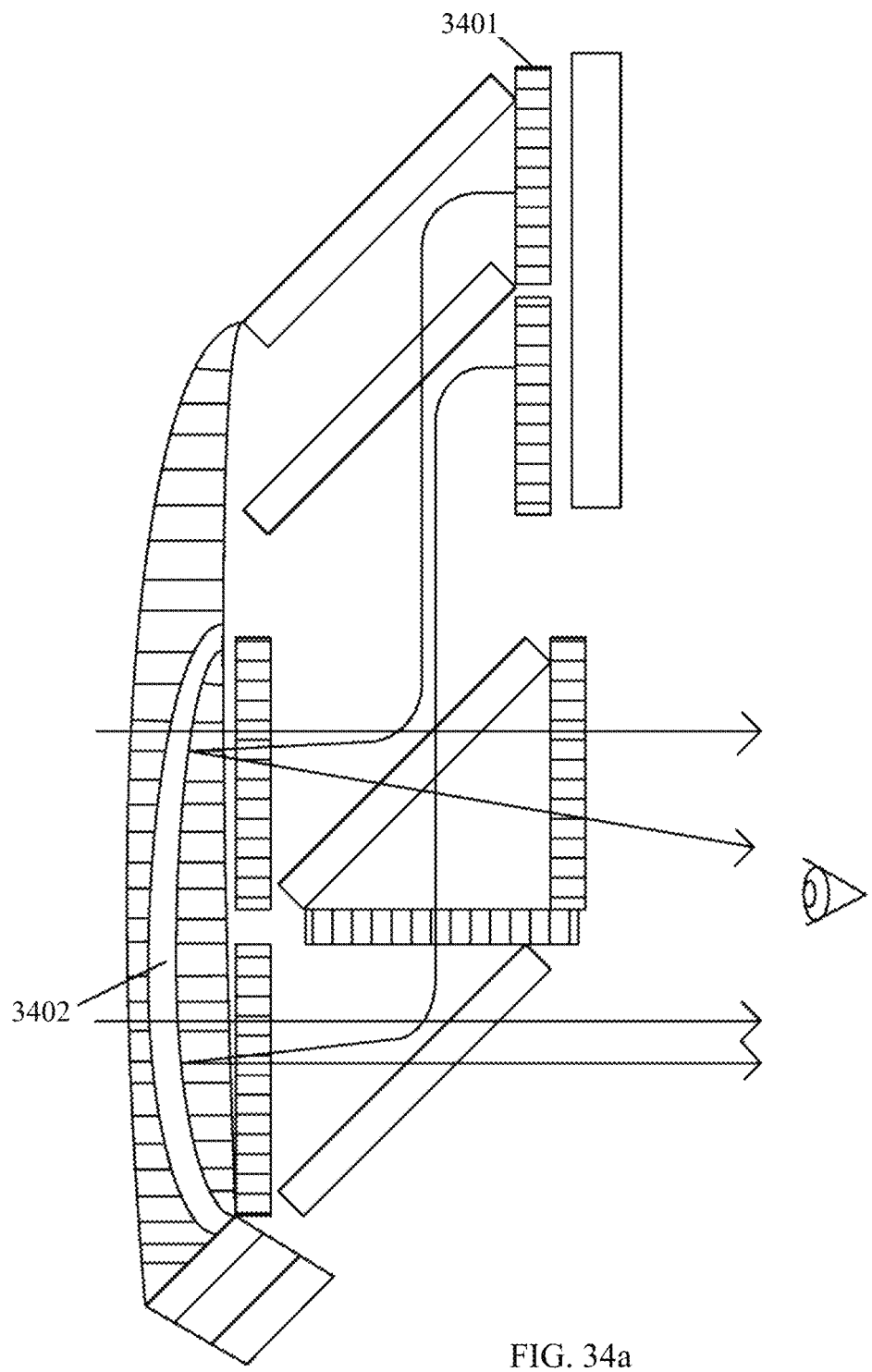
Figure 34B:
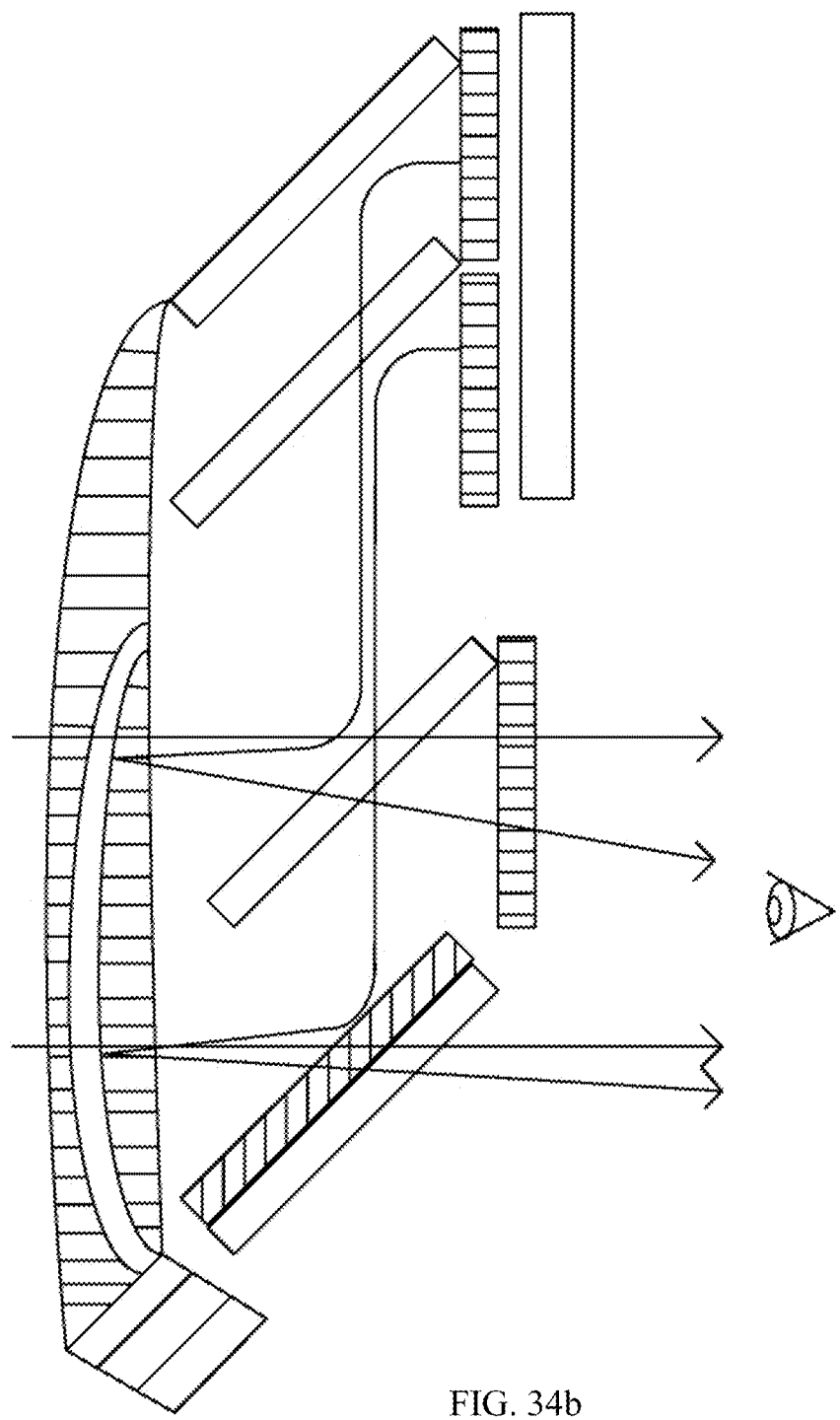
Figure 34C:
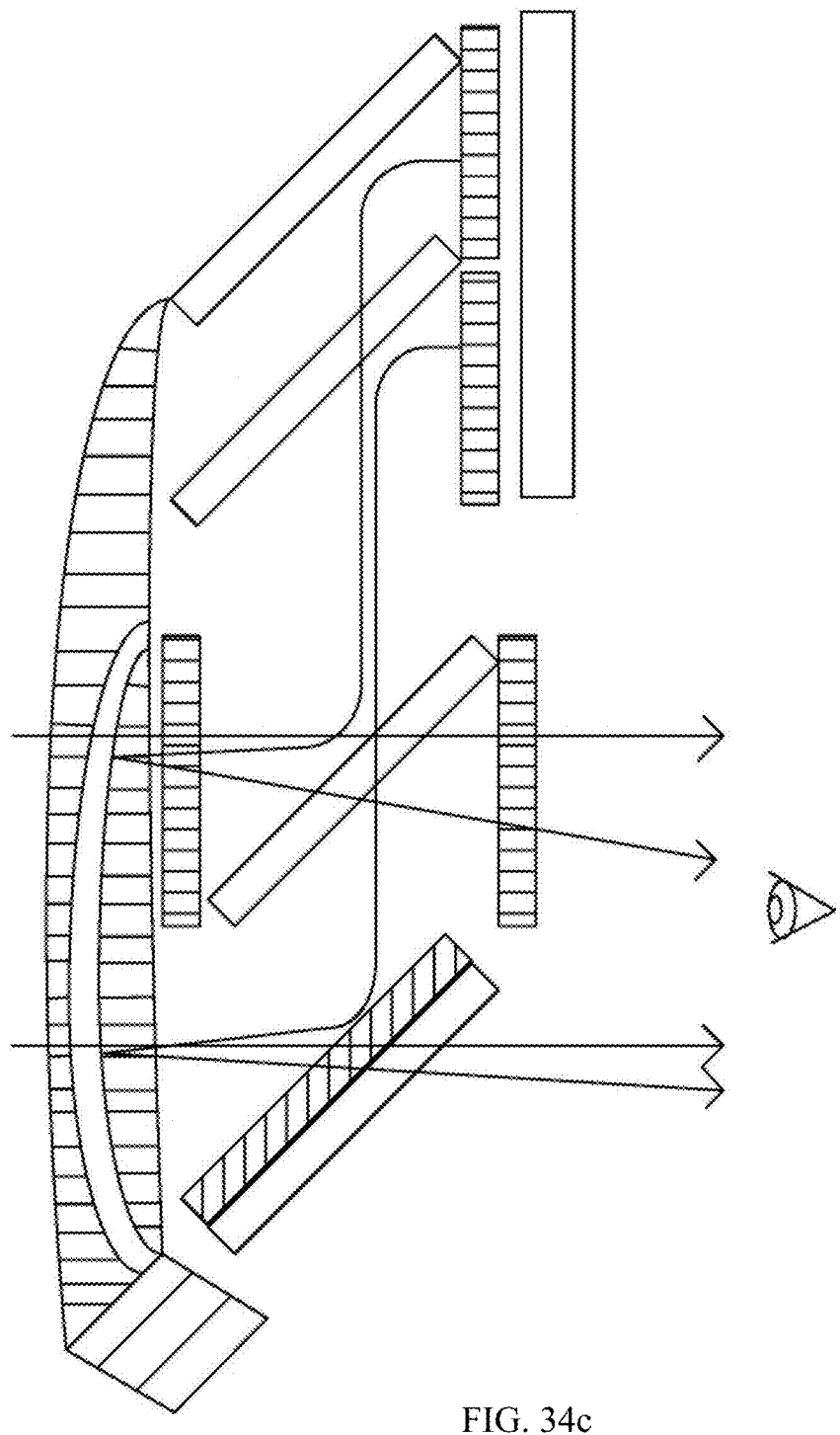

As shown in FIGS. 34a-34c, it includes several polarizers 3401 and reflective refractive components 3402. Some polarizers are added at some positions in FIGS. 34a-34c, which not only isolate the optical path of the internal display light, but also help prevent the external light from entering the human eye after being reflected by multiple reflective surfaces, forming a ghost.

Figure 34D:
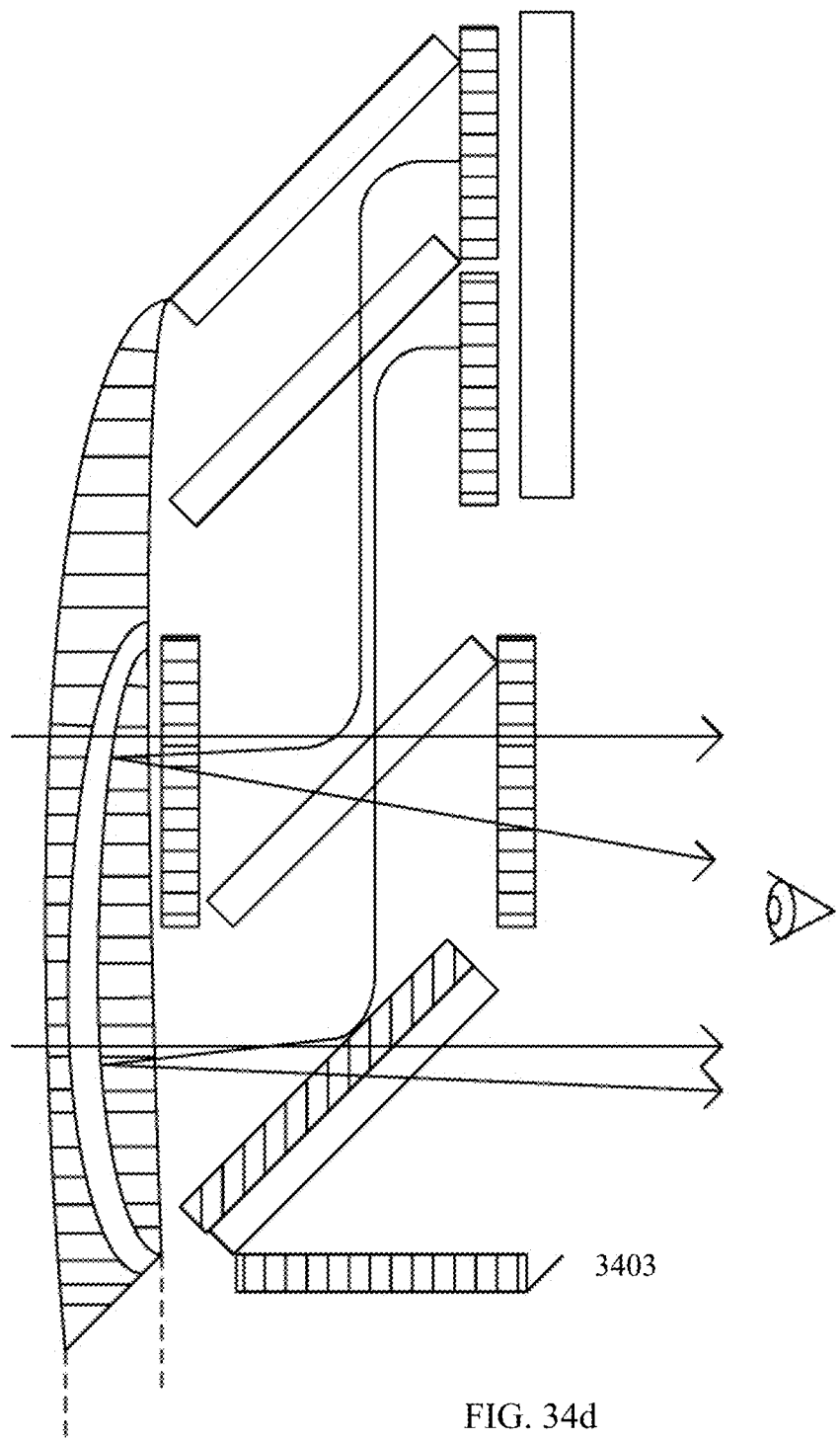

In FIG. 34d, a horizontally placed boundary polarizer 3403 is added at the bottom of the FIG. to prevent the light from continuing to propagate downward. Therefore, other optical structures can be continuously added under the boundary polarizer 3403 without contacting the light emitted from above.

On the basis of the above, more polarizers or light shields can be added at other positions to isolate the optical path, which will not be repeated here.

Scheme 4

Figure 35:
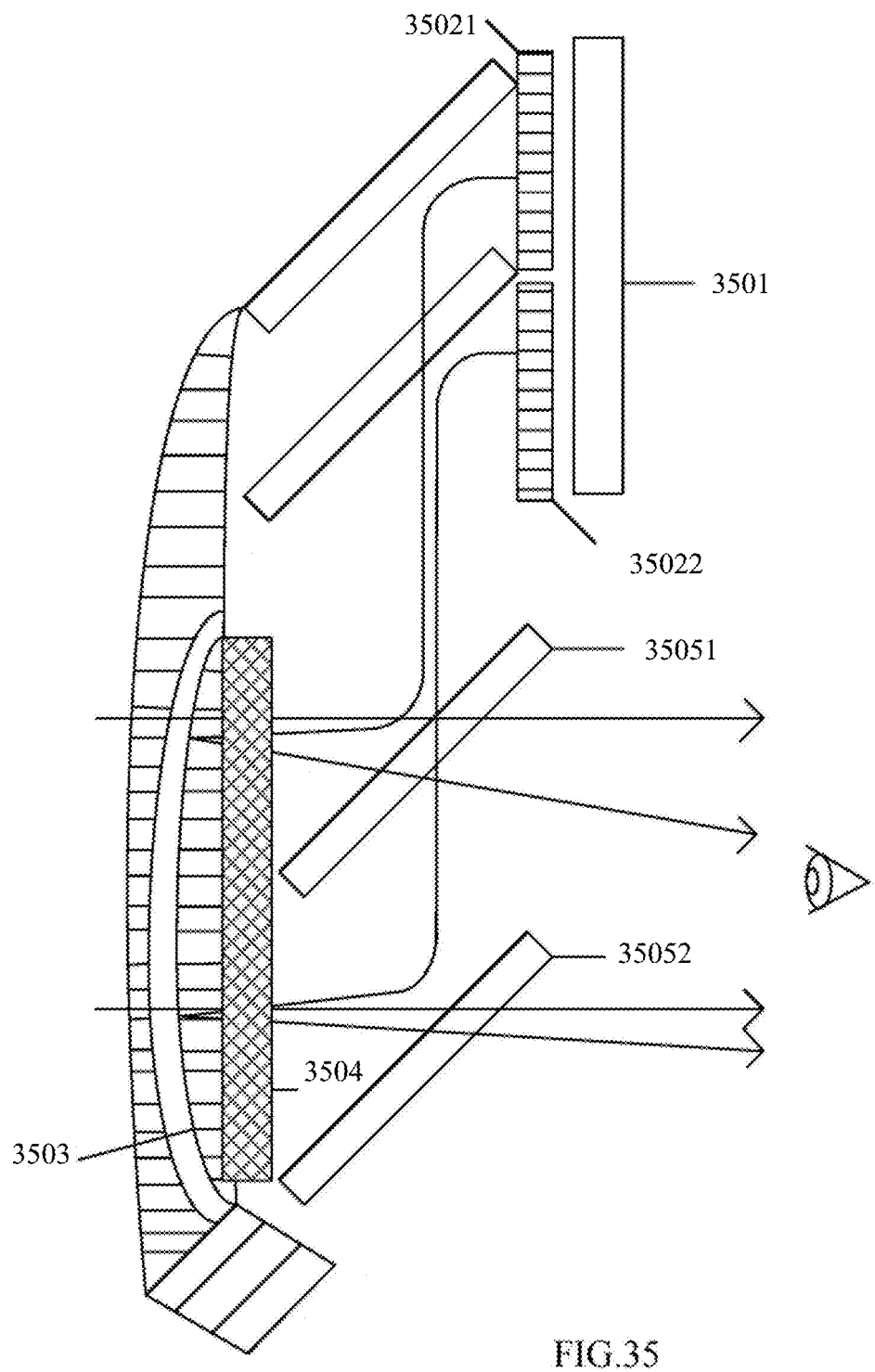

As shown in FIG. 35, a polarizing beam splitter is used for optical path isolation.

As shown in FIG. 35, the light emitted by the light source 3501 is processed by the linear polarizer 35021 and the linear polarizer 35022 to become linearly polarized light with two polarization directions perpendicular to each other. The light emitted from the linear polarizer 35021 will only be reflected and not transmitted when it hits the polarizing beam splitter 35051. The light emitted from the linear polarizer 35022 will only be transmitted without reflection when it hits the polarizing beam splitter 35051, and will only be reflected without transmission when it hits the polarizing beam splitter 35052.

All the light is reflected by polarizing beam splitter 35051 and polarizing beam splitter 35052, then thrown to polarization changer 3504, reflected by reflecting refractive component 3503, and then passed through polarization changer 3504. After that, the polarization of the light has changed, so they can pass through polarizing beam splitter 35051 and polarizing beam splitter 35052 smoothly and finally enter human eyes.

At the same time, after being reflected by the polarizing beam splitter 35052, the outside light hits the polarizing beam splitter 35051 upwards and is transmitted directly without reflection, so it will not enter the human eye to form a double image.

Scheme 5

Figure 36:
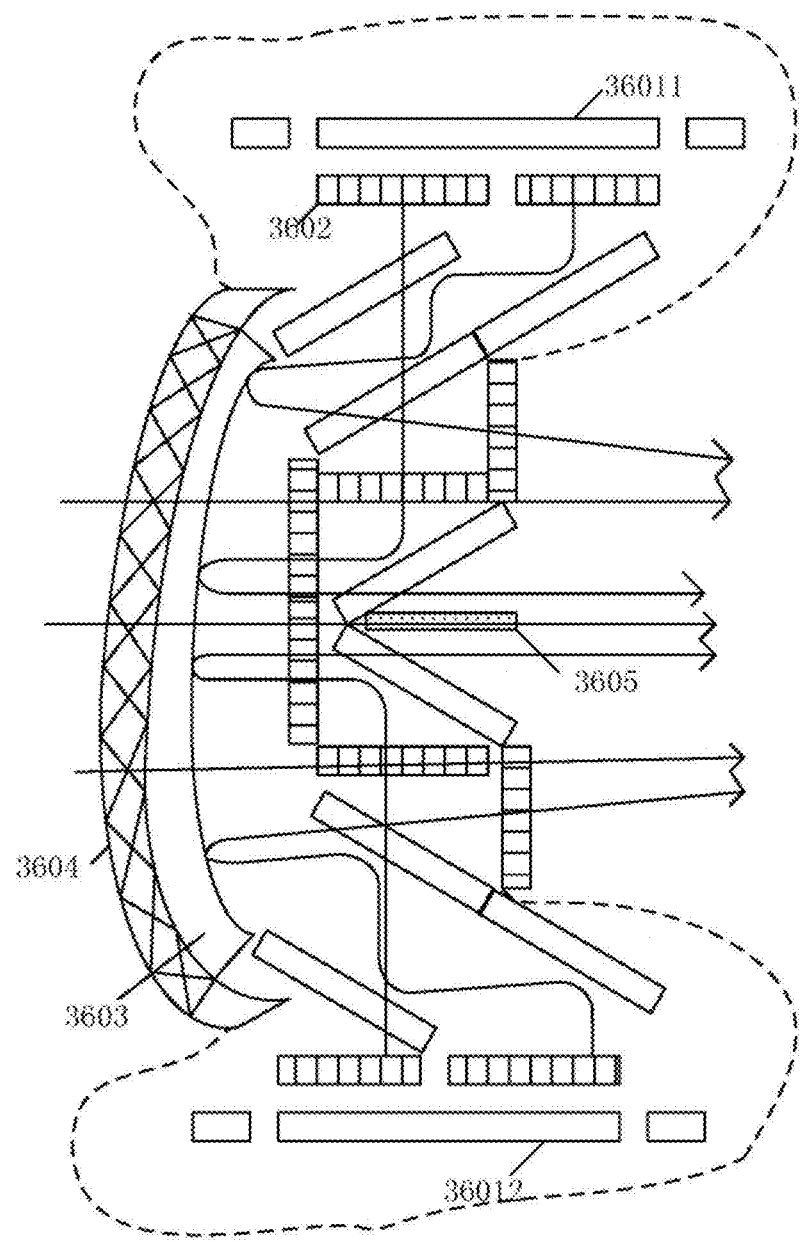

As shown in FIG. 36, four sub-images are generated by using two horizontally placed light sources. Comprises a light source 36011, a light source 36012, a plurality of polarizers 3602, a reflective refractive component 3603, a polarization changer 3604 and a boundary polarizer 3605.

As shown in FIG. 36, some polarizers are added to the structure of the device to isolate the four optical paths, and at the same time, it can prevent the external light from reflecting and entering the human eye for many times to form double images; The boundary polarizer 3605 can prevent the interference of the light emitted by the upper and lower light sources.

Preferably, a polarization changer 3604 is added at the outermost side of the device, so that polarized light in the external environment (such as mirror reflection light, computer, mobile phone, TV display light, etc.) can be completely seen by human eyes through the whole device.

Scheme 6

Figure 37:
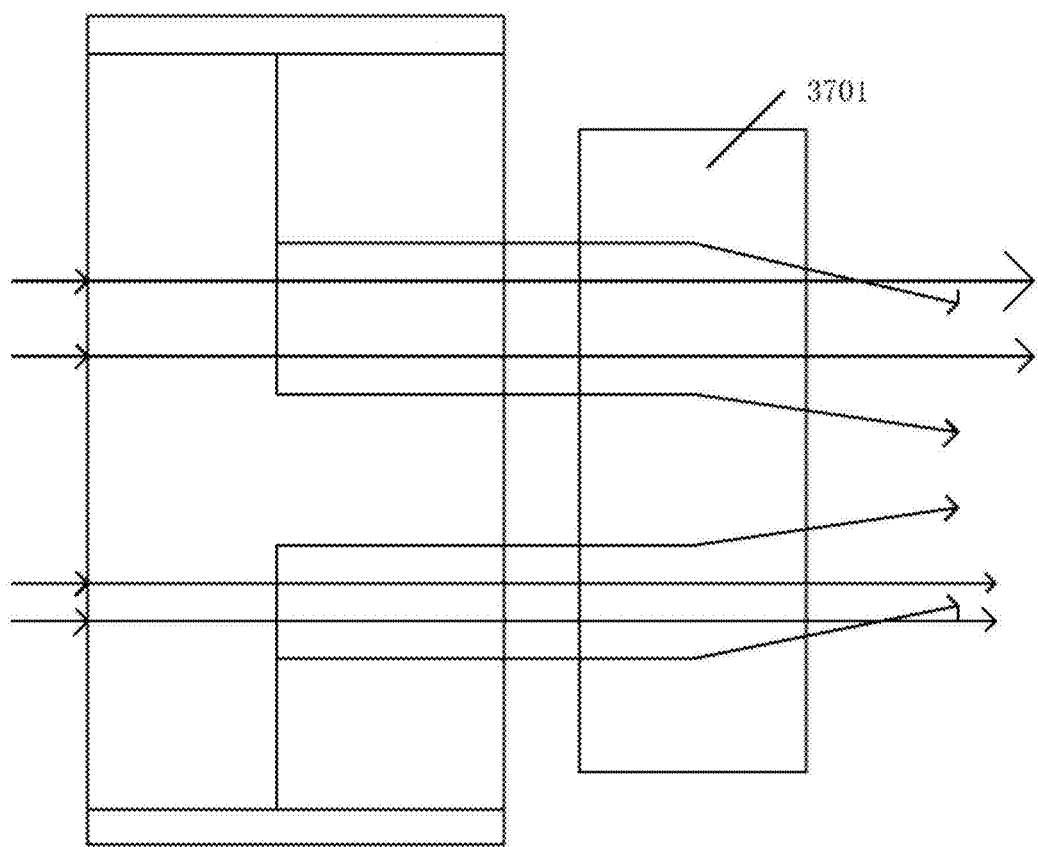

FIG. 37 shows an embodiment of four sub-images splicing.

In FIG. 37, a polarization selective transmission diopter 3701 is used at the end. The polarization selective transmission refractometer is characterized in that it can screen the passing light, refract only the internal display light (in one polarization state), and not refract the external light (in another polarization state), so that the human eye can see the internal display light and the external environment light at the same time.

Optical technology that can achieve this effect already exists in the industry, and there are multiple ways to achieve it, so it is not repeated here.

II. The refractive compensation component is arranged to realize the transmission display effect of augmented reality The near-to-eye display device contains transmissive refractive components inside, which can allow external light to pass through, but refract external incident light with a certain focal length. A refractive compensation component (such as spherical lens, aspheric lens, Fresnel lens, etc.) is added outside the whole device, whose focal length is opposite to that of the transmissive refractive components, which can allow human eyes to see the external light after mutual cancellation, thus realizing the transmissive display effect of augmented reality.

Figure 38:
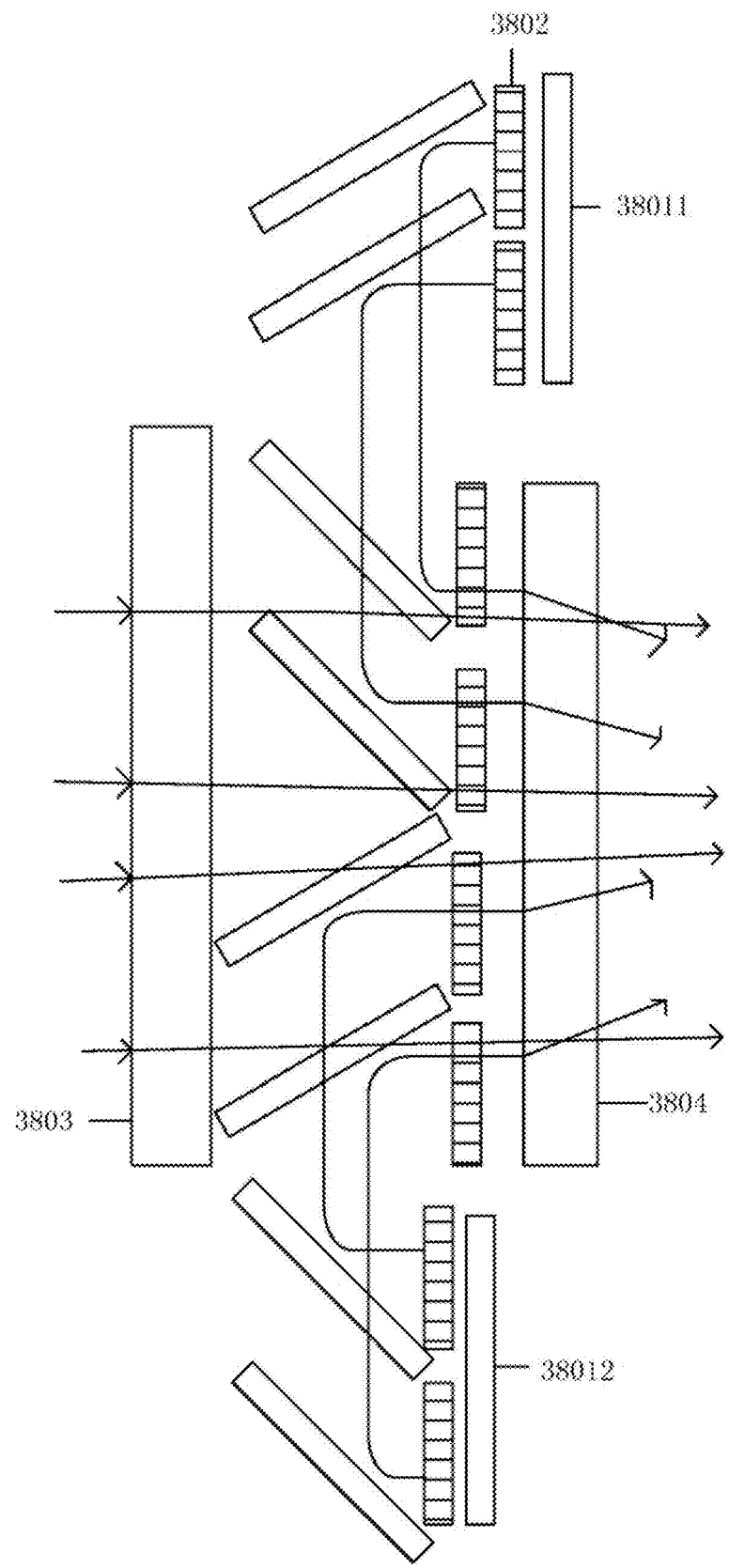

FIG. 38 is a structural diagram of the near-to-eye display device according to this embodiment, and as shown in FIG. 38, it includes a light source 38011, a light source 38012, a polarizer 3802 (including eight polarizers), a compensation refractive component 3803, and a transmission refractive component 3804.

In FIG. 38, in a four-sub-image splicing scheme, the inner transmissive refractive component 3804 is a positive focal length lens, while the outer compensatory refractive component 3803 is a negative focal length lens, so that the equivalent focal length of the external light is zero after passing through the whole optical system, so that the human eye can see the external light clearly.

Figure 39A:
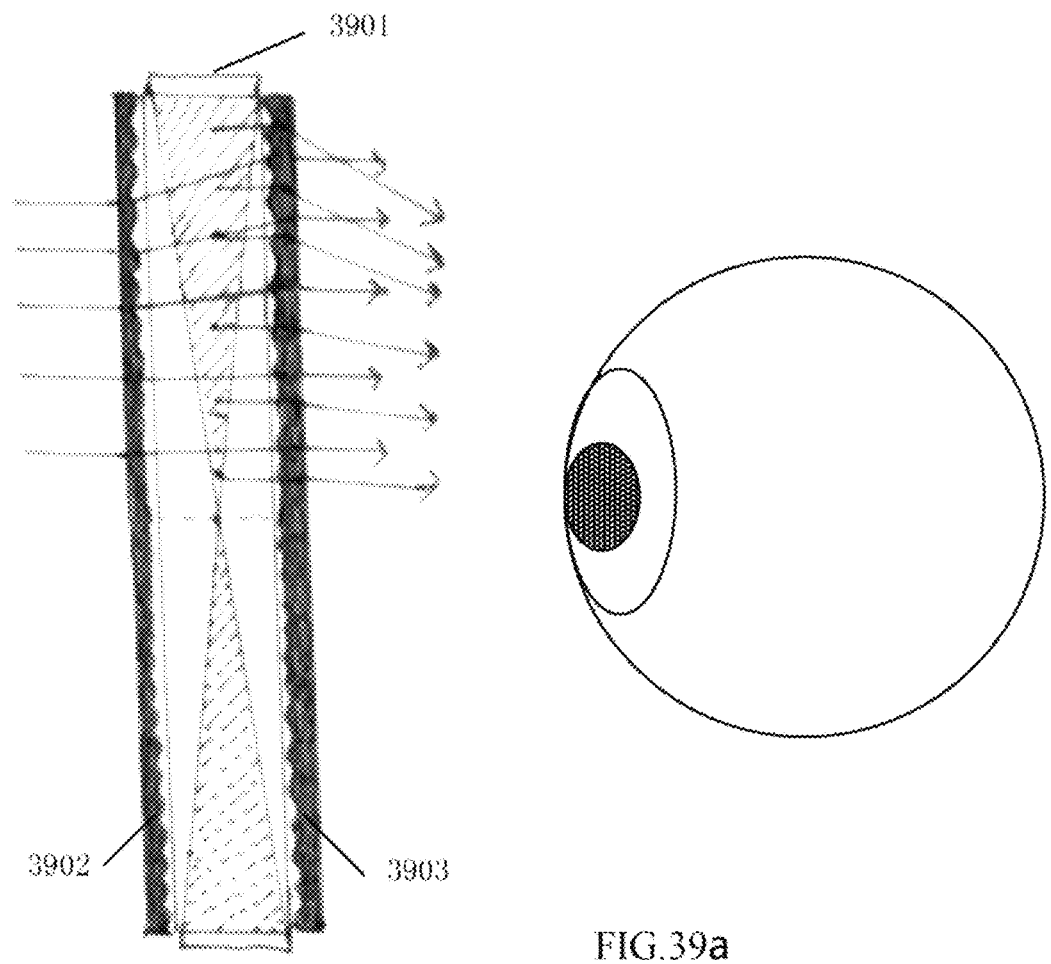
Figure 39B:
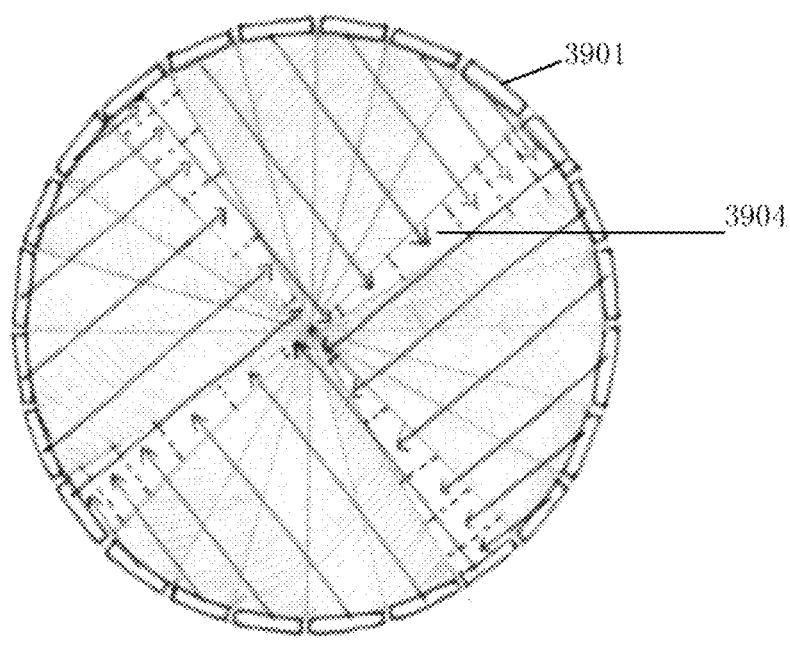

FIGS. 39*a*-39*b* show a comprehensive embodiment of this embodiment.

Comprises a light source 3901, a transmission refractive component 3903, a compensation refractive component 3902 and emission windows 3904.

FIGS. 39*a*-39*b* show a projection splicing device for 24 sub-images. Each sub-image exits from the corresponding emission window to form a radial reflection unit.

Only four emission windows 3904 arranged in a cross shape are opened in each time period. There are six time periods, so that 24 sub-images are projected onto the retina of human eyes in turn.

Twenty-four independent light sources 3901 or one annular light source are used around.

The 24 radial reflection units can adopt wave type or turbine type.

The optical path length of each radial reflection unit is consistent, and the same near-to-eye refractive component 3903 (transmission near-to-eye refractive component in this example) is shared at the end, so that human eyes can see it clearly.

The refractive compensation component 3902 is used externally, so that the human eye can see the external light clearly.

EXAMPLE 9

In this embodiment, a plurality of radial reflection units with different focal lengths or optical path lengths project a plurality of overlapping sub-images on the same area of human retina, and these sub-images have different focal points. With different focusing states of human lens, only one of these sub-images can be clearly imaged on the retina, and the rest are in a blurred state. These overlapping sub-images can be projected at the same time, or they can be projected at different times and switched in turn quickly, or only one sub-image can be projected at a certain time according to the application needs.

Figure 40A:
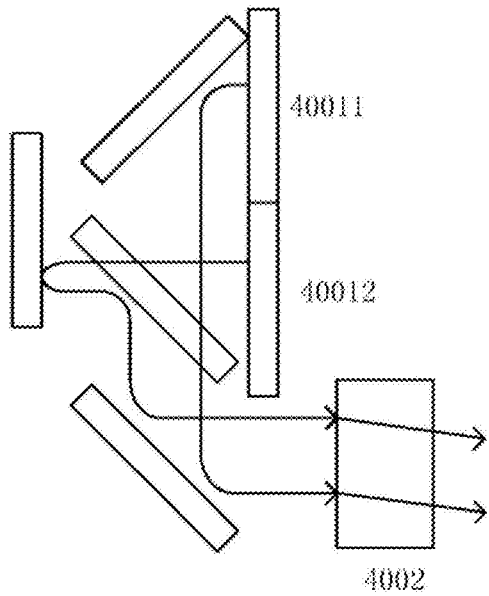
FIG. 40a-c to FIG. 44 are schematic structural views of a thin near-to-eye display device with a large field of view angle according to a ninth embodiment of the present application.
Figure 40B:
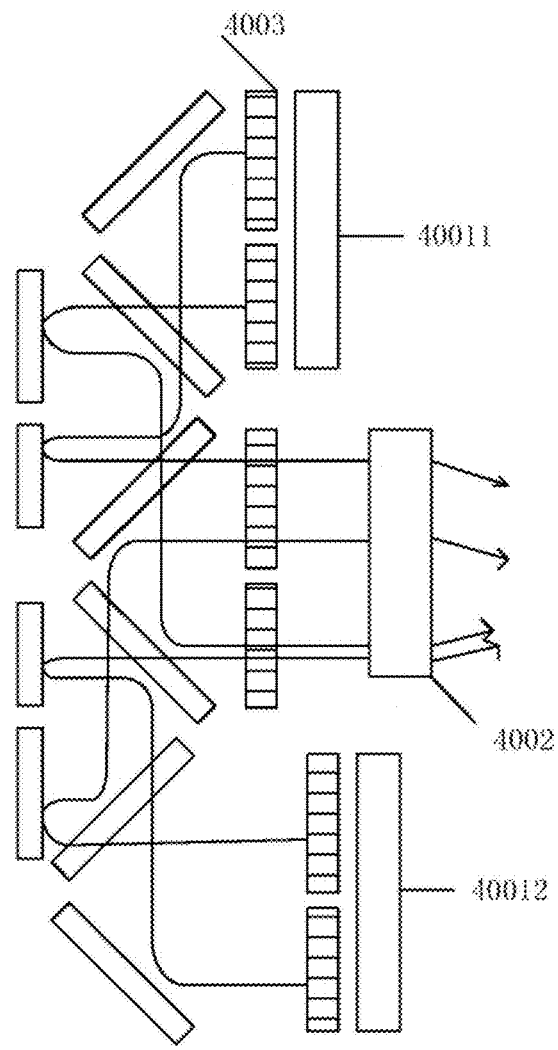
Figure 40C:
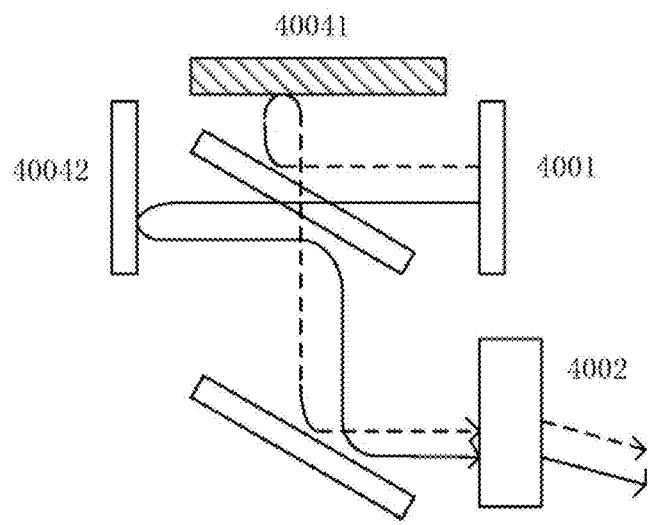

I. Projection of Two Sub-Images with Different Focus on the Same Area of Human Retina:

FIGS. 40*a*-40*c* show two sub-images with different focuses projected on the same area of human retina in this embodiment.

FIG. 40*a* includes light source 40011, light source 40012, near-to-eye refractive component 4002, and several reflection surfaces (not labeled), FIG. 40*a* uses two independent light sources (light source 40011, light source 40012), which emit light at the same time; after multi-reflections, the two light paths from different optical path lengths, pass through near-to-eye refractive component 4002, and finally enter human eyes, forming two different focal points on human retina.

FIG. 40*b* includes light source 40011, light source 40012, polarizer 4003 (several), near-to-eye refractive component 4002, and several reflection surfaces (not labeled. Compared with FIG. 40*a*, the positions of light source 40011 and light source 40012 are different, and several polarizers are added, so that a larger field of view angle is realized by polarization isolation method.

FIG. 40*c* includes a light source 4001, a reflective light valve 40041, a reflective light valve 40042, a near-to-eye refractive component 4002, and several reflective surfaces (not labeled),The light emitted by the light source 4001 in FIG. 40*c* is reflected by the reflective light valve 40042 or the reflective light valve 40041 at different times, forming two optical paths with different lengths, thus realizing the projection of two sub-images with different focal points at different times. Two sub-images cannot be displayed at the same time, but can be switched in turn quickly; Or select one of the sub-images for display according to the application requirements.

Figure 41:
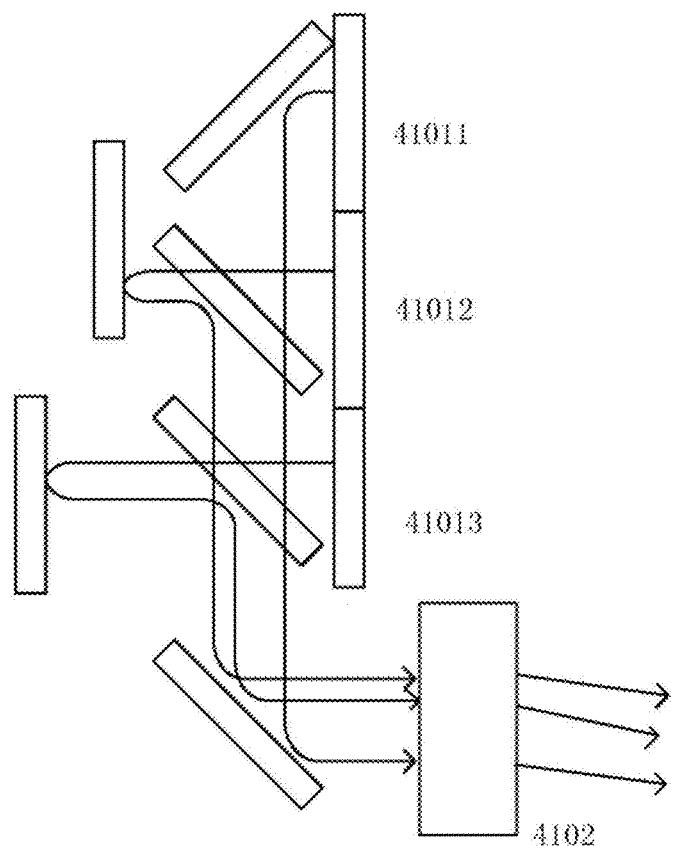

II. Projection of Three Sub-Images with Different Focus on the Same Area of Human Retina:

FIG. 41 shows that three sub-images with different focuses are projected on the same area of human retina, including three light sources 41011-41013, near-to-eye refractive component 4102 and several reflection surfaces (not labeled).

FIG. 41 uses three independent light sources, and the three light beams form different optical path lengths after multi-reflections, and finally enter the human eye, forming three sub-images with different focal points in the same area of human retina.

Figure 42:
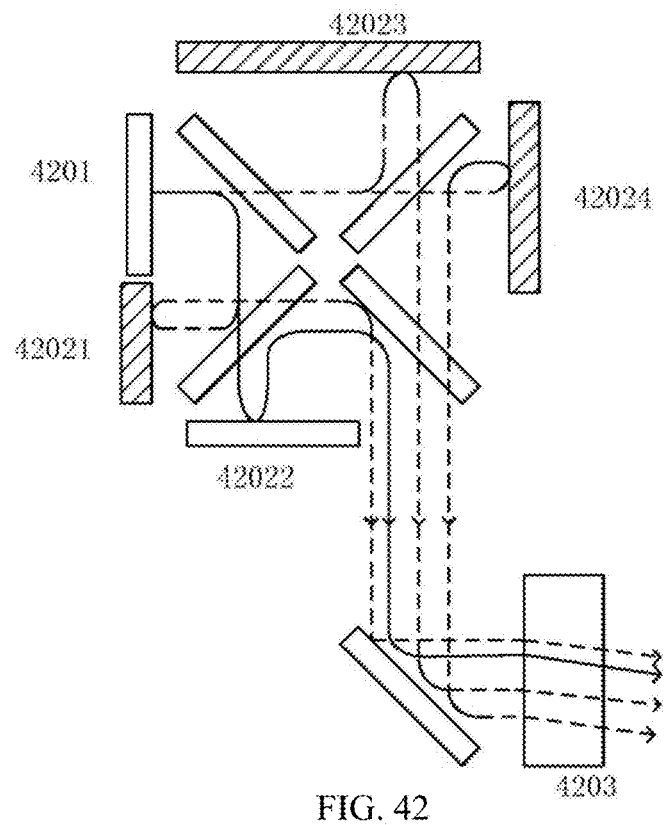

III. Projection of Four Sub-Images with Different Focus on the Same Area of Human Retina:

FIG. 42 shows that four sub-images with different focuses are projected on the same area of human retina, including light source 4201, reflective light valves 42021-42024, near-to-eye refractive component 4203, and several reflective surfaces (not labeled)

FIG. 42 uses a light source, and by switching four reflective light valves, four rays with different optical path lengths are formed, and finally enter the human eye through the near-to-eye refractive component, forming four sub-images with different focal points in the same area of the retina of the human eye.

The four sub-images cannot be displayed at the same time, but can be switched in turn quickly; or one of the sub-images is selected for display according to the application requirements.

IV. The Near-to-Eye Display Device Adjusts the Optical Path Length of the Radial Reflection Unit by Adding Moving Parts, so as to Project Sub-Images with Different Focuses on the Retina of Human Eyes.

Figure 43:
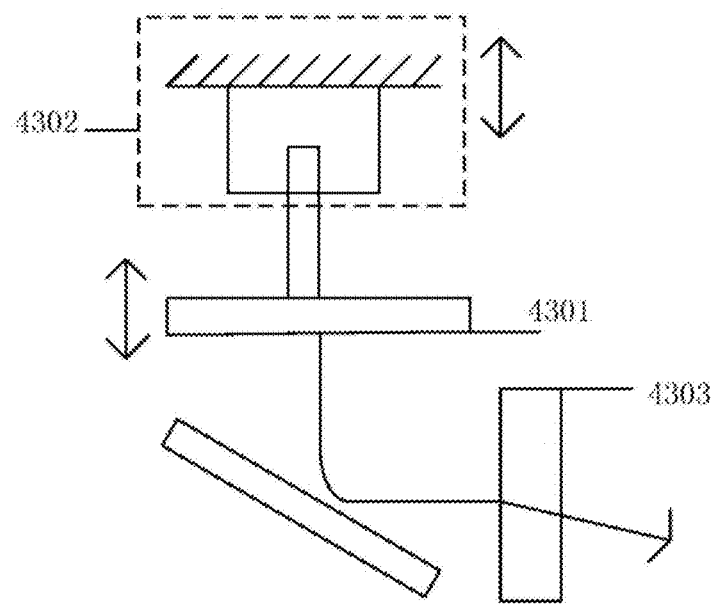

FIG. 43 shows that in this embodiment, moving parts are added to project sub-images with different focuses on the retina of human eyes, including a light source 4301, a linear motion device 4302, a near-to-eye refractive part 4303, and a reflection surface (not labeled)

As shown in FIG. 43, a linear motion device 4302 is added at the light source 4301 to drive the light source to move up and down, so as to adjust the length of the whole optical path and play a role in adjusting the focus of the sub-image projected onto the retina of human eyes.

Figure 44:
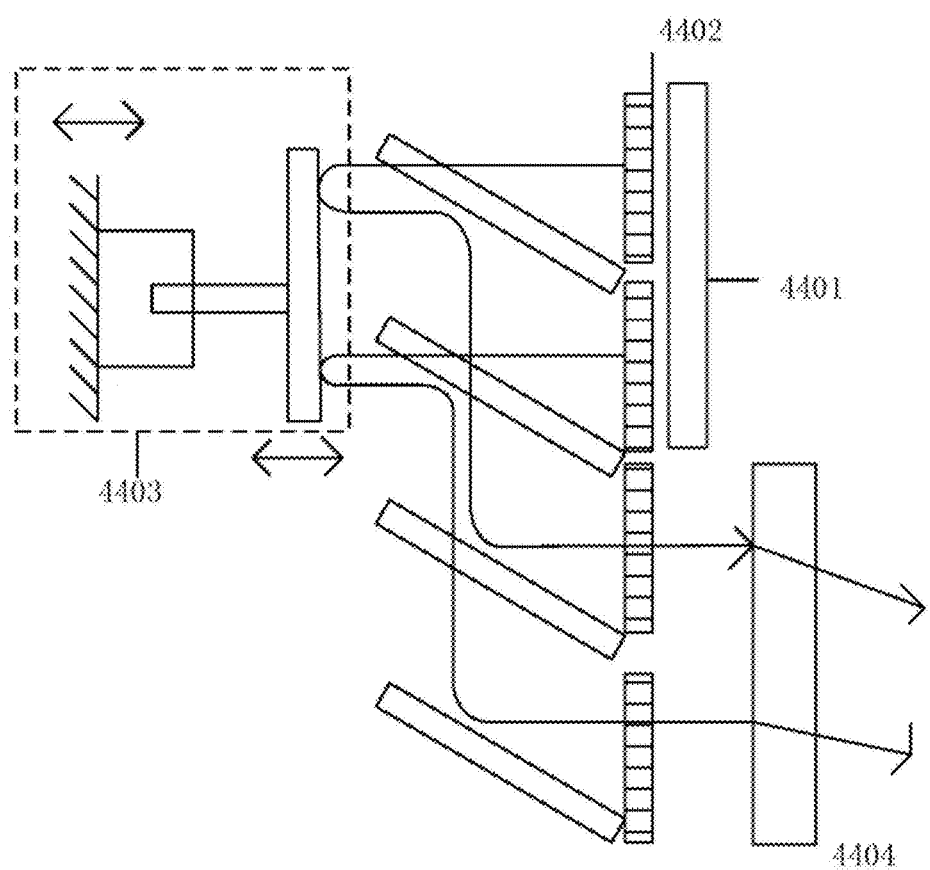

FIG. 44 shows that in this embodiment, moving parts are added to project sub-images with different focuses on the retina of human eyes, including a light source 4401, polarizers 4402 (several), near-to-eye refractive parts 4404, reflection surfaces (not labeled), and linear motion mirrors 4403.

In FIG. 44, a linear motion mirror 4403 is added at the light source 4401, which can move back and forth, thereby adjusting the length of the whole optical path and playing a role in adjusting the focus of the sub-image projected onto the retina of human eyes.

EXAMPLE 10

In this embodiment, two radial reflection units with different optical path lengths project two overlapping sub-images on the same area of human retina, one of which is larger and provides a wide edge field of view, while the other is smaller and provides a high-definition central field of view, thus providing a near-to-eye display effect with a wide edge and a clear center.

Scheme 1

FIGS. 45a-45d show the specific structural schematic diagrams of this embodiment, including light sources 45011, 45012, sub-images 45021, 45022, polarizers 4503 (several), reflective refractive components 45041 and reflective refractive components 45042.

The embodiment provides a scheme for nesting large and small images.

Figure 45A:
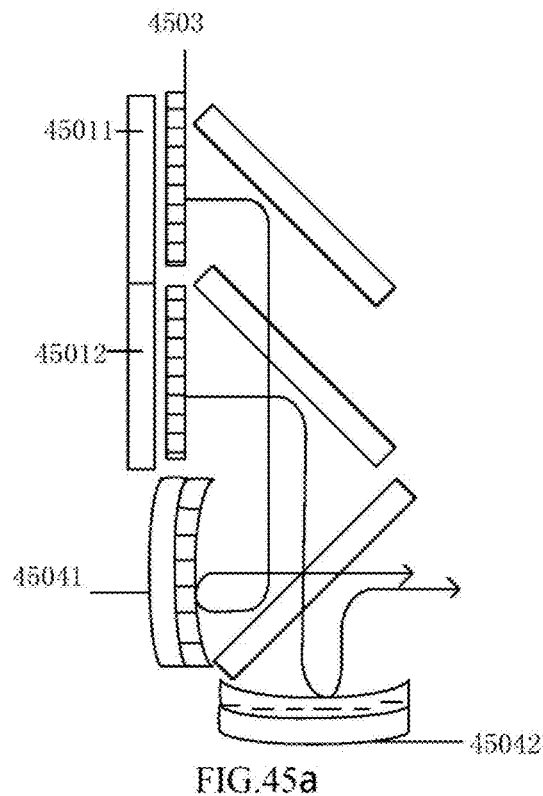
FIG. 45a-d to FIG. 47a-c are schematic structural views of a thin near-to-eye display device with a large field of view angle according to a tenth embodiment of the present application.
Figure 45B:
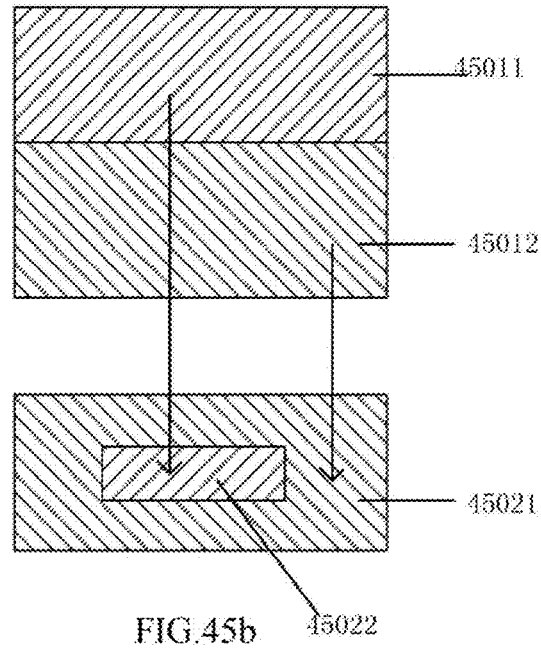

As shown in FIG. 45a, the light emitted by the light sources 45011 and 45012 have different polarization states, and come into contact with the reflective refractive component 45041 and the reflective refractive component 45042 with different focal lengths after reflection refraction; however, due to the different focal lengths of the two optical paths, the imaging sizes on the retina of human eyes are different. As shown in the figure, a smaller sub-image 45022 and a larger sub-image 45021 are formed respectively.

Through the special settings of the images emitted from the light sources 45011 and 45012, the sub-images 45021 and 45022 can coincide in the joining area, so that the user cannot perceive the boundary between the central picture and the edge picture. Because the visual range of sub-image 45022 is small, the definition is higher, which accords with the characteristic of higher visual resolution of human eyes.

Figure 45C:
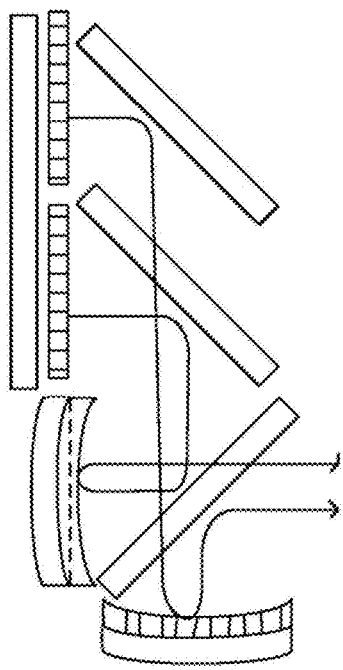

Particularly, with the scheme shown in FIG. 45c, the nesting effect of large and small images can also be realized by setting different polarizers.

Figure 45D:
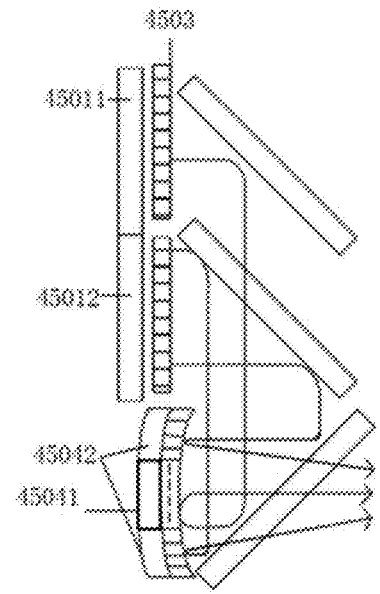

Particularly, in the scheme shown in FIG. 45d, the reflective refractive component 45041 is embedded in the center of the reflective refractive component 45042, and the light emitted by the light source 45011 will only be reflected by the reflective refractive component 45041, while the light emitted by the light source 45012 will only be reflected by the reflective refractive component 45042, thus isolating the optical path and achieving the effect of nesting large and small images.

In addition to polarizer, the combination of polarizer and polarization splitter can be used to realize the isolation of optical path. They will not be repeated here.

In FIG. 45a, FIG. 45c, and FIG. 45d, if the device allows the outside light to pass through, but does not refract the outside light, the transmission display effect of augmented reality can be realized. In this case, the light source 45011 and the light source 45012 can be arranged on the right side of the figure, and the light are emitted to the left and reflected downward.

Scheme 2

In this embodiment, another scheme for nesting large and small images is proposed.

Figure 46A:
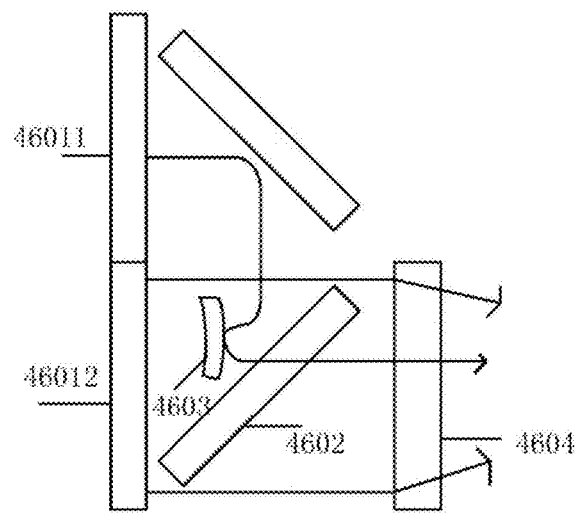

In FIG. 46a, the light emitted by the light source 46011 is reflected downward, then reflected outward by the semi-reflector 4602, and then refracted by the reflecting refractive component 4603, and becomes a virtual image whose light emitting position is close to the light source 46012, so it can be refracted by the transmitting refractive component 4604 together with the light emitted by the light source 46012, and become visible light for human eyes. Because the light emitted by the light source 46011 has undergone two refractions of negative and positive focal length, the sub-image projected on the retina of human eyes is small and has high definition.

By moving the front and back position of the reflecting refractive component 4603, the focus position of the central sub-image near the retina of human eyes can be adjusted, and the display effect of different focal planes can be realized.

Figure 46B:
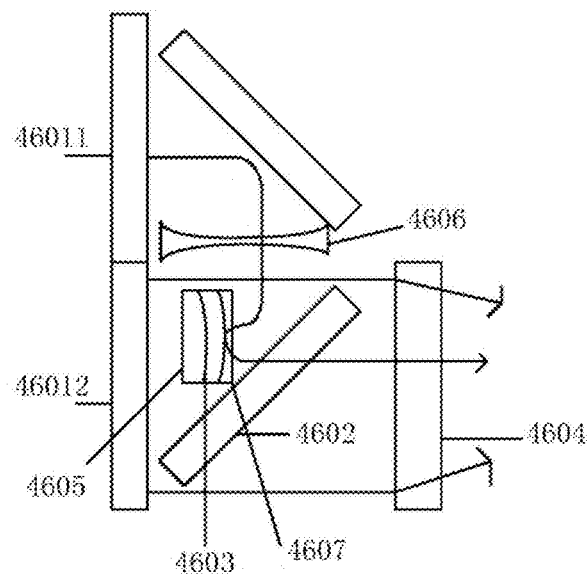

As shown in FIG. 46b, the negative focal length lens 4606 and the flat concave lens 4607 are added to the optical path, which can increase the negative focal length diopter of the light emitted by the light source 46011. At the same time, the plano-convex lens 4605 is added, so that the light of the light source 46012 or the light transmitted from the outside is not refracted when passing through the plano-convex lens 4605 and the plano-concave lens 4607.

By moving the front and back positions of plano-convex lens 4605, reflecting refractive component 4603 and plano-concave lens 4607, the focus position of the central sub-image near the retina of human eyes can be adjusted to realize the display effect of different focal planes.

Figure 46C:
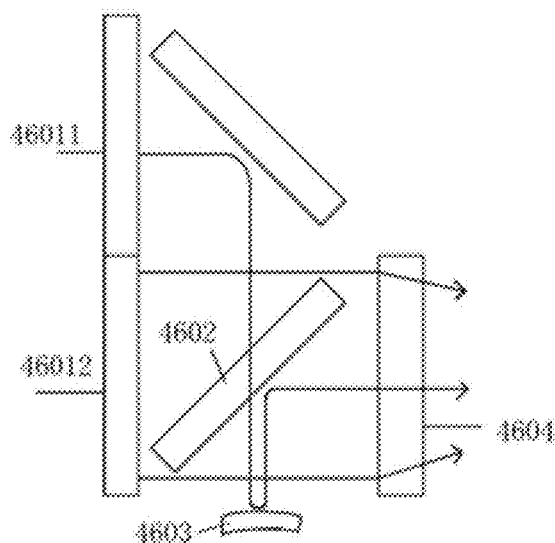

As shown in FIG. 46c, the light emitted by the light source 46011, after being reflected downward, passes through the semi-reflector 4602, undergoes refractive reflection by the reflective refractive component 4603, and then is reflected by the semi-reflector 4602, and becomes a virtual image whose light emitting position is close to the light source 46012, so it can be refracted by the transmissive refractive component 4604 together with the light emitted by the light source 46012, and become light that can be seen clearly by human eyes.

In FIG. 46a to FIG. 46c, if the light source 46012 is a semi-transparent display, external light can be allowed to pass through. The transmission display effect of augmented reality can be realized. The specific scheme will not be described in detail.

Scheme 3

In this embodiment, another scheme for nesting large and small images is proposed.

Figure 47A:
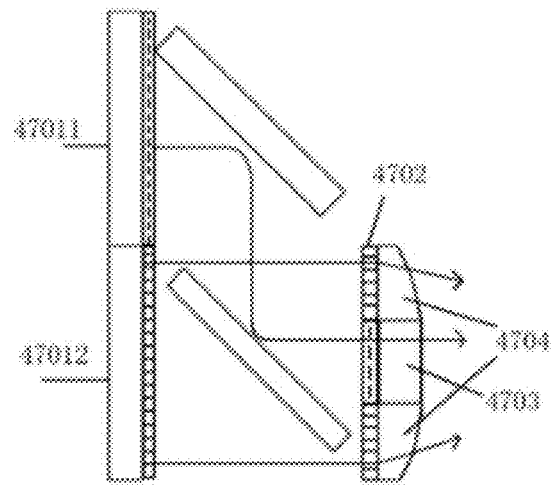
Figure 47B:
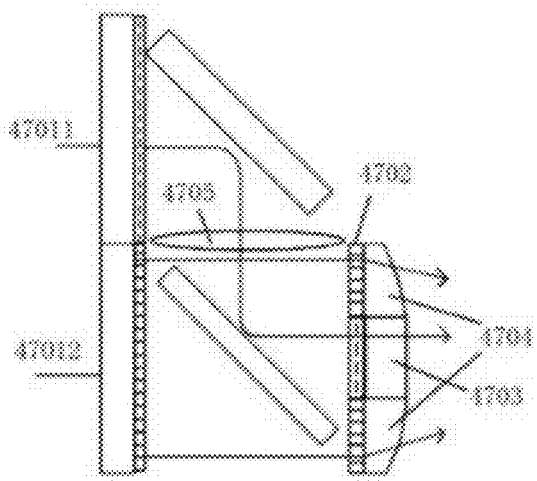
Figure 47C:
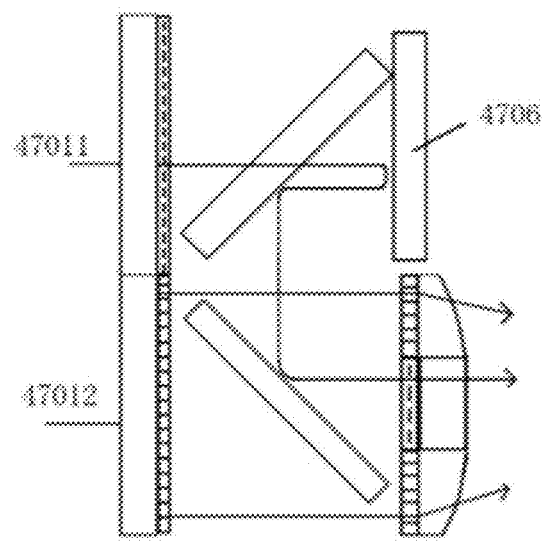

FIGS. 47a-47c show the specific structural schematic diagrams of this embodiment, including light sources 47011, 47012, polarizers 4702 (several), transmissive refractive components 4703, 4704, 4705 and mirrors 4706.

As shown in FIG. 47a, the transmissive refractive component 4703 is embedded in the center of the transmissive refractive component 4704. The light emitted by the light source 47011 is polarized, reflected downward and then reflected outward. Due to polarization selectivity, the light can only enter the human eye through the transmissive refractive component 4703, but cannot pass through the transmissive refractive component 4704, After being polarized, the light emitted by the light source 47012 can only enter the human eye through the transmissive refractive component 4704, but cannot pass through the transmissive refractive component 4703. Because the final optical path lengths of the light emitted by the two light sources are different, and the focal lengths of the two transmissive refractive components are also different, the sizes of the two sub-images are different, one is smaller in the center, and the other is larger in the periphery.

In the scheme shown in FIG. 47b, a transmissive refractive component 4705 (which can be a positive focal length or a negative focal length) is added to further adjust the projection optical path of the central sub-image. Particularly, by moving the upper and lower positions of the transmissive refractive component 4705, the focus position of the central sub-image near the retina of human eyes can be adjusted, and the display effect of different focal planes can be realized.

In the scheme shown in FIG. 47c, a mirror 4706 is added to further increase the projection optical path length of the central sub-image, so that a smaller and clearer image can be obtained. Particularly, by moving the front and back position of the mirror 4706, the focus position of the central sub-image near the retina of human eyes can be adjusted, and the display effect of different focal planes can be realized.

Combined with the description and practice of the application disclosed herein, other embodiments of the application will be easily thought of and understood by those skilled in the art. The description and examples are to be regarded as exemplary only, and the true scope and spirit of the application are defined by the claims.

What is claimed is:

1. A thin near-to-eye display device with a large field of view angle, comprising:
   two or more radial reflection units arranged in front of human eyes to generate two or more sub-images which are spliced into a larger complete image on the retina of the human eyes, thereby realizing a near-to-eye display effect with a large field of view angle in a thin volume,
   wherein each radial reflection unit comprises a light source, a reflection surface, a transmissive diopter and/or a reflective optical component, and light emitted by the light source passes through the transmissive diopter or the reflective optical component for refractive amplification before being reflected into axial light so as to be seen by the human eyes, and
   wherein the plurality of radial reflection units project respective sub-image from different directions from a side, and the sub-images are spliced into the complete image on the retina of the human eyes.

2. The near-to-eye display device according to claim 1, wherein two radial reflection units project sub-images from upper and lower directions, and the sub-images are spliced into a complete image on the retina of the human eyes.

3. The near-to-eye display device according to claim 1, wherein structural forms of the reflection surfaces of three or more radial reflection units include pyramid, turbine and wave.

4. The near-to-eye display device according to claim 1, wherein the plurality of radial reflection units project respective sub-images from the side from a same direction, and the sub-images are spliced into a complete image on the retina of the human eyes.

5. The near-to-eye display device according to claim 1, wherein the plurality of radial reflection units project respective sub-images from the side from the same direction, each radial reflection unit is provided with an independent light source, or the plurality of radial reflection units share the same light source, and a plurality of emission windows are formed through a light controller, so that only one emission window is opened in each time period to allow light to exit; the plurality of radial reflection units alternately project different sub-images in different time periods, and each time period is extremely short in length, which makes the human eyes feel multiple sub-images at the same time.

6. The near-to-eye display device according to claim 5, wherein the light controller comprises a transmissive light valve, a reflective light valve, a controllable mirror or a rotating mirror array.

7. The near-to-eye display device according to claim 1, wherein the plurality of radial reflection units project light from different directions, and the plurality of radial reflection units overlap each other in each direction, and each radial reflection unit projects a separate sub-image to be spliced into a complete image on the retina of the human eyes.

8. A near-to-eye display device with a large field of view angle, comprising:
   two or more radial reflection units arranged in front of human eyes to generate two or more sub-images which are spliced into a larger complete image on the retina of the human eyes, thereby realizing a near-to-eye display effect with a large field of view angle in a thin volume; and
   a compensating refractive component,
   wherein each radial reflection unit comprises a light source, a reflection surface, a transmissive diopter and/or a reflective optical component, and light emitted by the light source passes through the transmissive diopter or the reflective optical component for refractive amplification before being reflected into axial light so as to be seen by the human eyes, and wherein a focal length of the compensating refractive component is opposite to that of a near-to-eye refractive component, and after offset of the focal length, the human eyes are allowed to see external light, thereby realizing a transmission display effect of augmented reality.

9. The near-to-eye display device according to claim 8, further comprising a moving part for adjusting an optical path length of the radial reflection unit, so as to project sub-images with different focal points on the retina of the human eyes.

10. The near-to-eye display device according to claim 8, wherein two radial reflection units with different optical path lengths project two overlapping sub-images on a same area of the human retina, one of which is larger and provides a wide edge field of view, while the other is smaller and provides a central high-definition field of view, thereby providing a near-to-eye display effect with a wide edge and a clear center.

* * * * *